US007784696B2

(12) United States Patent
Wang

(10) Patent No.: US 7,784,696 B2
(45) Date of Patent: Aug. 31, 2010

(54) INDICIA READING APPARATUS HAVING IMAGE SENSING AND PROCESSING CIRCUIT

(75) Inventor: Ynjiun P. Wang, Cupertino, CA (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 972 days.

(21) Appl. No.: 11/545,725

(22) Filed: Oct. 10, 2006

(65) Prior Publication Data

US 2007/0284448 A1 Dec. 13, 2007

Related U.S. Application Data

(60) Provisional application No. 60/814,950, filed on Jun. 19, 2006, provisional application No. 60/812,636, filed on Jun. 9, 2006.

(51) Int. Cl.
*G06K 7/10* (2006.01)
(52) U.S. Cl. .................. 235/462.11; 235/462.01; 235/462.41; 235/465.45; 235/472.01
(58) Field of Classification Search ............ 235/462.11, 235/462.01, 462.41, 462.45, 472.01
See application file for complete search history.

(56) References Cited

U.S. PATENT DOCUMENTS

| 5,180,232 A | 1/1993 | Chadima, Jr. et al. |
| 5,262,623 A | 11/1993 | Batterman et al. |

(Continued)

FOREIGN PATENT DOCUMENTS

WO    WO 2006/098954 A2    9/2006

OTHER PUBLICATIONS

Roger Panicacci, Sabrina Kemeny, Larry Matthies, Bedabrata Pain, Eric R. Fossum, Programmable Multiresolution CMOS Active Pixel Sensor, SPIE, pp. 72-79, vol. 2654.

(Continued)

*Primary Examiner*—Allyson N Trail
(74) *Attorney, Agent, or Firm*—Marjama Muldoon Blasink & Sullivan, LLP

(57) ABSTRACT

There is provided in one embodiment an indicia reading apparatus with enhanced functionality which can filter image data prior to the capture of image data into an image frame memory for further processing. In one aspect the indicia reading apparatus can have an image sensing and processing circuit that can contemporaneously output, on respective first and second interfaces, both filtered and raw pixel values so that both filtered and raw frames of image data can be captured contemporaneously for further processing. Filtered and raw frames of image data or pixel values can also be serially output through a single interface in an interleaved manner. An image sensing and processing circuit which outputs either or both raw and filtered pixel values can be provided on a single integrated circuit. In another aspect an image sensing and processing circuit can be provided that develops data indicating a location of a decodable indicia representation within image data prior to capture of a frame of image data into an image frame memory so that when pixel values are first addressed for further processing, a decodable indicia representation such as a bar code representation has already been located. By processing of image data within an image processing circuit prior to capture into an image frame memory a trigger to read time (TTR) can be reduced.

28 Claims, 18 Drawing Sheets

U.S. PATENT DOCUMENTS

| | | | |
|---|---|---|---|
| 5,266,789 A | 11/1993 | Anglin et al. |
| 5,378,883 A | 1/1995 | Batterman et al. |
| 5,521,366 A | 5/1996 | Wang et al. |
| 5,542,006 A | 7/1996 | Shustorovich et al. |
| 5,581,642 A | 12/1996 | Deacon et al. |
| 5,591,955 A | 1/1997 | Laser |
| 5,612,530 A | 3/1997 | Sanders et al. |
| 5,703,349 A | 12/1997 | Meyerson et al. |
| 5,739,518 A | 4/1998 | Wang |
| 5,801,371 A | 9/1998 | Kahn et al. |
| 5,811,780 A | 9/1998 | Rockstein et al. |
| 5,844,219 A | 12/1998 | Wallner |
| 5,896,214 A | 4/1999 | Peltz |
| 5,939,698 A | 8/1999 | Rockstein et al. |
| 5,979,763 A | 11/1999 | Wang et al. |
| 6,000,612 A | 12/1999 | Xu |
| 6,047,894 A | 4/2000 | Arends et al. |
| 6,053,407 A | 4/2000 | Wang et al. |
| 6,062,475 A | 5/2000 | Feng |
| 6,073,851 A | 6/2000 | Olmstead et al. |
| 6,097,839 A | 8/2000 | Liu |
| 6,097,856 A | 8/2000 | Hammond, Jr. |
| 6,129,278 A | 10/2000 | Wang et al. |
| 6,155,488 A | 12/2000 | Olmstead et al. |
| 6,209,788 B1 | 4/2001 | Bridgelall et al. |
| 6,230,975 B1 | 5/2001 | Colley et al. |
| 6,250,551 B1 | 6/2001 | He et al. |
| 6,424,745 B1 | 7/2002 | Hansen et al. |
| 6,518,885 B1 | 2/2003 | Brady et al. |
| 6,547,139 B1 | 4/2003 | Havens et al. |
| 6,580,808 B2 | 6/2003 | Rhoads |
| 6,597,203 B2 | 7/2003 | Forbes |
| 6,631,842 B1 | 10/2003 | Tsikos et al. |
| 6,633,433 B2 | 10/2003 | Bergstein et al. |
| 6,695,209 B1 | 2/2004 | La |
| 6,728,003 B1 | 4/2004 | Gallagher et al. |
| 6,830,189 B2 | 12/2004 | Tsikos et al. |
| 6,863,217 B2 | 3/2005 | Hudrick et al. |
| 6,879,701 B1 | 4/2005 | Rhoads |
| 7,039,239 B2 | 5/2006 | Loui et al. |
| 7,059,525 B2 | 6/2006 | Longacre et al. |
| 7,063,261 B2 | 6/2006 | Vinogradov et al. |
| 7,070,107 B2 | 7/2006 | Tsikos et al. |
| 7,077,317 B2 | 7/2006 | Longacre, Jr. et al. |
| 7,077,321 B2 | 7/2006 | Longacre, Jr. et al. |
| 7,086,595 B2 | 8/2006 | Zhu et al. |
| 7,093,757 B2 | 8/2006 | Boucher et al. |
| 7,097,102 B2 | 8/2006 | Patel et al. |
| 7,103,197 B2 | 9/2006 | Rhoads |
| 7,104,456 B2 | 9/2006 | Parker et al. |
| 7,117,581 B2 | 10/2006 | Arneson et al. |
| 7,124,948 B2 | 10/2006 | Longacre, Jr. et al. |
| 7,124,949 B2 | 10/2006 | Madej |
| 7,124,950 B2 | 10/2006 | Blake et al. |
| 7,204,423 B2 | 4/2007 | Madej |
| 7,503,498 B2 | 3/2009 | Zhu et al. |
| 7,516,898 B2 | 4/2009 | Knowles et al. |
| 7,520,433 B2 | 4/2009 | Knowles et al. |
| 7,527,204 B2 | 5/2009 | Knowles et al. |
| 7,533,820 B2 | 5/2009 | Knowles et al. |
| 7,533,823 B2 | 5/2009 | Knowles et al. |
| 7,537,165 B2 | 5/2009 | Knowles et al. |
| 7,540,422 B2 | 6/2009 | Knowles et al. |
| 7,540,424 B2 | 6/2009 | Knowles et al. |
| 7,540,425 B2 | 6/2009 | Kotlarsky et al. |
| 7,543,749 B2 | 6/2009 | Knowles et al. |
| 7,546,952 B2 | 6/2009 | Knowles et al. |
| 7,556,199 B2 | 7/2009 | Knowles et al. |
| 7,559,474 B2 | 7/2009 | Knowles et al. |
| 7,559,475 B2 | 7/2009 | Kotlarsky et al. |
| 7,568,626 B2 | 8/2009 | Knowles et al. |
| 7,571,858 B2 | 8/2009 | Knowles et al. |
| 7,571,859 B2 | 8/2009 | Knowles et al. |
| 7,575,169 B2 | 8/2009 | Knowles et al. |
| 7,575,170 B2 | 8/2009 | Knowles et al. |
| 7,578,442 B2 | 8/2009 | Knowles et al. |
| 7,578,445 B2 | 8/2009 | Knowles et al. |
| 7,581,680 B2 | 9/2009 | Knowles et al. |
| 7,584,892 B2 | 9/2009 | Knowles et al. |
| 7,588,188 B2 | 9/2009 | Knowles et al. |
| 7,594,608 B2 | 9/2009 | Knowles et al. |
| 7,594,609 B2 | 9/2009 | Kotlarsky et al. |
| 2001/0000907 A1 | 5/2001 | Knowles et al. |
| 2002/0017565 A1 | 2/2002 | Ju et al. |
| 2002/0139920 A1 | 10/2002 | Seibel et al. |
| 2003/0004827 A1 | 1/2003 | Wang |
| 2003/0062413 A1 | 4/2003 | Gardiner et al. |
| 2003/0094495 A1 | 5/2003 | Knowles et al. |
| 2003/0095197 A1 | 5/2003 | Wheeler et al. |
| 2003/0098353 A1 | 5/2003 | Tsikos et al. |
| 2003/0150916 A1 | 8/2003 | Tsikos et al. |
| 2003/0168512 A1 | 9/2003 | Longacre et al. |
| 2004/0004125 A1 | 1/2004 | Havens et al. |
| 2004/0046029 A1 | 3/2004 | Hudrick et al. |
| 2004/0149829 A1 | 8/2004 | Boucher et al. |
| 2005/0005102 A1 | 1/2005 | Meggitt et al. |
| 2005/0039092 A1 | 2/2005 | Soule, III et al. |
| 2005/0145698 A1 | 7/2005 | Havens et al. |
| 2005/0211782 A1 | 9/2005 | Martin et al. |
| 2005/0268003 A1 | 12/2005 | Wang et al. |
| 2006/0071081 A1 | 4/2006 | Wang |
| 2006/0180671 A1 | 8/2006 | Yu |
| 2006/0192011 A1 | 8/2006 | Madej |
| 2006/0202036 A1 | 9/2006 | Wang et al. |
| 2006/0202038 A1 | 9/2006 | Wang et al. |
| 2006/0213999 A1 | 9/2006 | Wang et al. |

OTHER PUBLICATIONS

Evgeny Artyomov, Orly Yadid-Pecht, Adaptive Multiple Resolution CMOS Active Pixel Sensor, The VLSI Systems Center, Ben-Gurion University, Beer Sheva 84105, Israel.

Oxford Micro Devices, Inc., Application Note: Use of High Speed Multi-Segment Digital Image Sensors with Ax36 Video DSP Chips, url: http://www.omdi.com/ , Rev. Feb. 27, 1999.

Oxford Micro Devices, Inc., Application Notes for Fingerprint Processing Using the A336FP Fingerprint and Image Compression Digital Signal Processor DSP Chip, url: http://www.omdi.com/, pp. 1-9, Rev. Oct. 24, 1999.

Oxford Micro Devices, Inc., Application Notes for Fingerprint Processing Using the A336 Fingerprint and Image Compression Digital Signal Processors DSP Chip, url: http://www.omdi.com/, Rev. May 15, 2000.

Oxford Micro Devices, Inc., Application Note: Image/Video Processing/Compression Using A436 Video Digital Signal Processors DSP Chip, url: http://www.omdi.com/, pp. 1-7, Rev. Aug. 19, 2000.

Stuart Kleinfelder, Sukhwan Lim, Xinqiao Liu, Abbas El Gamal, A 10,000 Frames/s 0.18μm CMOS Digital Pixel Sensor with Pixel-Level Memory, Presented at the 2001 International Solid State Circuits Conference, Feb. 5, 2001, Stanford University, Stanford, CA.

Evgeny Artyomov, Yair Rivenson, Guy Levi, Orly Yadid-Pecht, Morton (Z) Scan Based Real-Time Variable Resolution CMOS Image Sensor, IEEE, pp. 145-148, 2004.

Evgeny Artyomov, Yair Rivenson, Guy Levi, Orly Yadid-Pecht, Morton (Z) Scan Based Real-Time Variable Resolution CMOS Image Sensor, IEEE Transactions on Circuits and Systems For Video Technology, Jul. 2005, pp. 947-952, vol. 15, No. 7.

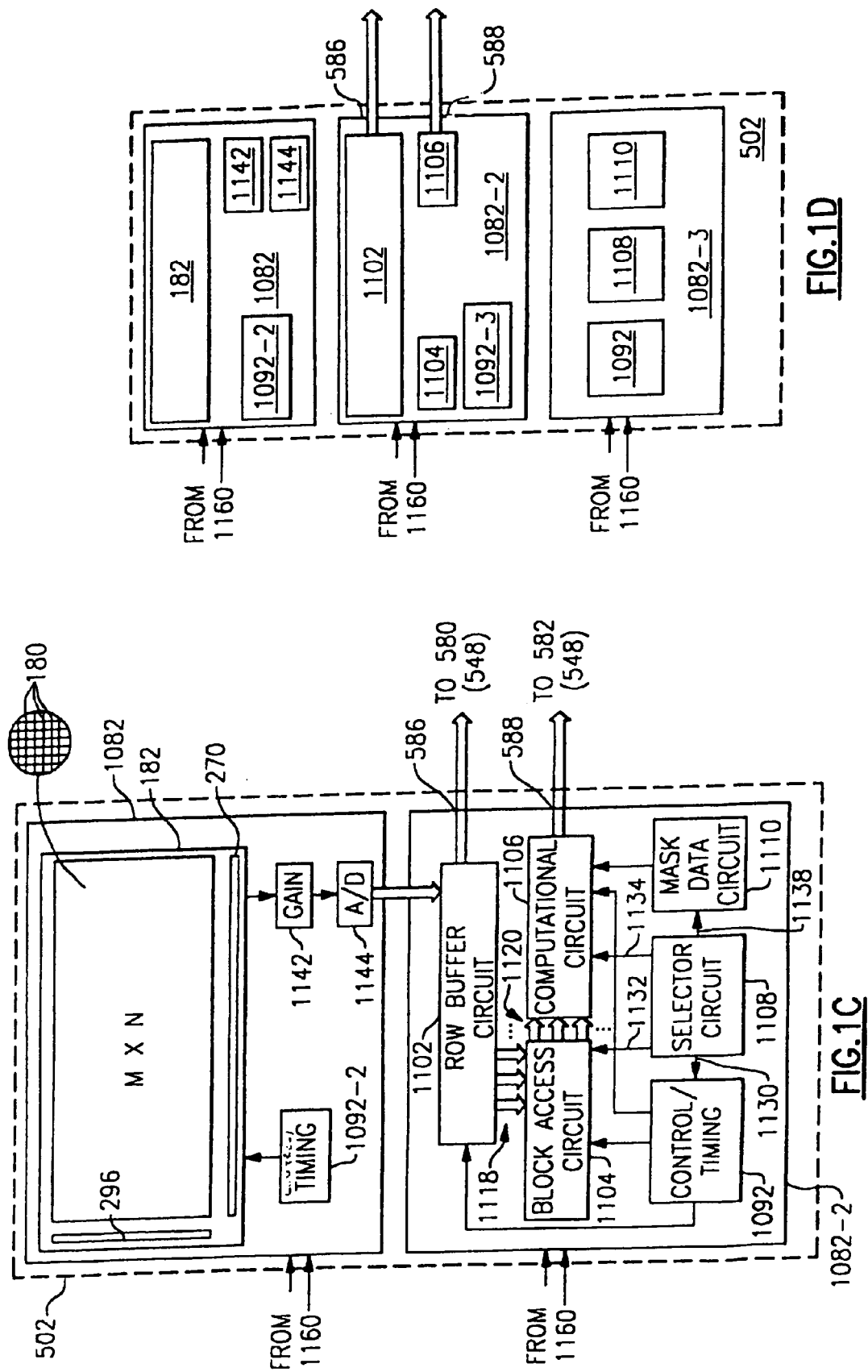

GAUSSIAN $$\text{sigma}=1 \ : \begin{bmatrix} 2 & 4 & 2 \\ 4 & 8 & 4 \\ 2 & 4 & 2 \end{bmatrix}$$

FIG.4A

GAUSSIAN $$\text{sigma}=0.7 \ : \begin{bmatrix} 1 & 4 & 1 \\ 4 & 12 & 4 \\ 1 & 4 & 1 \end{bmatrix}$$

FIG.4B

GAUSSIAN $$\text{sigma}=0.5 \ : \begin{bmatrix} 0 & 3 & 0 \\ 3 & 20 & 3 \\ 0 & 3 & 0 \end{bmatrix}$$

FIG.4C

LAPLACIAN $$\text{alpha}=1 \ : \begin{bmatrix} 8 & 0 & 8 \\ 0 & -32 & 0 \\ 8 & 0 & 8 \end{bmatrix}$$

FIG.4D

LAPLACIAN $$\text{alpha}=0.6 \ : \begin{bmatrix} 6 & 4 & 6 \\ 4 & -40 & 4 \\ 6 & 4 & 6 \end{bmatrix}$$

FIG.4E

LAPLACIAN $$\text{alpha}=0.4 \ : \begin{bmatrix} 5 & 7 & 5 \\ 7 & -48 & 7 \\ 5 & 7 & 5 \end{bmatrix}$$

FIG.4F

LOG $$\text{sigma}=1 \ : \begin{bmatrix} 6 & -1 & 6 \\ -1 & -20 & -1 \\ 6 & -1 & 6 \end{bmatrix}$$

FIG.4G

LOG $$\text{sigma}=0.8 \ : \begin{bmatrix} 12 & 0 & 12 \\ 0 & -48 & 0 \\ 12 & 0 & 12 \end{bmatrix}$$

FIG.4H

LOG $$\text{sigma}=0.7 \ : \begin{bmatrix} 16 & 5 & 16 \\ 5 & -84 & 5 \\ 16 & 16 & 16 \end{bmatrix}$$

FIG.4I

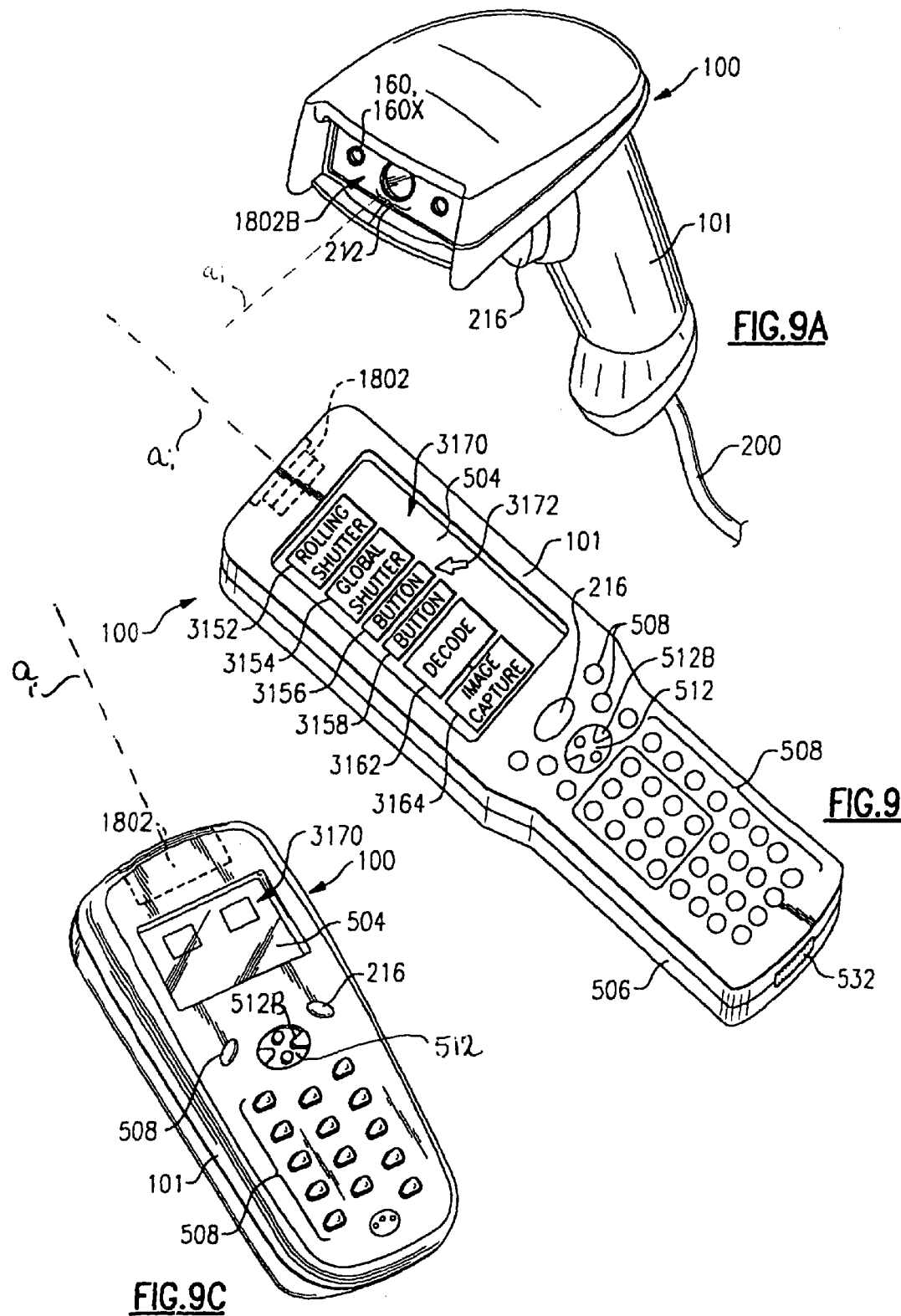

INDICIA READING APPARATUS HAVING IMAGE SENSING AND PROCESSING CIRCUIT

CROSS REFERENCE

This application claims priority under 35 U.S.C. §119(e) to Provisional Patent Application No. 60/814,950, entitled "Indicia Reading Apparatus Having Reduced Trigger-To-Read Time" filed Jun. 19, 2006 and to Provisional Patent Application No. 60/812,636, entitled "Indicia Reading Apparatus Having Reduced Trigger-To-Read Time" filed Jun. 9, 2006. Each of the above provisional applications is incorporated herein by reference. This application is also related to U.S. Patent Application (not yet assigned) entitled "Indicia Reading Apparatus Having Reduced Trigger-To-Read Time" filed Oct. 10, 2006 which is incorporated herein by reference.

FIELD OF THE INVENTION

The present invention relates to sensing apparatuses in general and in particular to an image sensing apparatus which in one embodiment can incorporate indicia decoding functionality.

BACKGROUND OF THE PRIOR ART

Users of indicia reading apparatuses such as bar code reading apparatuses have always rated as an important factor in determining overall satisfaction with an apparatus the "snappiness" of operation—how fast a decoded message is output after reading is initiated. The time to output a decoded message after receipt of a trigger signal can be referred to as the trigger-to-read (TTR) time.

In order achieve snappiness of operation, designers of reading apparatuses have implemented designs wherein several frames of image data are captured and subjected to processing in succession one after another over a short time period. If processing of a first frame to be subject to a decode attempt fails, another captured frame is processed, and then another until an indicia is successfully decoded. While a succession of frames are being captured and subject to decoding, a user may be moving the apparatus (which may be hand held) into a position wherein a higher quality image may be captured.

Providing an apparatus which repeatedly captures and attempts to decode images has significant advantages. However, challenges continue to be noted with presently available indicia reading apparatuses. Some of the challenges faced by designers of indicia reading apparatuses have been imposed by technological advances.

For example, with advances made in circuitry and software design, including those by the assignee Hand Held Products, Inc. reading apparatuses are now capable of reading indicia formed on substrates at increasingly long range reading distances. At longer reading distances, fewer light rays projected by an on board lighting assembly of a reading apparatus (where present) are able to reach and be reflected from a target substrate. Because of the increased depth of field available with currently available reading apparatuses such as the IT4XXX imaging module, poor illumination reading conditions are more commonly encountered. For battery conservation purposes and for cost purposes, it has been a goal of designers or reading apparatuses to decode indicia such as bar codes with little even no artificial illumination.

In addition, with respect to image sensor based reading apparatuses, image sensors continue to grow in density. Fabrication technologies exists for making high density (e.g., million plus pixel) image sensors at low cost. Such image sensors generate more image data, which consumes additional processing time.

There remains a need to read bar codes and other decodable indicia quickly in normal operating conditions and in an expanding range of operating conditions.

BRIEF DESCRIPTION OF THE DRAWINGS

For a further understanding of these and objects of the invention, reference will be made to the following detailed description of the invention which is to be read in connection with the accompanying drawing, where:

FIG. 1b is a block diagram illustrating an alternative embodiment of the apparatus shown in FIG. 1a.

FIG. 1c and 1d are block diagrams illustrating alterative embodiments of an image sensing and processing circuit.

FIG. 2a is a perspective view of an imager sensing and processing circuit in one embodiment.

FIG. 3a is a representation of a set of pixel values making up a frame of image data to a subset of pixels within the set of pixels illustrated in FIG. 3a.

FIG. 3b illustrates a 3×3 mask kernel which can be applied to image data by an image sensing and processing circuit.

FIGS. 4a-4c show several alternative embodiments of Gaussian filter masks that can be incorporated into an apparatus for performance of digital filtering of image data.

FIGS. 4d-4f show several alternative embodiments of Laplacian filter masks that can be incorporated into an apparatus for performance of digital filtering of image data.

FIG. 4g-4 shows several alternative embodiments of Laplacian of Gaussian (LoG) filter masks that can be incorporated into an apparatus for performance of digital filtering of image data.

FIG. 8b and 8c are front and side views, respectively, of the imaging module shown in FIG. 8a.

FIG. 8d shows an illumination and aiming pattern which may be projected by an apparatus.

FIG. 8e is a top view of an alternative imaging module incorporating a laser based aiming pattern generating system.

FIG. 8f is a front view of a polarizer plate which may be included as part of an imaging module herein, e.g., the imaging module shown in FIG. 8a.

FIG. 9a and 9b are physical form views of various hand held apparatuses.

FIG. 9c is a perspective view of a hand held mobile telephone (a "cell phone") which can incorporate the features described herein.

DESCRIPTION OF THE INVENTION

I. Overview

There is provided in one embodiment an indicia reading apparatus with enhanced functionality which can filter image data prior to the capture of image data into an image frame memory for further processing. In one aspect the indicia reading apparatus can have an image sensing and processing circuit that can contemporaneously output, on respective first and second interfaces, both filtered and raw pixel values so that both filtered and raw frames of image data can be captured contemporaneously for further processing. Filtered and raw frames of image data or pixel values can also be serially output through a single interface in an interleaved manner. An image sensing and processing circuit which outputs either or both raw and filtered pixel values can be provided on a single integrated circuit. In another aspect an image sensing and processing circuit can be provided that develops data indicating a location of a decodable indicia representation within image data prior to capture of a frame of image data into an image frame memory so that when pixel values are first addressed for further processing, a decodable indicia representation such as a bar code representation has already been located. By processing of image data within an image processing circuit prior to capture into an image frame memory a trigger to read time (TTR) can be reduced.

II. System Diagram

Figure 1A:
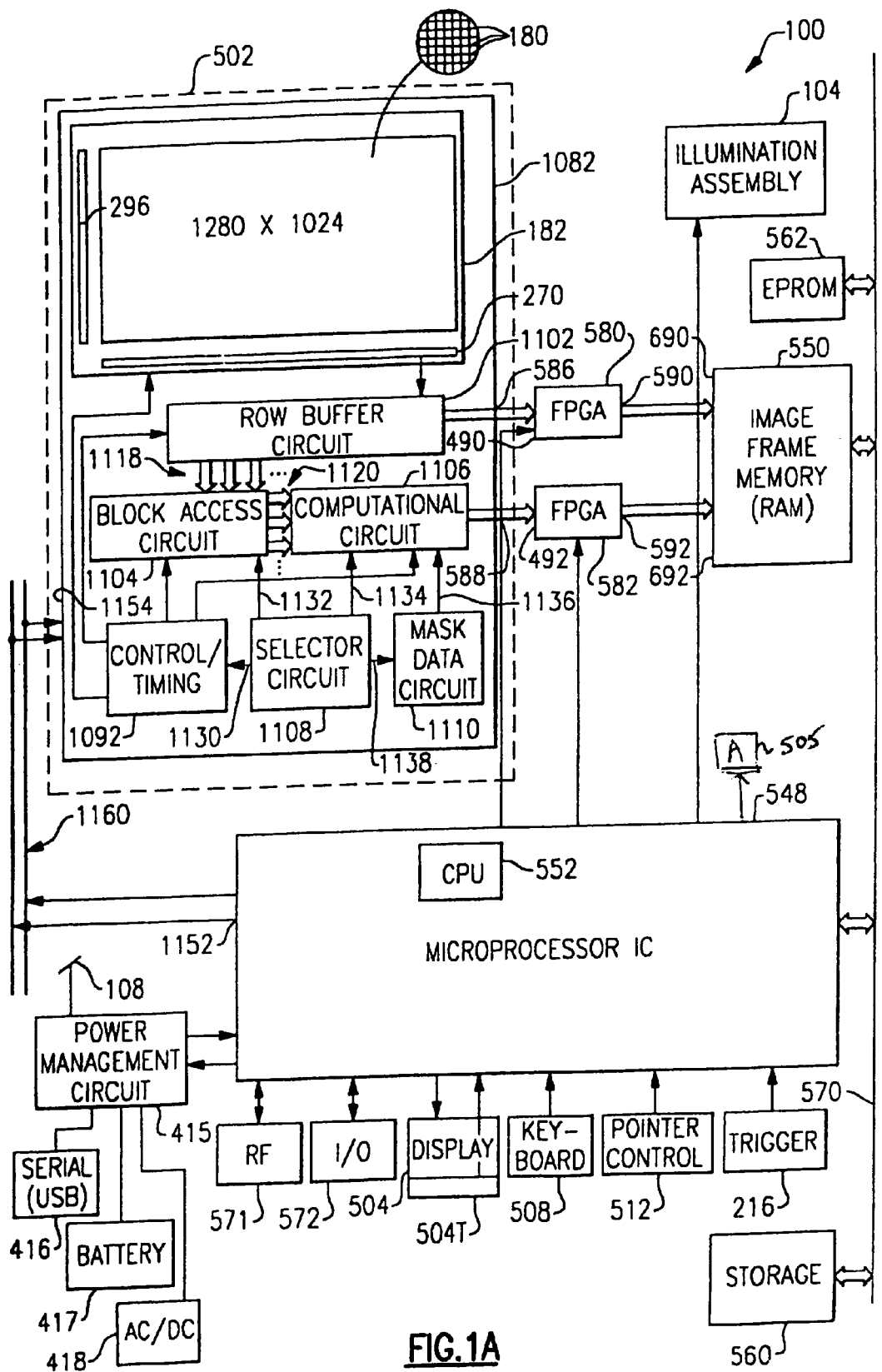
FIG. 1a is a block electrical diagram of an apparatus for reading decodable indicia.

A block electrical diagram for indicia reading apparatus 100 is shown in FIG. 1a. Indicia reading apparatus 100 can include an image sensing and processing circuit 502, an image frame memory 550 typically provided by a RAM memory device and a microprocessor integrated circuit 548 including CPU 552, typically provided on an integrated circuit chip. Apparatus 100 under the control of microprocessor IC 548 captures image data into image frame memory 550 and subjects such image data to further processing e.g., for bar code data decoding, optical character recognition decoding or for outputting a visual display frame of image data. Apparatus 100 can also include a program memory such as EPROM 562, and a storage memory 560 such as may be provided by a hard drive and illumination assembly 104. In communication with microprocessor integrated circuit 548 can be various communication interfaces such as RF interface 571 which can be provided by e.g., an IEEE 802.11 radio transceiver or a Bluetooth transceiver and I/O interface 572 which can be provided by e.g., Ethernet interface. Apparatus 100 can also include a plurality of user interface devices in communication with micro processor IC 548 such as keyboard 508, pointer controller 512 and trigger 216 as are shown in the physical form views. Apparatus 100 can also include an output interface 504, e.g., a display, having over laid thereon a touch panel 504T which forms another user data input interface. Microprocessor IC 548, image frame memory 550, EPROM 562 and storage memory 560 can be in communication by way of system bus 570. Apparatus 100 can also include a power management circuit 415 which supplies power to circuit boards 108 of apparatus 100 and receives power from one of three power sources; namely, serial power source 416 (e.g., USB), a battery power source 417, normally a rechargeable battery and a transformer based AC/DC power source 418. For reading a battery charge level of battery 417, apparatus 100 can read data from power management circuit 415, which can be configured to sense a battery charge level of battery 417.

In general, image sensing and processing circuit 502 can be configured to read out image signals from pixels 180 of image sensor array 182 digitize such signals into pixel values and to output pixels to said image frame memory 550 for capture into image frame memory 550, where the image data can be addressed for reading and further processing by microprocessor IC 548. Because microprocessor IC 548 can address pixel values retained in image frame memory 550, image frame memory 550 can be regarded as a microprocessor addressable image frame memory. In response to one or more commands, signals received from microprocessor IC 548, image sensing and processing circuit 502 can be configured to read out image signals and output pixel values pixel by pixel and row by row until a frame of image data is captured into image frame memory 550. After image data is captured into image frame memory 550, the image data may be processed by an indicia decoding circuit such as a bar code decoding circuit. An indicia decode circuit can be provided by microprocessor IC 548 appropriately programmable and operating in accordance with a program stored in EPROM 562. For decoding of decodable indicia, microprocessor IC 548 in accordance with the requirements of an active decoding program can address image data retained in image frame memory 550 for purposes of decoding such image data. Apparatus 100 can be configured so that a set of indicia decoding programs stored in EPROM 562 can be added to, reduced, or replaced. For example, decoding programs can be transferred from an external computer apparatus as are shown and described with reference to FIG. 10 to apparatus 100 over interface 571 or interface 572.

For decoding of a 1D bar code microprocessor IC 548 can execute the following processes. First, microprocessor IC 548 can launch a scan line in a frame of image data, e.g., at a center of a frame, or a coordinate location determined to include a decodable indicia representation. Next, microprocessor IC 548 can perform a second derivative edge detection to detect edges. After completing edge detection, microprocessor IC 548 can determine data indicating widths between edges. Microprocessor IC 548 can then search for start/stop character element sequences, and if found, derive element sequence characters character by character by comparing with a character set table. For certain symbologies, microprocessor IC 548 can also perform a checksum computation. If microprocessor IC 548 successfully determines all characters between a start/stop character sequence and successfully calculates a checksum (if applicable), microprocessor IC 548 can output a decoded MESSAGE. When outputting a decoded message, a microprocessor IC 548 can one or more of (a) initiate transfer of the decoded message to an external device, (b) initiate display of a decoded message on a display of apparatus 100, and (c) attach a flag to a buffered decoded message determined by microprocessor IC 548. At the time of outputting a decoded message, microprocessor IC 548 can send a signal to acoustic output device 505 to emit a beep.

Referring again to the block diagram of FIG. 1a further aspects of image sensing and processing circuit 502 in one embodiment are described. Image sensing and processing circuit 502 can comprise image sensor array 182 comprising a plurality of pixels formed in a plurality of rows and a plurality of columns of pixels, row circuitry 296 and column circuitry 270. Image sensor array 182 can be monochrome or color and can have physical filters formed thereon in the form of standard RGB filter or physical filters in the form described in 283 465.11 NP, U.S. patent application Ser. No. 11/174,447, Digital Picture Taking Optical Reader Having Hybrid Monochrome And Color Image Sensor Array, filed Jun. 30, 2005 incorporated herein by reference. Column circuitry 270 can incorporate a readout circuit for reading out of image signals, typically in the form of analog voltages from pixels 180 of image sensor array 182. In one embodiment, image sensor array 182 is a CMOS image sensor array.

Further referring to image sensing and processing circuit 502, image sensing and processing circuit 502 can be configured to enable filtering of image data prior to capture of image data into image frame memory 550, locating of decodable indicia representations prior to capture of image data into image frame memory 550, and selection between various operating configurations. Image sensing and processing circuit 502 can include a row buffer circuit 1102 for buffering image data corresponding to a plurality of rows of pixels of image sensor array 182, a block access circuit 1104, a computational circuit 1106, a selector circuit 1108 together with control and timing circuit 1092.

For a reduction of chip size, row buffer circuit 1102 can be a multi-row analog sample and hold circuit. Row buffer circuit 1102 can also be a digital buffer circuit for buffering digital pixel values. Where row buffer circuit 1102 is a digital buffer, row buffer circuit 1102 can incorporate an analog-to-digital converter (ADC) for digitizing analog pixel voltages read out from pixels 180 of image sensor array 182 by the above mentioned readout circuit into the form of pixel intensity values, or "pixel values." A single ADC can be incorporated in a first pipe from column circuitry 270 to a first row buffer of row buffer circuit 1102 and the digital pixel values can ripple to the remaining row buffers of row buffer circuit 1102 without re-digitizing. Pixel values buffered by row buffer circuit 1102 can be multibit in size, e.g., 8 bit. Where pixels 180 are monochrome, pixel values corresponding to pixels 180 can be referred to as gray scale pixel values. Where pixels 180 have color filters, pixel values corresponding to pixels 180 can be referred to as color scale values. Row buffer circuit 1102 can buffer partial rows of image data, substantially complete rows of image data or complete rows of image data. In one embodiment, row buffer circuit 1102 can buffer pixel values corresponding to and representing light incident on three rows of pixels of image sensor array 182. In one embodiment row buffer circuit 1102 buffers pixel values corresponding to and representing light incident on N rows of pixels of array. In a further aspect, image sensing and processing circuit 502 can be configured to output raw pixel values from row buffer circuit 1102. Image sensing and processing circuit 502 can be configured to output raw pixel values from row buffer circuit 1102 pixel by pixel and row by row until all pixel values making up an output frame of image data have been output.

Image sensing and processing circuit 502 also can include block access circuit 1104 which accesses blocks of image data from row buffer circuit 1102. Referring to further aspects of block access circuit 1104 block access circuit 1104 accesses image data from row buffer circuit 1102 and can present pixel values to computational circuit 1106. So that image sensing and processing circuit 502 can output at interface 588 pixel values at a rate of one pixel value per pixel clock, block access circuit 1104 can read out a plurality of pixel values from row buffer circuit (where digital) 1102 in parallel as is indicated by array 1118 of byte outputs. Similarly, block access circuit 1104 can present a plurality of multibit pixel values to computational circuit 1106 in parallel as is indicated by byte outputs 1120. Block access circuit 1104 can access and present blocks of pixel values in e.g., 3×3 block or N×N blocks.

With further reference to image sensing and processing circuit 502 image sensing and processing circuit 502 can include control/timing circuit 1092, selector circuit 1108 and mask data circuit 1110. In response to one or more commands, e.g., a trigger command received from microprocessor IC 548, control/timing circuit 1092 can send exposure control, reset and readout signals to image sensor array 182 for effecting image signal readout of pixels of image sensor array 182. In one embodiment, microprocessor IC 548 can receive a trigger signal initiated by a user, e.g., by actuation of trigger 216, and microprocessor IC 548 can responsively send a corresponding trigger command to image sensing and processing circuit 502. As is indicated by the various control lines extending from control/timing circuit 1092, control/timing circuit 1092 can be in communication with row buffer circuit 1102, block access circuit 1104 and computational circuit 1106. In one embodiment, microprocessor IC 548 and image sensing and processing circuit 502 can have respective $I^2C$ interfaces 1152, 1154 which can be in communication by way of $I^2C$ bus 1160. Microprocessor IC 548 can send various commands to image sensing and processing circuit 502 over $I^2C$ bus 1160, e.g., reset commands, exposure setting commands, sleep commands, and the like. Microprocessor IC 548 can also send filter mask kernel data and other configuration data to image sensing and processing circuit 502 over $I^2C$ bus 1160. Apparatus 100 can be configured so that a trigger signal is received e.g., when a trigger 216 is actuated, when a trigger command is received from an external device initiated by a user of the external device, when the apparatus 100 is powered up or when the presence of an object in the field of view of image sensor array 182 is detected. Apparatus 100 can be configured so that microprocessor IC 548 receives a trigger signal, e.g., responsively to an initiation received by way of manual actuation of trigger 216 in communication with microprocessor IC 548, responsively to a trigger command received from an external device initiated by a user of the external device, or responsively to a detection of an object in the field of view of image sensor array 182.

When outputting a frame of image data, apparatus 100 may output pixel values corresponding to all or less than all pixels 180 of an image sensor array 182. Pixels of image sensor array 182 can be selectively addressed for readout so that image signals corresponding to less than all pixels of array 182 are read out. A frame rate can be increased (and a frame period can be decreased) by reading out image signals corresponding to less than all pixels of image sensor array 182. Also, image sensing and processing circuit 502 can be configured to refrain from digitizing each pixel light representing image signal that is read out from image sensor array 182. During a frame readout period image signals corresponding to charges at all or less than all of the pixels of array 182 can be read out. Image sensing and processing circuit 502 when outputting a frame of pixel values can output pixel values corresponding to less than all pixels of the image sensor array 182 when, for example, less than all of the pixels of the array have been selectively addressed for readout, or when image sensing and processing circuit 502 has refrained from developing a pixel value for each pixel light representing image signal that has been read out of array. When outputting pixel values representing light incident at less than all pixels of an array 182 image sensing and processing circuit 502 can nevertheless output a set of pixel values representing a two dimensional area, e.g., a two dimensional area representing a bar code or other decodable indicia disposed on a substrate. The set of pixel values can correspond to less than all pixels of image sensor array 182, but nevertheless can correspond to a contiguous grouping of pixels representing a two dimensional area.

Image sensor array 182 has been described herein as a two dimensional image sensor array. Image sensor array 182 can also be a one dimensional image sensor array, having, e.g., 1280×1 or 1280×2 (2 rows) of pixels. While image sensing and processing circuit 502 can output a frame of image data made up of pixel values corresponding to a contiguous 2D grouping of pixels representing a 2D area, image sensing and processing circuit 502 can also output a frame of image data made up of pixel values corresponding to linear groups of pixels (e.g., pixel values corresponding to a row of pixels or a pair of rows, or a diagonal row). Where image sensing and processing circuit 502 outputs a linear frame of image data, image sensing and processing circuit 502 can include either a 1D or 2D image sensor array 182.

A frame of image data captured into image frame memory 550 can include a set of pixel values corresponding to pixels of image sensor array 182. Each pixel value of a frame of image data can represent light at a certain pixel of the image sensor array 182 and a pixel value that represents light at a certain pixel can be regarded as pixel value corresponding to the certain pixel. Apparatus 100 including image frame memory 550 can be configured so that the set of pixel values making up a frame of image data are simultaneously retained in image frame memory 550. The pixels of image sensor array 182 to which a set of pixel values correspond can be a contiguous grouping of pixels, i.e. a set of pixels wherein each pixel is adjacent (right left up down or corner adjacent to at least one other pixel of the set). A set of pixel values corresponding to a contiguous grouping of pixels can be regarded as a contiguous set of pixel values. A set of pixel values making up a frame of image data can represent a 2D area of a substrate such as a substrate bearing a decodable indicia, or a 1D slice region of a substrate bearing a decodable indicia. An exemplary set of pixel values representing a 2D area would be a set of pixel values corresponding to each pixel of a two dimensional image sensor array or to a set of pixels of a two dimensional image senor array defining a two dimensional area. An exemplary set of pixel values representing a 1D slice region of a substrate would be a set of pixels corresponding to a single row of pixels of a one dimensional or two dimensional image sensor array.

Regarding selector circuit 1108 apparatus 100 can be configured so that selector circuit 1108 is responsive to user-initiated commands received from microprocessor IC 548 over I²C bus 1160. In one embodiment, bar code reading apparatus 100 can be configured so that a user can change an operating configuration of bar code reading apparatus 100 effecting operation of image sensing and processing circuit 502. For enabling a user to change an operating configuration apparatus 100 can be configured so that when a user enters with the apparatus in an appropriate time (such as a state in which a menu is presented) control signals using a user interface, e.g., interface 504T, 508, 512, 216, microprocessor IC 548 sends an appropriate configuration change command to configuration selector circuit 1108. As is indicated by control lines 1130, 1132, 1134, 1136, 1138 configuration selector circuit 1108 can reconfigure one or more of control/timing circuit 1092, block access circuit 1104, computational circuit 1106 and mask data circuit 1110 in response to receipt of a configuration change command. Referring to mask data circuit 1110 mask data circuit 1110 can store one or plurality of candidate masks e.g., a Laplacian mask, a Gaussian mask, an LoG mask, an LoG mask with a different set of parameters, etc. Mask data circuit 1110 can send a selected mask to computational circuit 1106 for use by computational circuit 1106 in calculating filtered pixel values. However, in some use cases, mask data circuit 1110 need not send any mask data to computational circuit 1106. For example, where computational circuit 1106 is configured in a configuration in which computational circuit 1106 is to perform mean or median filtering only, mask data circuit 1110 need not send mask data to computational circuit 1106. In one embodiment, each of image sensor array 182, row buffer circuit 1102, block access circuit 1104, computational circuit 1106, control/timing circuit 1092, configuration selector circuit 1108 (selector circuit) and mask data circuit 1110 can be integrated on a single integrated circuit 1082. Also, FPGA 580, 582 can be incorporated into integrated circuit 1082. The circuit design of image sensing and processing circuit 502 can be optimized with use of suitable silicon compiler software.

Figure 1B:
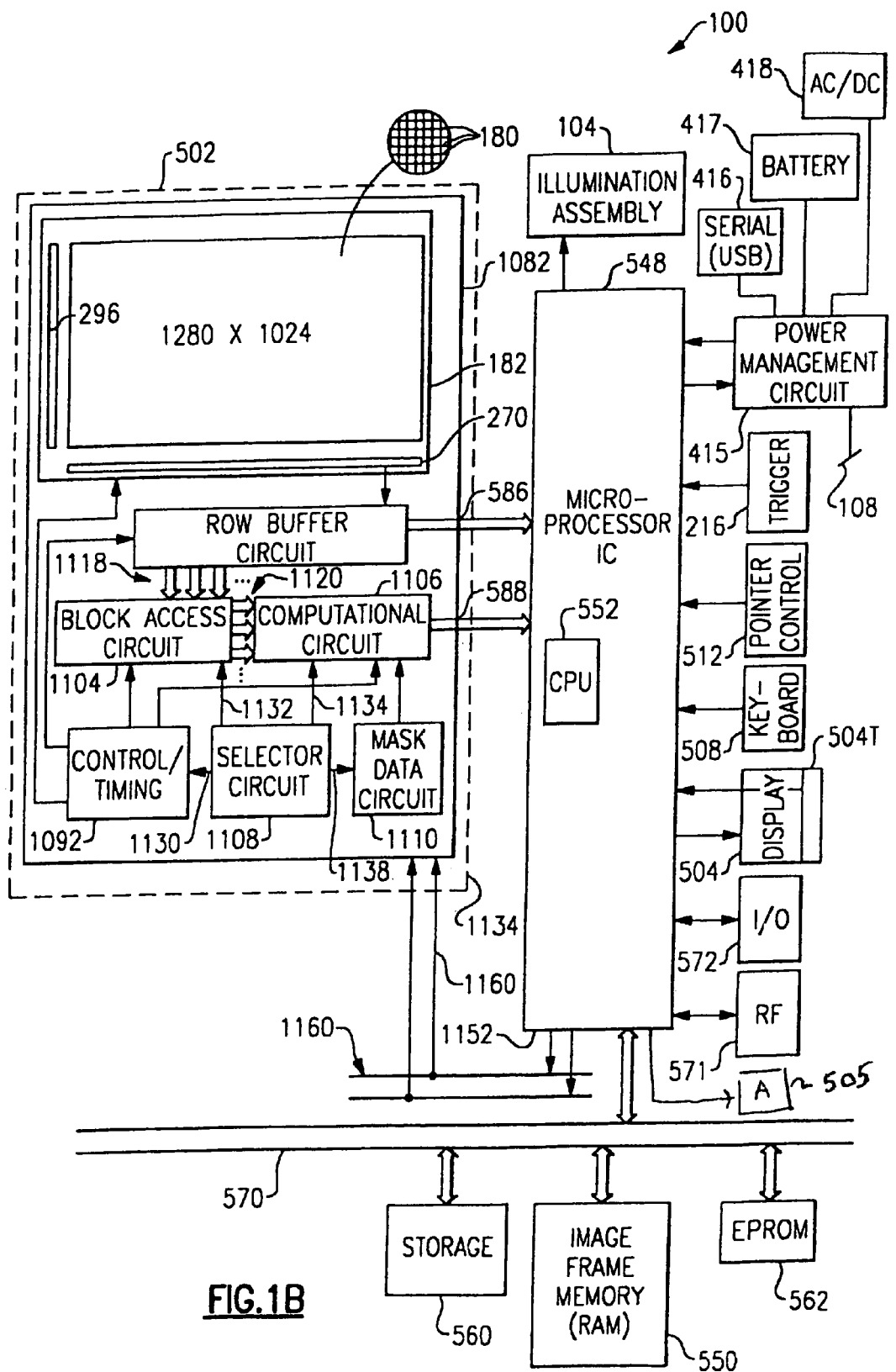

Apparatus 100 can be configured so that image sensing and processing circuit 502 outputs various data, including image data for capture into image frame memory 550. For outputting data for capture into image frame memory 550, image sensing and processing circuit 502 can output data to FPGAs 580, 582 as indicated in FIG. 1a. FPGA 580 and FPGA 582 provide direct memory access (DMA) functionality, allowing pixel values or other data to be captured into image frame memory 550. DMA circuits can buffer image data and transmit buffered image data in bursts to an image frame memory or bus for input into image frame memory 550. At the output interface 590 of FPGA 580 there can be repeated the output at output interface 586 of image sensor IC 1082. Similarly, at output interface 592 of FPGA 582 there can be repeated the output at output interface 588 of image sensor IC 1082. In the embodiment of FIG. 1a, image frame memory 550 is shown as being provided by a multi-port RAM. DMA circuitry can also be incorporated into microprocessor IC 548. An example of microprocessor IC having integrated DMA frame grabbing circuitry is the XSCALE PXA27X processor with "Quick Camera Interface" available from Intel. In the embodiment of FIG. 1b, microprocessor IC 548 incorporates DMA frame grabbing circuitry for receiving image data and other data from one or more of interfaces 586 and 588 of image sensing and processing circuit 502 and transferring such image data to image frame memory 550 by way of system bus 570.

In the embodiment of FIG. 1a and 1b, the components of image sensing and processing circuit 502 are incorporated on the single integrated circuit; namely integrated circuit 1082. The components of image sensing and processing circuit 502 can also be distributed among more than one integrated circuits.

In the embodiment of FIG. 1c, image sensing and processing circuit 502 can include two integrated circuits, namely image sensor integrated circuit 1082, and integrated circuit 1082-2. Image sensor integrated circuit 1082 can include additional control and timing circuit 1092-2, gain block 1142 and analog to digital converter 1144. Integrated circuit 1082-2 can include row buffer circuit 1102, block access circuit 1104, computational circuit 1106, control/timing circuit 1092, configuration selector circuit 1108 and mask data circuit 1110 as described herein.

In the embodiment of FIG. 1*d*, image sensing and processing circuit 502 can include three integrated circuits; namely image sensor integrated circuit 1082, integrated circuit 1082-2 and integrated circuit 1082-3. Integrated circuit 1082 can include the component described with reference to FIG. 1*c*. Integrated circuit 1082-2 can incorporate row buffer circuit 1102, block access circuit 1104, computational circuit 1106 and additional control/timing circuit 1092-3 while integrated circuit 1082-3 can include control/timing circuit 1092 selector circuit 1108 and mask data circuit 1110.

In the embodiment of FIGS. 1*c* and 1*d* image sensor integrated circuit 1082 can be provided by a commercially available off-the-shelf image sensor integrated circuit such as an MT9V022 or MT9M413 (monochrome or color) image sensor integrated with TRUESNAP global electronic shutter of the type available from MICRON, Inc.

Apparatus 100 has been described as indicia reading apparatus for reading decodable indicia such as bar codes and Optical Character Recognition (OCR) characters. Also, combinations of elements of apparatus 100 can find use outside of an indicia decoding application. Exemplary image data processing functionality which can be incorporated into apparatus 100 is described in U.S. patent application Ser. No. 10/958,779 (now U.S. Patent Publication No. 2006/0071081) incorporated herein by reference.

III. Pre-Memory Filtering

In one aspect, image sensing and processing circuit 502 can be configured to digitally filter pixel values making up a frame of image data prior to capture of the pixel values into image frame memory 550. Alternatively, raw pixel values can be output by image sensing and processing circuit 502 for capture into image frame memory 550 and microprocessor IC, 548 under control of an appropriate program, can digitally filter pixels after capture into image frame memory 550. By configuring image sensing and processing circuit 502 to filter pixel values prior to capture into image frame memory 550 decoding speed is significantly increased.

Figures 2A, 3A, 3B:
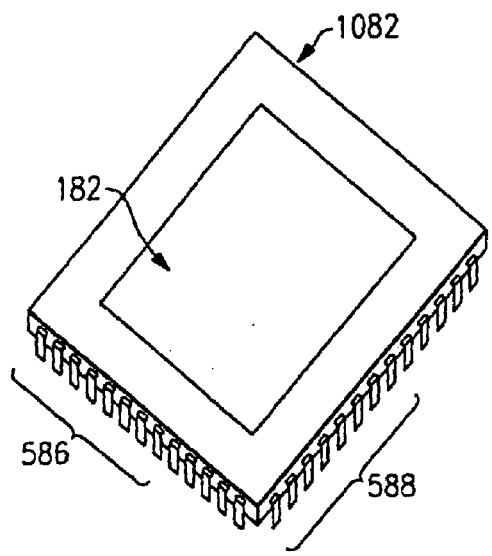

Computational circuit 1106 where configured to perform digital filtering, can filter pixel values and can output filtered pixel values. Several types of digital filter processes can be carried by application of digital masks. For example, Gaussian, Laplacian, and LoG filtering can be carried out by convolving a block of pixels with a predetermined mask having a dimension (3×3, 4×4) equal to the dimension of the block of pixels. Where image sensor array 182 is a linear image sensor array, linear kernels, e.g., N×1 kernels can apply for filtering. When configured to carry out Gaussian filtering computational circuit 1106 can convolve for each pixel value output by circuit 502 making up a frame of image data, a block of pixel values received from block access circuit 1104 with a Gaussian mask. When configured to carry out Laplacian filtering, computational circuit 1106 can convolve for each pixel value output by circuit 502 making up a frame of image data, a block of pixel values received from block access circuit 1104 with a Laplacian mask. When configured to carry out LoG filtering, computational circuit 1106 can convolve for each pixel value output by circuit 502 making of a frame of image data, a block of pixel values received from block access circuit 1104 with a LoG mask. For the pixel value at pixel position $P_{22}$ as shown in FIG. 3*a*, the result of convolving the pixel value at position $P_{22}$ with a 3×3 kernel as shown in FIG. 3*b* can be given by Eq. 1 below $$C_{22}=P_{11}K_{11}+P_{12}K_{12}+P_{13}K_{13}+P_{21}K_{21}+P_{22}K_{22}+P_{31}K_{31}+P_{32}K_{32}+P_{33}K_{33} \quad \text{Eq. 1}$$

Alternative candidate Gaussian filter masks are shown in FIGS. 4*a*, 4*b* and 4*c*. Alternative Laplacian filter masks are shown in FIG. 4*d*, 4*e*, and 4*f*. Alternative LoG filter masks are shown in FIGS. 4*g*, 4*h*, and 4*i*.

Computational circuit 1106 can carry out filtering processes, such as mean and median filtering, that do not require application of a digital mask (mask kernel). For carrying out mean filtering, computational circuit 1106 can average, for each pixel value output making up a frame, a block of pixels received from block access circuit 1104. For carrying out median filtering, computational circuit 1106 can sort, for each pixel value output making up a frame, the pixel values of the block and select the median value as the filtered pixel output value.

The dynamic range of filtered pixel values output at interface 588 can be expected to change when filter masks having different sets of parameters are applied to pixel values prior to capture into image frame image memory 550. Apparatus 100 can be configured so that a user may adjust a format of image data output at interface 588 by way of inputting commands into a user interface or apparatus 100. With apparatus 100 configured so that a user can adjust a format of image data at interface 588, a user may adjust a format of image data output at interface 588 to a floating point format, e.g., IEEE 754 Floating Point format, if a user expects application of a certain digital filter mask to result in a set of pixel values having a large dynamic range to be output at interface 588. When image sensing and processing circuit 502 adjusts a format of pixel values being output, it can also output data for reading by microprocessor IC 548 indicating that a format of pixel value has been changed.

In one embodiment image sensing and processing circuit 502 can be configured to monitor a dynamic range of a set of pixel values being output at interface 588 and to automatically adjust a pixel value format of output pixel values to a floating point format, e.g., IEEE 754 Floating Point, if image sensing and processing circuit 502 determines that a dynamic range of a set of pixel values has exceeded a predetermined dynamic range. When image sensing and processing circuit 502 adjusts a format of pixel values being output, it can also output data for reading by microprocessor IC 548 indicating the present format of output pixel values.

While image sensing and processing circuit 502 can be configured to filter pixel values making up frame of image data, image sensing and processing circuit 502 need not filter any pixel values and in one embodiment, processes image data only to the extent that it passes pixel values for output through an output interface. In one embodiment, image sensing and processing circuit 502 can include a single output interface for outputting raw pixel values.

IV. Parallel Raw and Filtered Frame Output

In another aspect, image sensing and processing circuit 502 can be configured to contemporaneously output for capture into image frame memory 550 two frames of image data; one raw frame of image data and one filtered frame of image data. For contemporaneously outputting two frames of image data, image sensing and processing circuit 502 can, e.g., simultaneously output two frames, e.g., so that there is at least some overlap in the periods during which the frames are being output at respective first and second interfaces, and/or can synchronously output image data by utilizing a common pixel clock to output image data, e.g., raw and filtered pixel values making up two different frames. The frames of image data can be output within a single frame period. Where image sensing and processing circuit 502 contemporaneously outputs two frames of image data, microprocessor IC 548 is provided with fast access (i.e., capacity to address) to both raw and filtered image data. During the time that microprocessor IC 548 is contemporaneously capturing two frames of image data, image sensing and processing circuit 502 contemporaneously outputs both raw pixel values representative of light incident on pixels of array 182 and filtered pixels values representative of digitally filtered light incident on pixels of array 182. In a further aspect as shown in FIG. 1 a image sensing and processing circuit 502 can have dual pixel value output interfaces; namely first output interface 586 for outputting raw pixel values and second output interface 588 for outputting filtered pixel values. Image sensing and processing circuit 502 can contemporaneously output raw and filtered pixel values at interfaces 586, 588, e.g., by outputting raw and filtered pixel values simultaneously with at least some overlap in the output times and/or synchronously using a common pixel clock to clock out pixel values at interface 586 and interface 588 respectively. When outputting image data, interfaces 586, 588 can be regarded as image data output interfaces. Image sensing and processing circuit 502 can be configured to continuously output, in parallel "pairs" of contemporaneously output raw and filtered frames of image data. Each of interface 586, 588 can be alternatively termed a "bus" a "port" a "set of contacts," ("contact set" or "set of pins" ("pin set") where constituted by a set of pins. It has been mentioned that interface 590 can repeat the output at interface 586 and that interface 592 can repeat the output at interface 588. Each of interface 590 and interface 592 like interface 586 and interface 588 may alternatively be termed a "bus," a "port," a "set of contacts," ("contact set") or "set of pins" ("pin set") where constituted by a set of pins. "Pixel values" as described herein can be multibit pixel values. Where image sensor array 182 is devoid of color filters, such pixel values are commonly referred to as "gray scale" pixel values where image sensor array 182 has color filters, such pixel values are commonly referred to as color scale values when corresponding to a pixel having a physical filter.

Exemplary physical form views of interfaces 586, 588, are shown in FIG. 2a, illustrating an exemplary integrated circuit configuration in which the interfaces may be incorporated. In FIG. 1a there is shown an image sensor integrated circuit 1082 which can have a first interface 586 provided by a set of pins through which raw pixel values can be output, and a second interface 588 provided by a set of pins through which filtered pixel values or other data (such as block edge strength score data as will be described in greater detail herein) can be output.

Figure 5A:
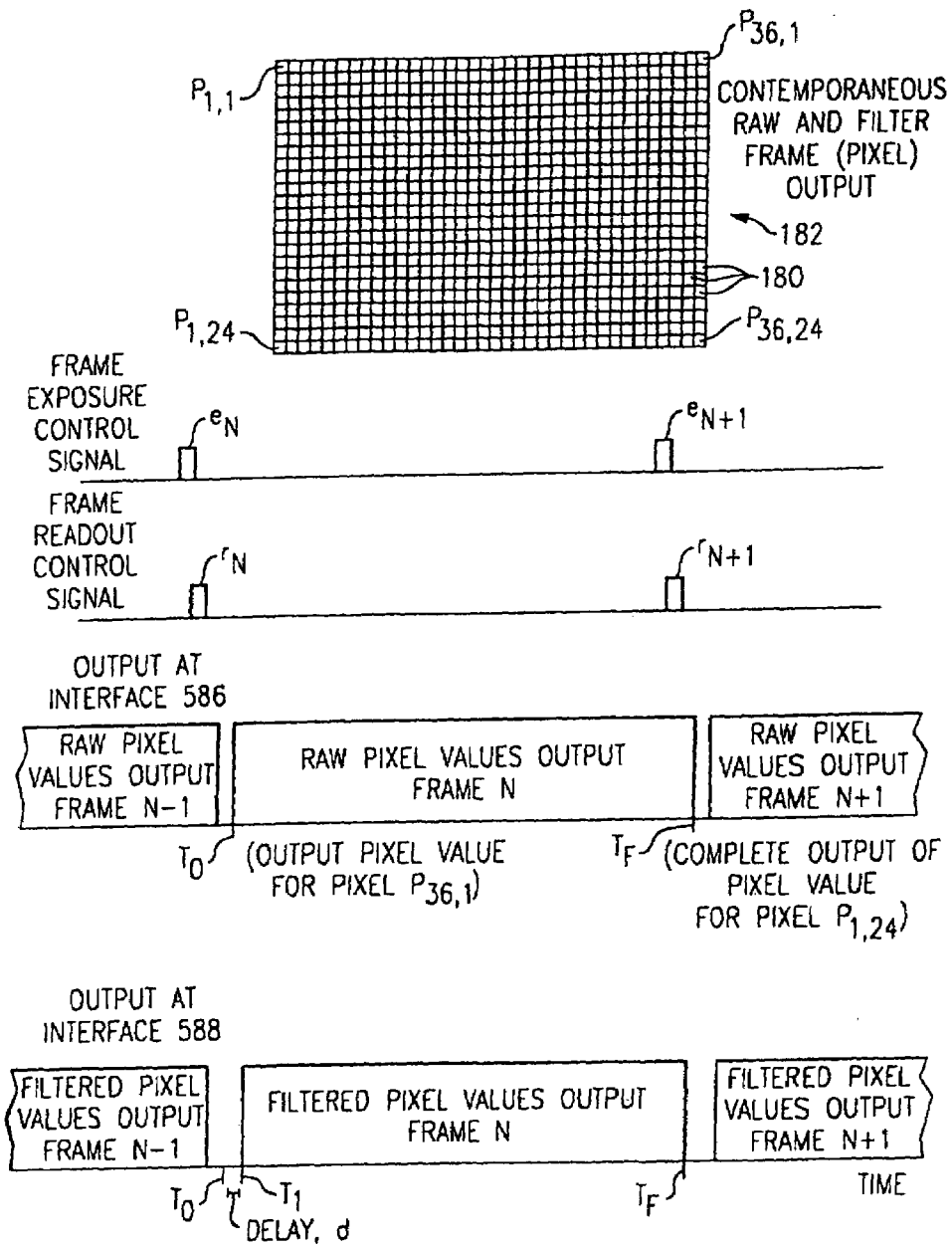
FIG. 5a shows a timing diagram illustrating operation of an apparatus operating in parallel raw and filtered frame output configuration.

A contemporaneous dual frame output configuration (which may alternatively be termed a parallel frame output configuration) is further explained with reference to the flow diagram of FIG. 5a showing exemplary timing characteristics of apparatus 100 when operating in a contemporaneous dual frame output configuration. Prior to time $T_0$ image sensor array 182 may receive a frame exposure signal $e_N$ for exposing frame N, and then receive a frame readout signal $r_N$ for reading out of image signals from image sensor array 182. Frame exposure signal $e_N$ as indicated in the timing diagram of FIG. 5a may represent a signal to initiate a full frame electronic global shutter signal where image sensor array 182 is equipped with electronic global shuttering capability, or else the signal $e_N$ of the timing diagram of FIG. 5a may represent a row exposure control signal for exposing a first row of pixels where image sensor array 182 incorporates a rolling shutter. In either case, signal $e_N$ is a signal initiating exposure of image sensor array 182. Frame readout control signal $r_N$ can represent a readout control signal to initiate readout of a first row of pixels of image sensor array 182. Aspects of indicia decoding apparatuses incorporating global electronic shutters are described in greater detail in U.S. patent application Ser. No. 11/077,975, filed Mar. 11, 2005, entitled Bar Code Reading Device With Global Electronic Shutter Control, U.S. patent application Ser. No. 11/077,976, filed Mar. 11, 2005, entitled System And Method To Automatically Focus An Image Reader, U.S. Patent Application No. 60/687,606, filed Jun. 3, 2005, entitled Digital Picture Taking Optical Reader Having Hybrid Monochrome And Color Image Sensor Array, U.S. Patent Application No. 60/690,268, filed Jun. 14, 2005, entitled Digital Picture Taking Optical Reader Having Hybrid Monochrome And Color Image Sensor Array, U.S. Patent Application No. 60/692,890, filed Jun. 22, 2005, entitled Digital Picture Taking Optical Reader Having Hybrid Monochrome And Color Image Sensor Array, U.S. Patent Application No. 60/694,371, filed Jun. 27, 2005, entitled Digital Picture Taking Optical Reader Having Hybrid Monochrome And Color Image Sensor Array and U.S. patent application Ser. No. 11/174,447filed Jun. 30, 2005, entitled Digital Picture Taking Optical Reader Having Hybrid Monochrome And Color Image Sensor Array all incorporated herein by reference. In the example of FIG. 5a, apparatus 100 may have received a trigger signal some time prior to the time of frame exposure control signal $e_N$, e.g., at a time just prior to the time of frame exposure control signal $e_{N-2}$.

At time $T_0$, image sensing and processing circuit 502 can commence outputting a frame of image data. Pixels 180 of image sensor array 182 are also represented in the timing diagram of FIG. 5a. For purposes of illustration a small image sensor array is shown in FIG. 5a having an array of 36×24 pixels. In actuality, the image sensor array can have a much larger array of pixels, e.g., 1280×1024 pixels. At time $T_0$, image sensing and processing circuit 502 can commence output at interface 586 a raw pixel value representing light incident at a pixel from a first row of image sensor array 182, e.g., the light at pixel $P_{36,1}$ (or pixel $P_{1,1}$) of image sensor array 182. At time $T_F$, image sensing and processing circuit 502 can complete output at interface 586 a raw pixel value representing light at a pixel from a last row of pixels of image sensor array 182, e.g., the light at pixel $P_{1,24}$ (or pixel $P_{35,24}$).

With further reference to the timing diagram of FIG. 5a, image sensing and processing circuit 502 can output at interface 588 a filtered frame of image data comprising filtered pixel values contemporaneously while outputting a raw frame of pixel values at interface 588. In one embodiment, the output of a first filtered pixel value of a first frame of image data can occur at time $T_1$, a time after time $T_0$. A delay, d, can exist between time $T_0$ and time $T_1$. The output of a first pixel value of a filtered frame at interface 588 may be delayed by delay, d, relative to time of the output of the first raw pixel value of the raw frame at interface 586 since image sensing and processing circuit 502 may require pixel values from a plurality of rows in order to calculate filtered pixel values. Nevertheless, the output of a raw filtered frame at raw frame interface 586 and a filtered frame at filtered frame interface 588 may both cease at time $T_F$. Image sensing and processing circuit 502 may "clip" the last one or more rows of a filtered frame of image data, i.e., refrain from calculating filtered pixel values of a last one or more rows of image sensor array 182. In another embodiment, apparatus 100 can be configured so that image sensing and processing circuit 502 can delay the output of pixel values at raw pixel value interface 586 so that an output of raw pixel values at interface 586, and an output of filtered pixel values at interface 588 both commence at the $T_1$ such that delay as discussed in reference to FIG. 5a is eliminated.

V. Interleaved Output

Image sensing and processing circuit 502 can also be configured to serially and alternatingly output in an interleaved manner first and second interleaved frames of image data where a first frame of image data is a raw frame of image data and a second frame of image data (output after output of the first frame of image data) is a filtered frame of image data. Such ordering can be reversed, the alternating pattern of outputting raw and filtered frames can be repeated over numerous frames, and the output of such frames can be either automatic or manually driven. When outputting a frame of image data for capture into image frame memory 550 image sensing and processing circuit 502 can serially output a set of pixel values making up the frame of image data. When outputting a raw frame of image data the set of serially output pixel values making up the raw frame of image data are raw pixel values. When outputting a filtered frame of image data, the set of serially output pixel values are filtered pixel values. When serially outputting alternating and interleaved raw and filtered frames of image data image sensing and processing circuit 502 can output the frames at a common output interface e.g., interface 588 and the pixel values making up the frames can be captured into a common input interface, e.g., interface 492 of FPGA 582. For such functioning, a multiplexer can be included in image sensing and processing circuit 502 for presenting either the output from row buffer circuit 1102 (raw pixel values) or the output from computational circuit 1106 (filtered pixel values) to interface 588 for output on a frame by frame basis. Where image sensing and processing circuit 502 serially and alternatingly outputs interleaved raw and filtered frames of image data microprocessor IC 548, as in a dual raw and filtered frame output configuration, has fast access to both raw and filtered pixel values representative of a scene in a field of view of image sensor array. When apparatus 100 outputs interleaved frames of raw and filtered pixel values apparatus 100 can be regarded to be operating in an interleaved raw and filtered frame operating configuration.

Figure 5B:
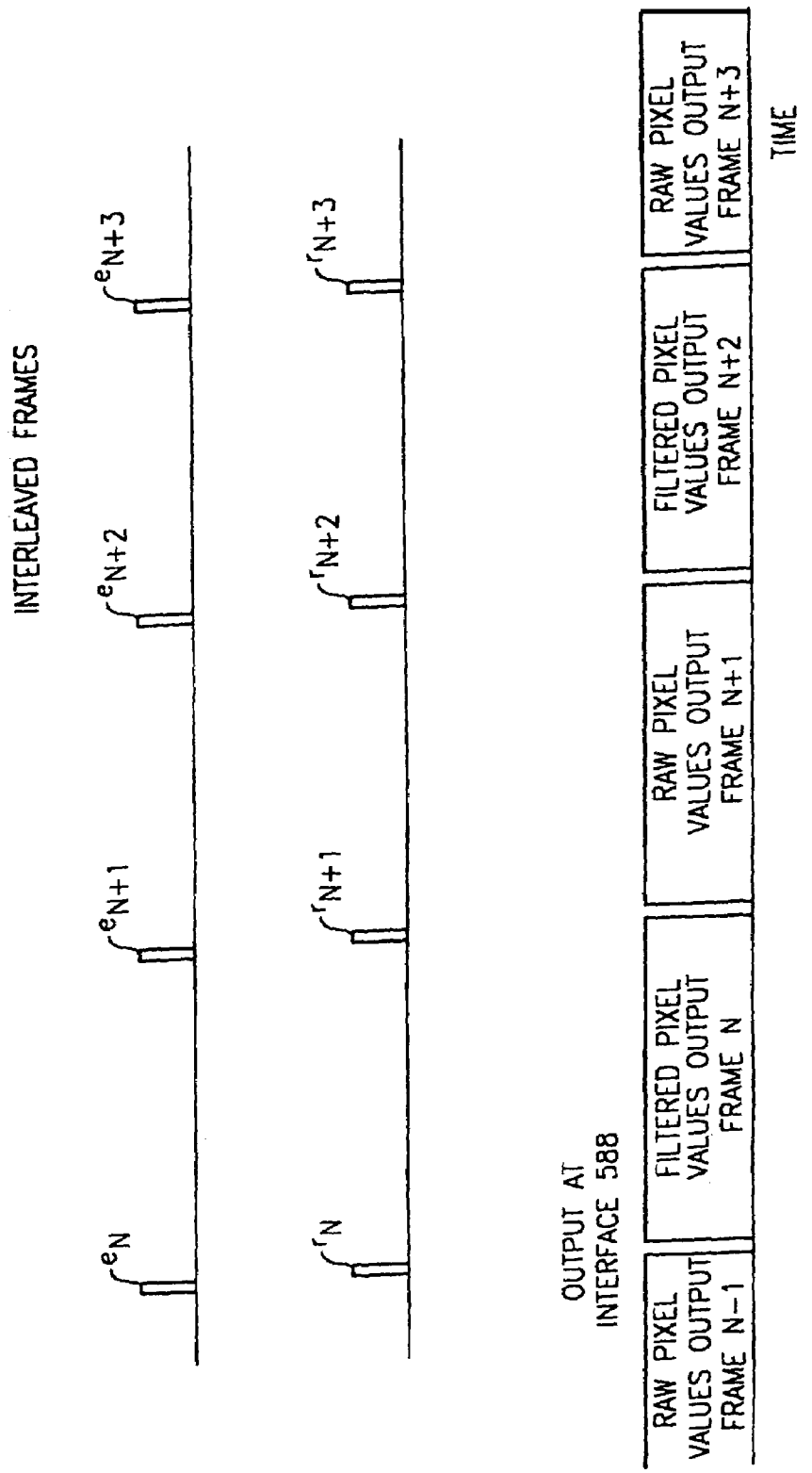
FIG. 5b is a timing diagram illustrating operation of an apparatus when operating in an interleaved frame output configuration in which an apparatus outputs raw and filtered frames of data in an interleaved manner.

An interleaved raw and filtered frame operating configuration is described in greater detail with reference to the timing diagram of FIG. 5b. With reference to the timing diagram of FIG. 5b it is seen that at a certain time image sensor array 182 may receive a frame exposure control signal $e_N$ and then may receive a frame readout control signal $r_N$. After receiving a frame readout control signal $r_N$, image sensing and processing circuit 502 can output at interface 588 a filtered frame of pixel values comprising all filtered pixel values. However, when a next frame of pixel values (frame N+1) is output at interface 588, the output pixel values can be raw pixel values. Also, it is seen that the frame of pixel values output at interface 588 previous to frame N; that is frame N−1 was a raw frame of pixel values comprising raw pixel values. Image sensing and processing circuit 502 can continue to output interleaved filtered and raw frames of pixel values until a time that a trigger signal deactivation signal is received or until a time that the interleaved frame operating configuration is deactivated. In the example described with reference to the timing diagram of FIG. 5b, image sensing and processing circuit 502 may have received a trigger signal at a time prior to the time of frame exposure control signal $e_N$, e.g., at a time just prior to the time of exposure control signal $e_{N-3}$. A trigger signal deactivation signal may be initiated, e.g., by releasing trigger 216, where a trigger signal is initiated by actuating trigger 216. Apparatus 100 can also be configured to receive a trigger signal deactivation signal when microprocessor IC 548 successfully decodes a bar code symbol.

In another embodiment, image sensing and processing circuit 502 can be configured to output through a single interface, e.g., interface 588 serially and alternatingly raw pixel values and filtered pixel values in an interleaved manner. That is, apparatus 100 can be configured so that at a first pixel clock time, image sensing and processing circuit 502 can output a raw pixel value, at a next pixel clock time a filtered pixel value a filtered pixel value; at a next pixel clock time, a raw pixel value and so on until a frame of image data representing an area image is output. A resulting frame of image data captured as a result of interleaved raw and filtered pixel values being output in such manner would effectively be two frames of image data; a first raw frame of image data and a second filtered frame of image data each having a pixel resolution of half of the resolution of image sensor array 182 where there is an output pixel value for each pixel of the array for a set of pixel values defining a two dimensional area. For such functioning, a multiplexer can be included in image sensing and processing circuit 502 for presenting either the output from row buffer circuit 1102 (raw pixel values) or the output from computational circuit 1106 (filtered pixel values) to interface 588 for output on a pixel value by pixel value basis. Where image sensing and processing circuit 502 serially and alternatingly outputs through an interface, e.g., interface 588, interleaved raw and filtered pixel values microprocessor IC 548 also has fast access to both raw and filtered pixel values representative of a scene in a field of view of image sensor array 182. Where apparatus 100 outputs interleaved raw and filtered pixel values in successive pixel clock cycles, apparatus 100 can be regarded as operating in an interleaved raw and filtered pixel value output configuration.

Figure 5C:
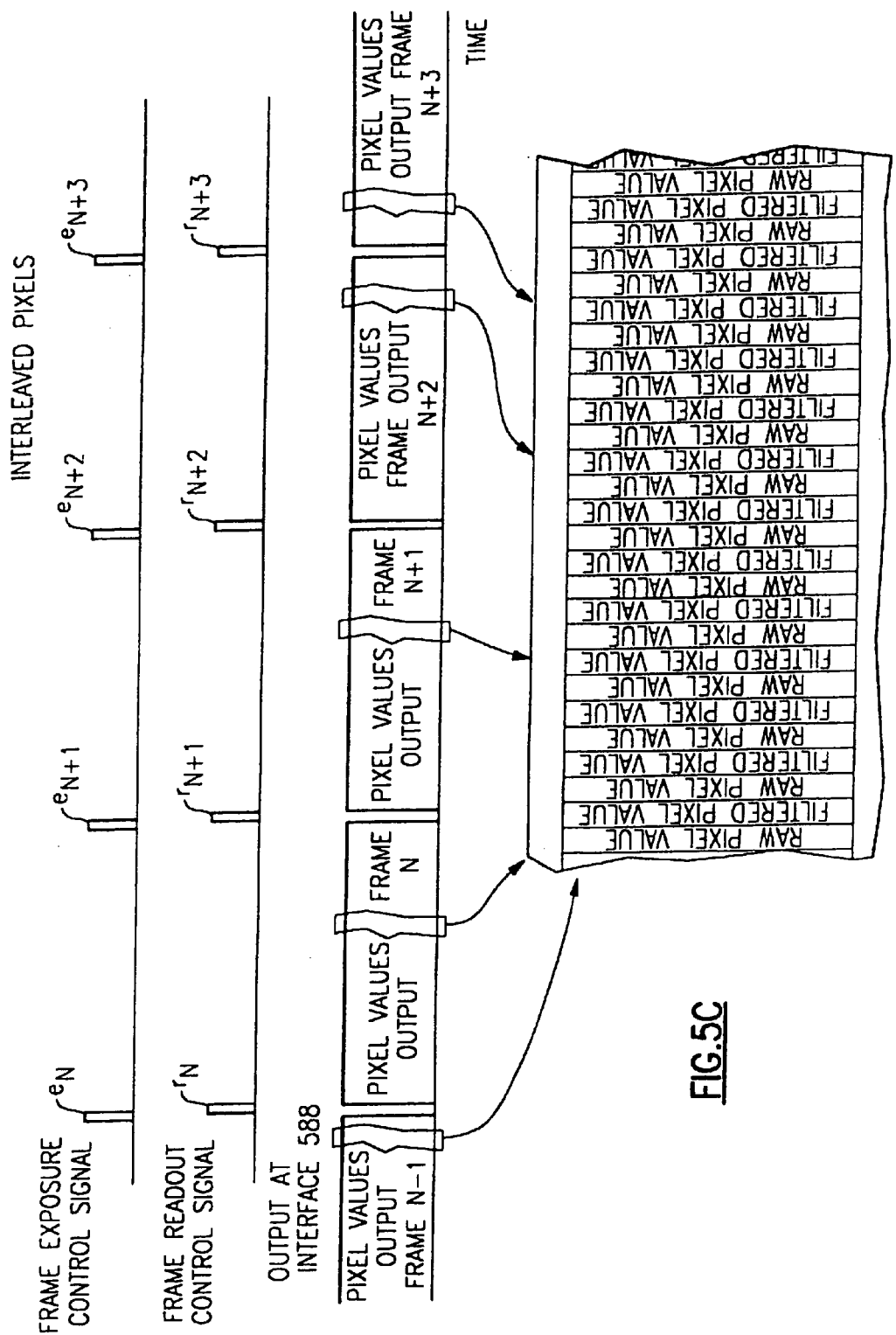
FIG. 5c is a timing diagram illustrating operation of an apparatus in an interleaved pixel output configuration in which an apparatus can output through an interface pixel values in an interleaved manner.

An interleaved raw and filtered pixel value output configuration is described in greater detail with reference to the timing diagram of FIG. 5c. With reference to the timing diagram of FIG. 5c, it is seen that at a certain time image sensor array 182 may receive a frame exposure control signal $e_N$ and then may receive a frame readout control signal $r_N$. After receiving a frame readout control signal $r_N$, image sensing and processing circuit 502 can output at interface 588 a frame of image data comprising interleaved raw and filtered pixel values. The output of interleaved raw and filtered pixel values is illustrated in the exploded view portion of the timing diagram of FIG. 5c. In successive pixel clock cycles, image sensing and processing circuit 502 can alternatingly output at interface 588 a raw pixel value and then a filtered pixel value and can continue to do so throughout the course of outputting a frame of pixel values representing a two dimensional area or a 1D slice region of a substrate bearing a decodable indicia. It is seen with reference to the timing diagram of FIG. 5c that each frame of pixel values output at interface 588 by circuit 502 when operating in an interleaved raw and filtered pixel value output configuration can comprise interleaved raw and filtered pixel values. In the example described with reference to the timing diagram of FIG. 5c, image sensing and processing circuit 502 may have received a trigger signal at a time prior to the time of frame exposure control signal $e_N$, e.g., at a time just prior to the time of exposure control signal $e_{N-1}$.

For overhead reduction purposes, image sensor integrated circuit 502 can be constructed to have a single pixel value output interface. For example, image sensor integrated circuit 1082 can be constructed to have interface 588 but be devoid of interface 586. Where a number of pixel value output interfaces are reduced, such as where image sensor integrated circuit 182 has a single pixel value output interface, the interleaved raw and filtered frame output configuration and the interleaved raw and filtered pixel value output configuration are particularly advantageous. With the interleaved raw and filtered frame output configuration and the interleaved raw and filtered pixel value output configuration the functioning of apparatus in a contemporaneously output raw and filtered frame operating configuration is approximated.

VI. Texture Detection

In a still further aspect, image sensing and processing circuit 502 can be configured to develop data indicating a location of decodable indicia representation (e.g., bar code) within a frame of image data while the frame of image data is being output for capture into image frame memory 550 so that when capture of a frame of image data into image frame memory is complete and when microprocessor IC first addresses image data from image frame memory 550 for further processing (e.g., bar code decoding), apparatus 100 has determined the location of a decodable indicia representation within the captured frame. By incorporation of location detection features described herein, microprocessor IC 548 can address image data of a captured frame of image data at a location determined to be a location at which a decodable indicia is represented when first addressing image data of a captured frame of image data for further processing. For developing data indicating a location of a decodable indicia representation in a frame of prior to addressing of image data retained in image frame memory 550 by microprocessor IC 548, image sensing and processing circuit 502 can be configured to examine buffered blocks of pixel values corresponding to image signals read out from pixels of image sensor array 182, and derive an edge strength score for each block. Image sensing and processing circuit 502 can be configured to determine that the block having the highest edge strength score is the block having the decodable indicia representation. In one example a block size can be 16×16 pixel values such that for an image sensor array having 1280×1024 pixels there can be provided 80×64 blocks or "tiles" each tile having 16×16 pixel values.

For calculating a block edge strength score for each of several N×N blocks of pixel values, computational circuit 1106 can apply a pair of horizontal and vertical edgelet masks (edgelets) to each pixel value within an N×N block. A suitable pair of horizontal and vertical edgelets are given below as Example 1.

EXAMPLE 1

$$\left\{ \begin{bmatrix} 1 & 1 \\ -1 & -1 \end{bmatrix} \text{ and } \begin{bmatrix} 1 & -1 \\ 1 & -1 \end{bmatrix} \right\}$$

Computational circuit 1106 can convolve each pixel value with each of the above edgelets and then sum the absolute value of each convolution calculation to determine an edge strength score for each pixel value. For a 16×16 block with a 2×2 edgelet detection mask 2 rows of row buffer circuit 1102 may be utilized. Computational circuit 1106 can include a counter which sums the calculated edge strength scores for each pixel value determined with use of a pair of 2×2 edgelets until each edge strength score within a 16×16 block has been summed, at which time computational circuit 1106 can output a result of the summation (which can be a scaled output). Such summation can be regarded as a block edge strength score. Computational circuit 1106 can also include a comparator that is configured to record the maximum block edge strength score, the average block edge strength score, and the minimum block edge strength score for each frame output. Such a comparator can compare block edge strength scores of a present frame for output to existing maximum and minimum block edge strength scores, and can replace existing maximum and minimum edge strength scores if a block edge strength score for output is higher than the present maximum edge strength score or lower than the present minimum edge strength score. Computational circuit 1106 can also append a coordinate value to the maximum and minimum block edge strength scores for purposes of identifying a location of the block having the maximum edge strength score and the minimum edge strength score respectively. The block having the maximum block edge strength score can be regarded as the block determined to have represented therein a decodable indicia representation. While computational circuit 1106 can be configured to carry out identification of the block having the maximum edge strength score, minimum edge strength score and average edge strength score, microprocessor IC 548 can also be programmed to carry out such identification such that when pixel values of a captured frame captured into image frame memory are first addressed for further processing, the average block edge strength score, the maximum block edge strength score and the minimum block edge strength score and their respective coordinate values have already been determined.

In one embodiment, image sensing and processing circuit 502 can process pixel values in order to output a coordinate value that can be appended to a maximum block edge strength score for a frame of image data. In another embodiment, image sensing and processing circuit 502 can process pixel values output a block edge strength score for each block making up a frame of image data, and microprocessor IC 548 can process the block edge strength scored to determine the maximum block edge strength score and the coordinates of the block having the maximum block edge strength score. Whether image sensing and processing circuit 502 outputs coordinate values indicating a location of the block having the highest block edge strength score or only a set of block edge strength scores, image sensing and processing circuit 502 can be regarded to have output data indicating a location of a decodable indicia representation.

Figure 5D:
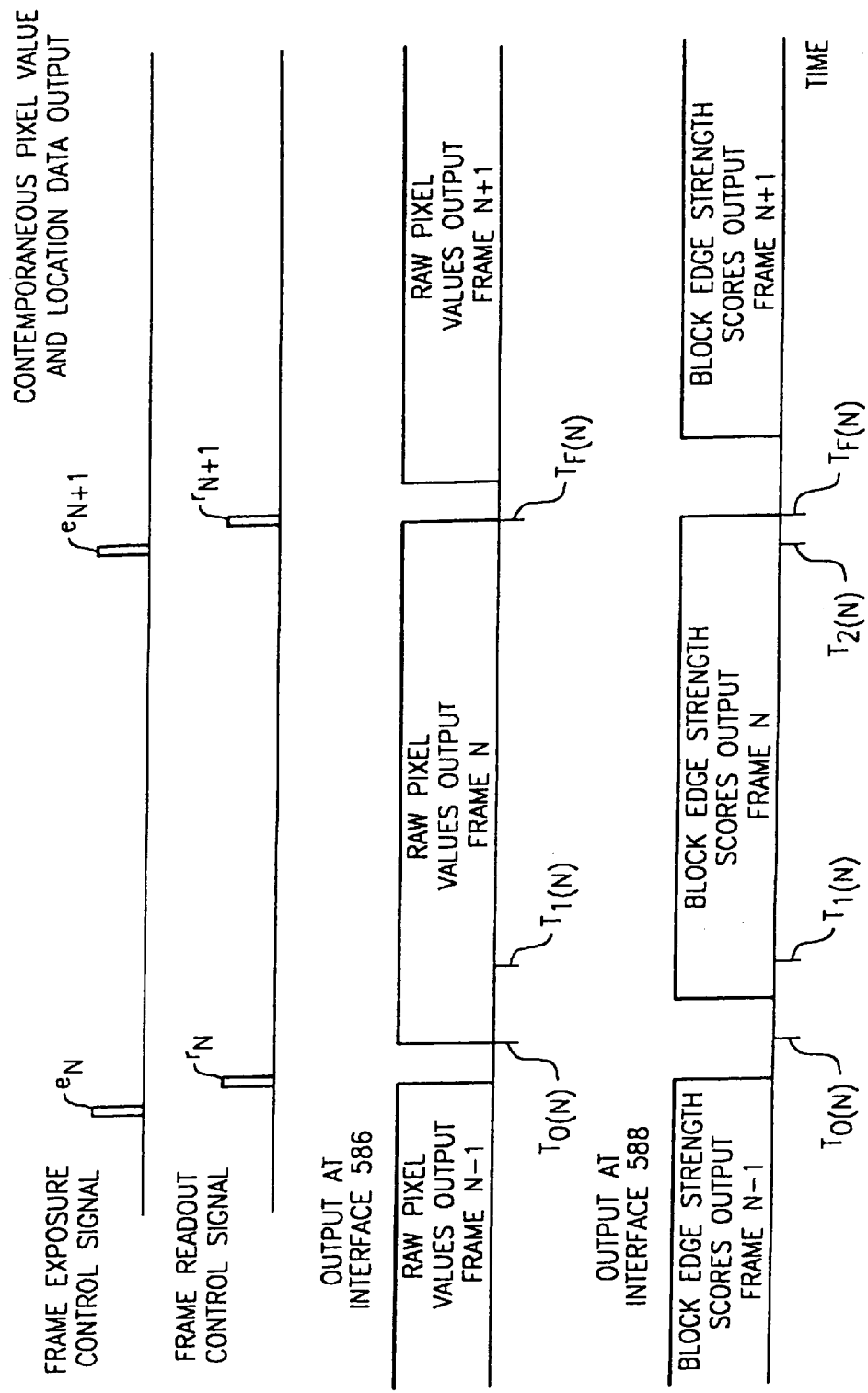
FIG. 5d is a timing diagram of an apparatus operating in a location data output configuration in which an apparatus can output data indicating a location of a decodable indicia representation.

Apparatus 100 can be configured so that when operating in a configuration in which image sensing and processing circuit 100 calculates data for use in determining a location of a decodable indicia representation within a frame of image data before capturing of a frame of image data into memory 550 has been completed, apparatus 100 can contemporaneously output both raw pixel values and block edge strength values. Referring to FIG. 1*a*, apparatus 100 can be configured so that when there is output at interface 588 edge strength scores there is contemporaneously output at interface 586 raw pixel values. In the example provided the raw frame of image data output can have a resolution equal to the resolution of image sensor array 182 while the frame of image data having edge strength score values can have a resolution of 80×64 block edge strength score values. In one embodiment, at the time that image sensing and processing circuit 502 outputs a row of 1280 pixel values at interface 586, image sensing and processing circuit 502 can output 80 block edge strength score values (i.e., one block edge strength score value every 16 pixels, or 1280 edge strength score values, repeating each new block edge strength score values for 16 pixel clocks). Image sensing and processing circuit 502, when outputting edge strength score values can repeat block edge strength scores for 15 rows after outputting first a block edge strength score or can skip 15 rows until outputting a next block edge strength score. A timing diagram for an exemplary embodiment is provided in FIG. 5d. At time $T_0$ image sensing and processing circuit 502 can output at interface 586 the first pixel value of a frame of image data (pixel value 1,1). Between time $T_0$ and $T_1$, image sensing and processing circuit 502 may not output any data at interface 588. At time $T_1$, circuit 502 can commence output at interface 586 pixel values from the 18$^{th}$ row of pixels, at which time circuit 502 may commence outputting edge strength score values at interface 588. Block edge strength score values may not be available until a time that an 18$^{th}$ row is being output since computational circuit in one embodiment may utilize data from 17 rows of pixels in calculating a block edge strength score. Between time $T_1$ and $T_F$ (the time at which the last raw pixel value of the frame has been output), circuit 502 may output at interface 588 raw pixel values and may output at interface 588 edge strength score pixel values. At time $T_2$, just prior to time $T_F$, circuit 502 can output at interface 588 a series of multibit values indicating the average block edge strength score, the maximum block edge strength score and associated coordinates, and the minimum edge strength score and associated coordinates. So that the outputting of pixel values at interface 588 and the outputting of raw pixel value at interface 588 for a given frame both cease at time $T_F$, the last rows of image data can be "clipped" such that calculation of block edge strength scores for the last row of blocks does not require data from a full 16 rows of pixel values.

By developing block edge strength scores, image sensing and processing circuit 502 detects a texture of a frame of image data. In the example described, image sensing and processing circuit 502 can apply horizontal and vertical edgelet masks to pixel values as shown in Example 1. The application of horizontal and vertical edgelets detects a texture of a frame of image data by detecting for the presence of straight edges. Instead of or in addition to applying horizontal and vertical edgelets to pixel values, image sensing and processing circuit 502 can apply curvelets to pixel values. Such curvelets can be, e.g., 2×3 curvelets, 3×2 curvelets, 4×2 curvelets, 2×4 curvelets or 3×3 curvelets as shown in Examples 2 and 3 herein below.

EXAMPLE 2

$$\left[\begin{bmatrix} -1 & 1 \\ 1 & -1 \\ -1 & 1 \end{bmatrix}\right] \text{ and } \left[\begin{bmatrix} 1 & -1 & 1 \\ -1 & 1 & -1 \end{bmatrix}\right] \text{ and } \left[\begin{bmatrix} 1 & -1 \\ -1 & 1 \\ 1 & -1 \end{bmatrix}\right] \text{ and }$$

$$\left[\begin{bmatrix} -1 & 1 & -1 \\ 1 & -1 & 1 \end{bmatrix}\right] \text{ and } \left[\begin{bmatrix} 1 & -1 \\ 1 & -1 \\ 1 & 1 \end{bmatrix}\right] \text{ and } \left[\begin{bmatrix} -1 & -1 & 1 \\ 1 & 1 & -1 \end{bmatrix}\right] \text{ and }$$

$$\left[\begin{bmatrix} 1 & -1 \\ -1 & 1 \\ -1 & 1 \end{bmatrix}\right] \text{ and } \left[\begin{bmatrix} -1 & 1 & 1 \\ -1 & -1 & -1 \end{bmatrix}\right] \text{ and } \left[\begin{bmatrix} -1 & 1 \\ -1 & 1 \\ 1 & -1 \end{bmatrix}\right] \text{ and }$$

$$\left[\begin{bmatrix} 1 & 1 & -1 \\ -1 & -1 & 1 \end{bmatrix}\right] \text{ and } \left[\begin{bmatrix} -1 & 1 \\ 1 & -1 \\ 1 & -1 \end{bmatrix}\right] \text{ and } \left[\begin{bmatrix} 1 & -1 & -1 \\ -1 & 1 & 1 \end{bmatrix}\right]$$

EXAMPLE 3

$$\left[\begin{bmatrix} -1 & -1 & -1 & -1 \\ 1 & 1 & 1 & 1 \end{bmatrix}\right] \text{ and } \left[\begin{bmatrix} -1 & 1 & 1 & 1 \\ 1 & -1 & -1 & -1 \end{bmatrix}\right] \text{ and }$$

$$\left[\begin{bmatrix} -1 & -1 & 1 & 1 \\ 1 & 1 & -1 & -1 \end{bmatrix}\right] \text{ and } \left[\begin{bmatrix} -1 & -1 & 2 \\ -1 & 2 & -1 \\ 2 & -1 & -1 \end{bmatrix}\right] \text{ and } \left[\begin{bmatrix} 1 & -1 \\ 1 & -1 \\ 1 & -1 \\ 1 & -1 \end{bmatrix}\right]$$

$$\text{and } \left[\begin{bmatrix} 1 & -1 \\ 1 & -1 \\ 1 & -1 \\ -1 & 1 \end{bmatrix}\right] \text{ and } \left[\begin{bmatrix} 1 & -1 \\ 1 & -1 \\ -1 & 1 \\ -1 & 1 \end{bmatrix}\right] \text{ and } \left[\begin{bmatrix} 2 & -1 & -1 \\ -1 & 2 & -1 \\ -1 & -1 & 2 \end{bmatrix}\right]$$

By application of curvelets to pixel values, image sensing and processing circuit 502 detects a texture of a frame of image data prior to capture thereof into image frame memory 550 by detecting for the presence of curved edges in a frame of image data. Accordingly, by application of edgelets, image sensing and processing circuit 502 can detect for straight edges, and by application of curvelets can detect for curved edges in a frame of image data. By application of either an edgelet or a curvelet, image sensing and processing circuit 502 detects a texture of a frame of image data prior to capture of a frame of image data intro image frame memory 550. When configured to apply curvelets to image data, image sensing and processing circuit 502 can be configured to calculate block edge strength scores in the manner described. When block edge strength scores are calculated pursuant to application of curvelets rather than edgelets, the block edge strength scores indicate a presence of curved edges rather than straight edges. Further aspects of an apparatus that can detect texture by application of curvelets are described in U.S. patent application Ser. No. 10/958,779 filed Oct. 5, 2004 entitled, "System And Method To Automatically Discriminate Between A Signature And A Barcode" incorporated by reference.

Apparatus 100 can be configured so that a user can configure whether image sensing and processing circuit 502 will apply one or both of edgelets and curvelets to image data. For detecting of bar codes having straight edges e.g., UPC code, Aztec, PDF 417, Datamatrix, it may be advantageous to configure image sensing and processing circuit to apply edgelets to pixel values. For detecting of decodable indicia having curved edges, e.g., OCR characters, Maxicode, and handwritten characters, it may be advantageous to configure image sensor to apply curvelets to image data prior to the capture of image data into image frame memory 550.

There is provided, therefore, a method for processing image data in an imaging apparatus having an image sensor array, a microprocessor addressable image frame memory and a microprocessor in communication with the microprocessor addressable image frame memory, the method comprising: reading out image signals from a contiguous grouping of pixels of said image sensor array, the image signals comprising an analog intensity value for each pixel of the grouping, the analog intensity value for each pixel indicating light incident on the pixel; digitizing each of the analog intensity values read out into a pixel value to form a set of pixel values making up a frame of image data; prior to output of said set of pixel values for capture of said pixel values into said image frame memory, processing said set pixel values for determination of data indicating a location of a decodable indicia representation represented by said set of pixel values; capturing said set of pixel values into said image frame memory; and addressing pixel values of said set of pixel values captured into said image frame memory at a determined location of a decodable indicia.

VII Image Capture, Decoding and Trigger Signal Timing

It has been described that a trigger to read (TTR) time (the time between a trigger signal being received and the time a decoded message is output), can be reduced or otherwise managed by processing image data, e.g. filtering and/or executing location detection within an image sensing and processing circuit which can output data into an image frame memory.

A TTR time can also be reduced or otherwise managed by configuring an apparatus to exhibit a certain timing relationship between a receipt of a trigger signal and one or more of a capture of image data and decoding. An apparatus can have a "post-capture" configuration, a "pre-capture" (super fast) configuration, a "pre-decode" (ultra fast) configuration, or a "pre-processing" configuration. When an apparatus has a "post capture" configuration, the apparatus 100 can wait for a trigger signal to be initiated prior to capturing a frame of image data to be subject to decoding. When an apparatus has a "pre-capture" configuration, which can be termed a "super fast" configuration, the apparatus can be capturing frames of image data prior to the time of receipt of a trigger signal and when a trigger signal is received can subject to decoding a frame of image data having a capture initiation time prior to the time of receipt of the trigger signal. When an apparatus has a "pre-decode" configuration, which can also be termed an "ultra fast" configuration the apparatus can be capturing and attempting to decode frames of image data prior to receipt of a trigger signal and when a trigger signal is received, the apparatus can output a decoded message determined prior to the time of receipt of the trigger signal. When an apparatus has a "pre-processing" configuration the apparatus can be capturing and subjecting to decoding processing frames of image data without completing decoding prior to receipt of a trigger signal and when a trigger signal is received, the apparatus can complete decoding processing for a frame of image data subject to incomplete decoding prior to the time of receipt of the trigger signal.

Figure 6A:
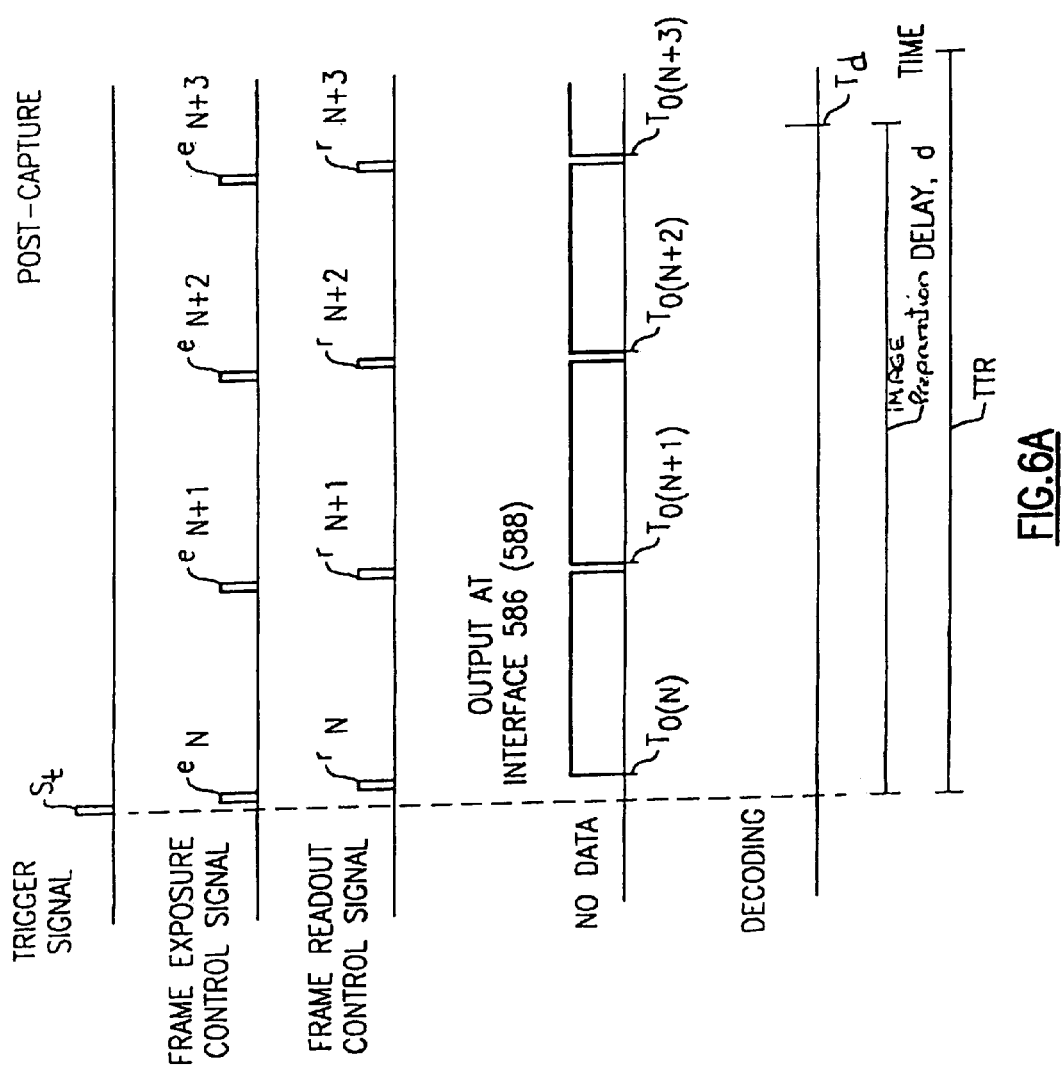
FIG. 6a is a timing diagram illustrating operation of an apparatus configured to capture image data subsequent to receipt of a trigger.

Referring to the timing diagram of FIG. 6a illustrating a post-capture configuration, apparatus 100 can receive a trigger signal $S_t$ at a certain time. Thereafter image sensor array 182 can receive a frame exposure control signal $e_N$ and thereafter image sensor array 182 can receive a frame readout control signal $r_N$. At time $T_{o(N)}$ apparatus 100 can output at an interface, e.g., interface 586 or 588 the first pixel value of a frame of pixel values. However, referring to the decoding timeline of the timing diagram of FIG. 6a, apparatus 100 may not address captured image data captured into image frame memory RAM 550 for purposes of decoding decodable indicia until time $T_d$, a time after an image preparation delay which is a significant time after time $T_{o(N)}$. The image preparation delay can be in one embodiment more than three frame periods in duration. If each frame period has a duration of 33 milliseconds then a total image preparation delay (the delay between the time a trigger signal is received and time the decoding is commenced by microprocessor IC 548 by addressing pixel values of image frame memory 550 for decoding purposes) of over one hundred milliseconds. A trigger-to-read (TTR) time is also depicted in the timeline of FIG. 6a. The TTR time will be equal to the delay, d, depicted in FIG. 6a plus a decoding time (the time required for processing of image data for determination of a decoded message for output). The decode time will vary depending on characteristics of the captured frame subject to decoding. For simple codes represented in high quality images, a decoding time might be, e.g., about 1 ms to 10 ms. For a complex code represented in a low quality image, a decoding time might be greater 100 ms, for example. The reason that the image preparation delay can be so extensive in the example of FIG. 6a is that apparatus 100 may capture and process "parameter determination" frames prior to subjecting of a captured frame of image data to decoding. Parameter determination frames are not subjected to decoding but rather are processed and utilized for the establishment of imaging parameters, e.g., exposure control, gain, white level adjustment and the like. Various methods can be implemented for reduction of a parameter determination delay. For example, for outputting of parameter determination frames apparatus 100 can selectively address for readout a windowed frame of image data corresponding to less than all of the pixels of image sensor array 182. Reading out less than all the pixels of array 182 can reduce a frame period (increasing a frame rate) enabling parameter determination frames to be read out in reduced time. Also, the use parameter determination frames can be avoided altogether and parameters can be based on data other than actual image data. Nevertheless, even if the capture of parameter determination frames is avoided altogether, in the example described with reference to the timeline of FIG. 6a, an image preparation delay can be expected to be no less than one frame period since microprocessor IC 548 cannot address pixels of image frame memory 550 until the time that a frame of image data is captured into image frame memory 550. With reference to the interface timeline in the example of the timing diagram of FIG. 6a, it is seen that no data is outputted at interface 586 (588) prior to time $T_{o(N)}$. While such an image preparation delay can be disadvantageous in one aspect, a configuration in which such a delay is present can be advantageous e.g., in terms of battery life conservation, where apparatus 100 is incorporating a battery. In the timelines herein, signals are depicted for purposes of illustration in the form of pulse signals. However, the signals need not be in the form of pulse signals. For example, a trigger signal may have the form of software flag, where a trigger signal is received in response to a detection of an object in the field of view of image sensor array 182.

An image preparation delay and TTR time can be dramatically reduced by implementation of a pre-capture (super fast) configuration described with reference to the timing diagram of FIG. 6b describing a pre-capture configuration. In a pre-capture configuration apparatus 100 does not wait for a trigger signal to be received before commencing the capture of frames of image data into image frame memory 550. Rather apparatus 100 can continuously capture frames of image data into image frame memory 550 all of the time even prior to the time that apparatus 100 receives a trigger signal. For example, where a pre-capture configuration is available as a selectable configuration, apparatus 100 can be configured so that apparatus 100 commences the continuous capture of image frame data into image frame memory 550 immediately after the pre-capture configuration is activated and before the trigger signal is received. Where apparatus 100 is configured so that the pre-capture configuration is permanent, the apparatus can begin the continuous capture of frames of image data immediately on power up.

Figure 6B:
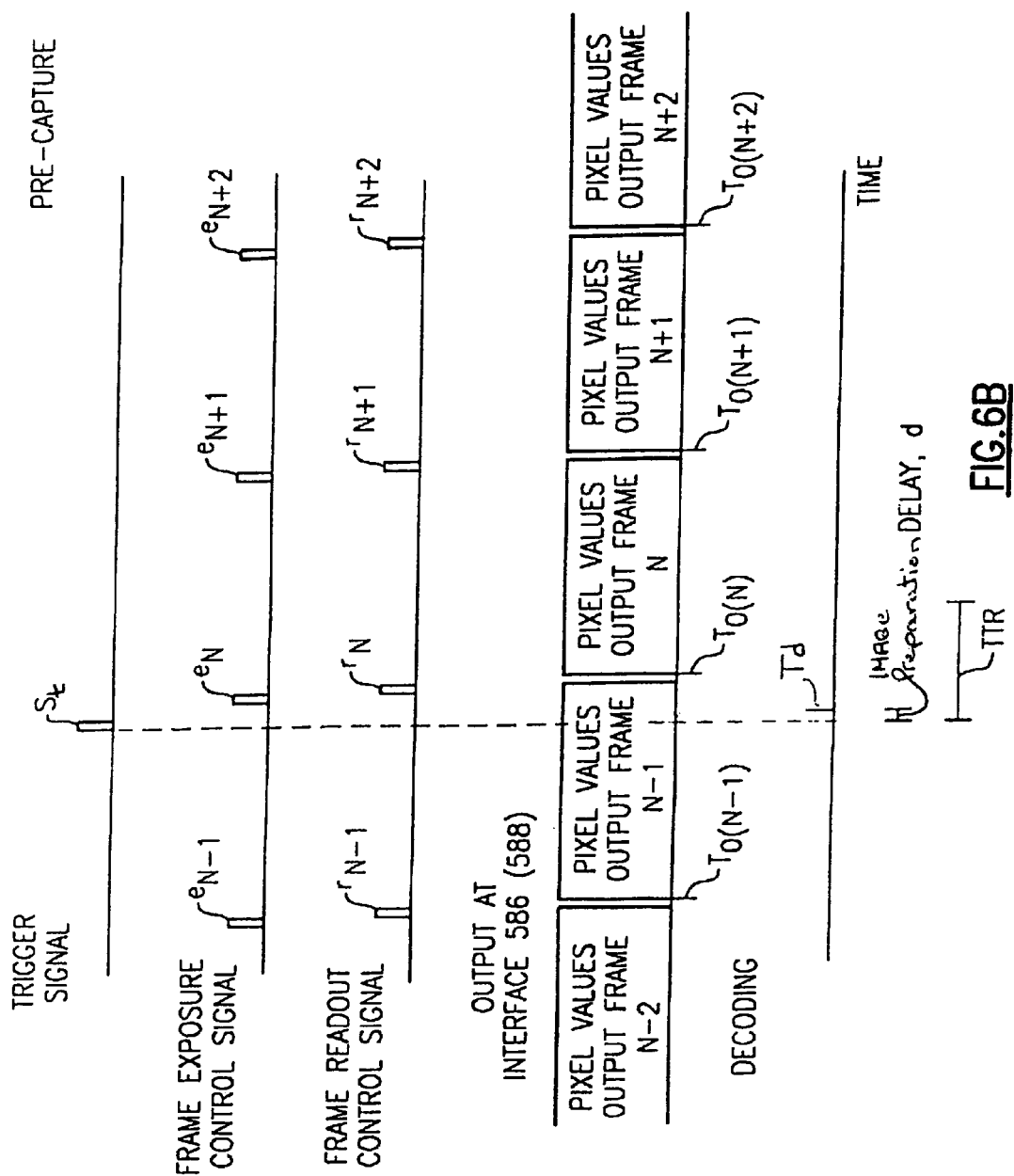
FIG. 6b is a timing diagram illustrating operation of an apparatus in an exemplary embodiment of a pre-capture (super fast) configuration.

With reference to the timing diagram of FIG. 6b, apparatus 100 may receive a trigger signal $S_t$ at a certain time. However, in a pre-capture configuration apparatus 100 has already been capturing frames of image data into image frame memory 550 at the time the trigger signal $S_t$ is received. In the specific example described with reference to the timing diagram of FIG. 6b, apparatus 100 has already captured frame N-2 and possible additional previous frames at the time the trigger signal $S_t$ is received.

In a pre-capture (super fast) configuration apparatus 100 can address for purposes of decoding pixel values that are retained in image frame memory 550 at the time that trigger signal $S_t$ is received. Such a frame of image data can be a frame of image data having a capture initiation time prior to the time of receipt of trigger signal $S_t$. In one embodiment, a frame of image data that is addressed by microprocessor IC 548 for decoding purposes after receipt of a trigger signal when apparatus 100 is in a pre-capture configuration is a frame of image data already completely captured into image frame memory 550 at the time of the receipt of the trigger signal. In another embodiment, the frame image data that is addressed by microprocessor IC 548 is a frame of image data having a capture initiation time prior to the time of receipt of the trigger signal, but which has not been completely captured into image frame memory 550 at the time the trigger signal is received. In one embodiment, the frame of image data addressed for decoding purposes is the most recently captured (based either on the capture initiation time or capture completion time) at the time of the receipt of the trigger signal. The time of receipt of a frame exposure signal $e_N$ by image sensor array 182 herein can be regarded as the time of initiation of the capture of a frame of image data. Referring to the decoding timeline of the timing diagram of FIG. 6b, it is seen that decoding is commenced at time $t_D$ immediately after the receipt of trigger signal $S_t$. Accordingly, the image preparation delay in the example of FIG. 6b is infinitesimal as compared to the image preparation delay, d, in the example of the timeline of FIG. 6a. An exemplary trigger-to-read (TTR) time is also shown in the timeline of FIG. 6b, assuming a decoded time of about half of a frame capture period. An infinitesimal image preparation delay is made possible in the pre-capture configuration because apparatus 100 (since it is always capturing image data in the pre-capture configuration) has available for decoding at the time a trigger signal is received a recently captured frame of image data. In the example of FIG. 6b apparatus 100 at time $Td$ may address for decoding pixel values of image frame N-2 which is retained in image frame memory 550 at the time that trigger signal $S_t$ is received. For energy conservation purposes apparatus 100 can be configured so that apparatus 100 can refrain from energizing light sources of an illumination assembly 104 such as light sources 160 of FIGS. 8a, 8b, 8e, 9a when exposing pixels for capture of image data prior to the time that trigger signal $S_t$ is received when apparatus 100 is in a pre-capture configuration. However, apparatus 100 can also be configured so that after a trigger signal $S_t$ is received with apparatus 100 in a pre-capture configuration, apparatus 100 can energize light sources 160 when exposing pixels 180 of image sensor array 182 for capture of image data into image frame memory 550.

Figure 6C:
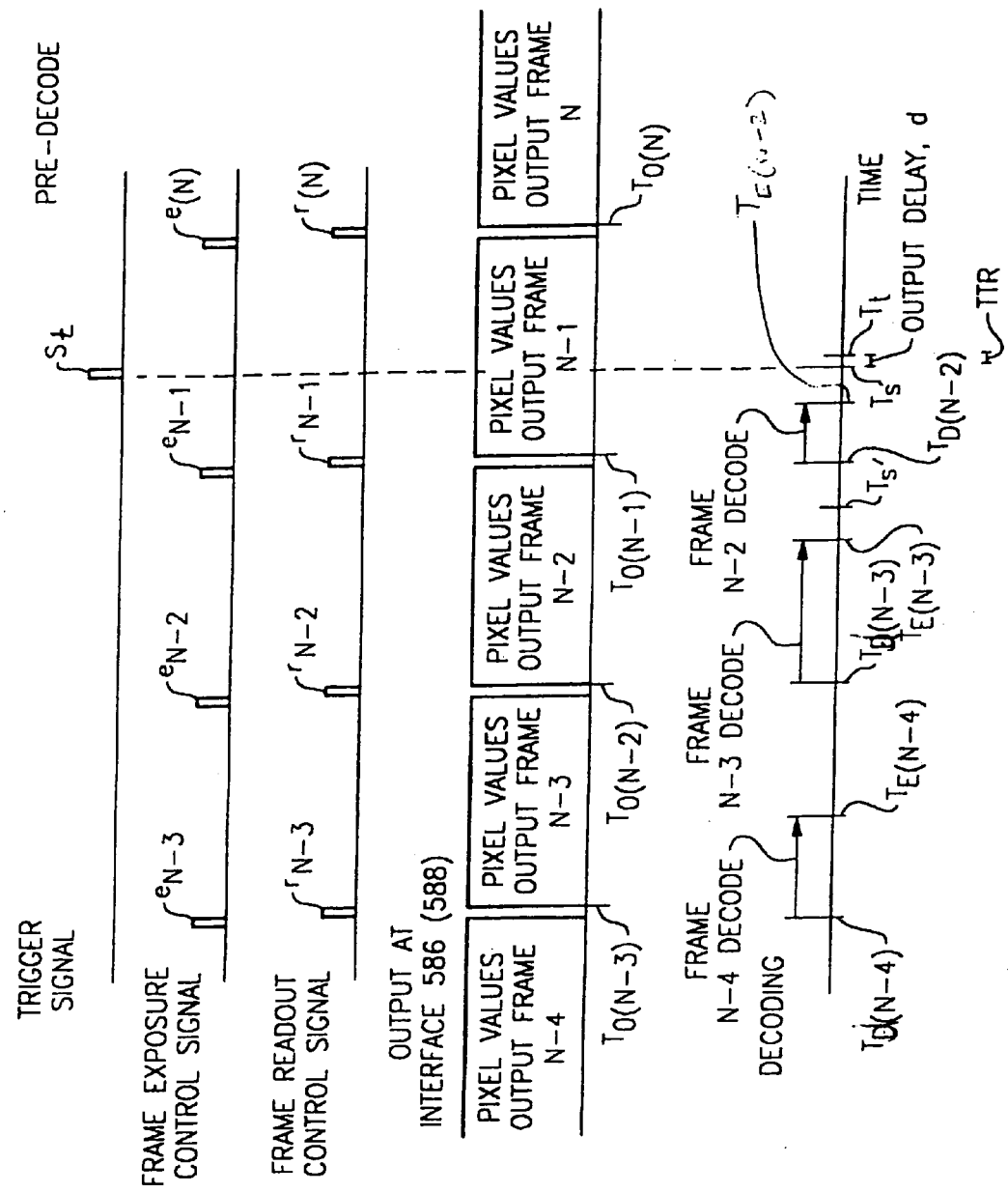
FIG. 6c is a timing diagram illustrating operation of an apparatus in an exemplary embodiment of a pre-decode (ultra fast) configuration.

Referring to the timeline of FIG. 6c, aspects of apparatus 100 in an exemplary embodiment of a pre-decode (ultra fast) configuration are described. It has been mentioned that in a pre-decode configuration, apparatus 100 can be continuously capturing frames of image data into image frame memory 550 as long as apparatus 100 operates in a pre-capture configuration. In a pre-decode configuration apparatus 100 in addition to continuously capturing frames of image data can be attempting to decode and decoding decodable indicia representation of captured frames of image data as long as apparatus 100 is in a pre-decode configuration. In the example described with reference to the time line of FIG. 6c, apparatus 100 may receive a trigger signal $S_t$ as described herein at a certain time. However, because apparatus 100 is in a pre-decode configuration apparatus 100 may have been capturing frames of image data and microprocessor IC 548 may have been addressing pixel values of such frames for decoding purposes prior to the time of receipt of the trigger signal $S_t$. Apparatus 100 can be configured so that apparatus 100 commences continuously capturing frames of image data and addressing each frame of image data for decoding purposes as soon as the apparatus is in the pre-decode configuration. Apparatus 100 can be configured so that the pre-decode configuration is permanent, i.e., the apparatus always has the pre-decode configuration. In such an embodiment, the apparatus can commence the continuous capture of frames of image data on power up. Apparatus 100 can also be configured so that pre-decode configuration is a user selectable configuration available with alternative configurations in which the apparatus 100 does not operate in accordance with the pre-decode configuration. Where the pre-decode configuration is selectable with other configurations, apparatus 100 can be configured to commence the continuous capture of frame of image data immediately on activation of the configuration. In the specific example of FIG. 6c, apparatus 100 has already captured frame N-2, frame N-3, frame N-4, and possibly additional prior frames, and has already addressed pixel values of frames N-2, frame N-3 and frame N-4 for decoding purposes at time $T_s$ the time that trigger signal $S_t$ is received. Referring to the time line of FIG. 6c times $T_{d(X)}$ are times at which microprocessor integrated circuit 548 first addresses for decoding purposes pixel values of a frame of image data and times $T_{E(X)}$ are times at which microprocessor integrated circuit 548 has determined a decoded message corresponding to a decodable indicia represented in a frame of image data. With reference to the time line of FIG. 6c, it is seen that decoding times may vary from frame to frame. It is seen in the specific example that a decoding period for frame N-4 is shorter than a decoding period for frame N-3 but longer than a decoding period for frame N-2.

Apparatus 100 can be configured in one embodiment so that when in a pre-decode configuration apparatus 100 on receipt of a trigger signal $S_t$ outputs at time $T_t$ a decoded message most recently decoded in relation to the time $T_s$ of the receipt of the trigger signal. Delay, d, as indicated in the timing diagram of FIG. 6c is an infinitesimal delay. In the example depicted in FIG. 6c, delay, d, is the TTR time. Where a trigger signal is received at time $T_s$, apparatus 100 in the specific example of FIG. 6c can output the decoded out message decoded at time $T_{E(N-2)}$, which microprocessor IC 548 has decoded by way of addressing of pixel values of frame N-2. However, if a trigger signal were received at time $T_S$, a time prior to the decoded message corresponding to Frame N-2 being decoded, apparatus 100 may output on receipt of the trigger signal the decoded out message decoded at time $T_{E(N-3)}$, the decoded out message decoded by processing of frame N-3. When outputting a decoded message, apparatus 100 can initiate a display of characters (including digits) of a decoded message on display 504 and/or can initiate transfer of a decoded message to an external spaced apart device and/or can flag a decoded message as an output decoded message. When outputting a decoded message in a pre-decode configuration, apparatus 100 can flag one of a set of buffered decoded messages as an output decoded message that is associated with a received trigger signal $T_s$ initiated by a user. A determined decoded message can be regarded as an output decoded message when it is flagged as an output decoded message.

In one embodiment of a pre-decode configuration microprocessor IC 548 can incorporate real time clock functionality enabling microprocessor IC 548 to time stamp trigger signals when received and further to time stamp decoded messages when determined. Apparatus 100 can further be configured to compare the time stamps of a trigger signal and of one or more decoded messages for determining whether to output a previously decoded decoded-out message when receiving a trigger signal in a pre-decode configuration. While apparatus 100 can be configured so that apparatus 100 outputs a most recently decoded message when operating in a pre-decode configuration, there are expected operating conditions where there is no previously determined decoded message available or where the most recently determined decoded message at the time of receipt of a trigger signal is not a decoded message corresponding to a decodable indicia that a user of apparatus 100 intends to decode. In one embodiment apparatus 100 can be configured so that apparatus 100 refrains from outputting a previously determined decoded message on receipt of a trigger signal when operating in a pre-decode configuration if apparatus 100 has not determined any decoded message within a predetermined time window relative to the time of the receipt of the trigger signal. Apparatus 100 can be configured so that the predetermined time window is user selectable. For example, with reference to FIG. 7a apparatus 100 can be configured so that when pre-decode button is actuated a selection interface window 7842 is presented on display 504. Window 7842 includes a time line 7844 and a marker 7846 enabling a user to adjust at the time of the time window by dragging and dropping of marker 7846. In the example of FIG. 6a, the present time window is set to a setting of about 100 ms. With a time window set to a setting of 100 ms, apparatus 100 in a pre-decode configuration can output a previously determined decoded message, e.g., the most recently determined available decoded message if there is available for output a decoded message time stamped to a time that is within 100 ms of the time stamp of the trigger signal. By examining whether a most recently determined decoded message is within a predetermined time window, apparatus 100 determines whether the most recently determined decoded message is a message corresponding to the decodable indicia the user of apparatus 100 intends to decode. Apparatus 100 can be configured so that if there is no such previously determined decoded message available for outputting apparatus 100 can execute alternative processing. Such alternative processing can include outputting a next determined decoded message. The next determined decoded message may be (a) a decoded message decoded from a frame of image data being subjected to decoding processing by microprocessor IC 548 at the time of the receipt of the trigger signal, (b) a decoded message decoded from a frame of image data being captured into image frame memory 550 at the time of receipt of a trigger signal or (c) a decoded message decoded from a frame of image data having a capture initiation time subsequent to the time of the receipt of the trigger signal. For energy conservation purposes apparatus 100 can be configured so that apparatus 100 can refrain from energizing light sources of an illumination assembly 104 such as light sources 160 of FIGS. 8a, 8b, 8e, 9a when exposing pixels for capture of image data prior to the time that trigger signal $S_t$ is received when apparatus 100 operates in an pre-decode configuration. However, apparatus 100 can also be configured so that after a trigger signal $S_t$ is received with apparatus 100 operating in a pre-configuration, apparatus 100 can energize light sources 160 when exposing pixels 180 of image sensor array 182 for capture of image data into image frame memory 550.

A pre-processing configuration is described with reference to the time line of FIG. 6d. When a pre-processing configuration is active, apparatus 100 can behave similarly to an apparatus 100 in a pre-decode configuration except that rather than carrying out decoding to a completion prior to receipt of a trigger signal $S_t$, apparatus 100 in a pre-processing configuration can address pixel values of image frame memory 550 for decoding purposes but does not carry out full decoding, i.e., does not complete decoding by determining a decoded message. Such processing for purposes of decoding can include e.g., binarizing image data along a scan line or throughout a set of pixel values representing a two dimensional area, determining bar and space widths represented by image data along a scan line but refraining from mapping the data to decoded characters, and applying filters in "software" i.e., by way of instructions executed by microprocessor IC 548. In pre-processing configuration apparatus 100 as in a pre-capture and in a pre-decode configuration may be continuously capturing frames of image data into image frame memory 550 for the time that apparatus 100 is in the pre-processing configuration. Apparatus 100 can be configured so the pre-processing configuration is permanent, i.e., the apparatus always has the pre-processing configuration. In such an embodiment, the apparatus can commence the continuous capture of frames of image data on power up. Apparatus 100 can also be configured so that pre-processing configuration is a user selectable configuration available with alternative configurations in which the apparatus 100 does not operate in accordance with the pre-decode configuration. Where the pre-processing configuration is selectable with other configurations, apparatus 100 can be configured to commence the continuous capture of frame of image data immediately on activation of the configuration. In the example described with reference to the time line of FIG. 6d, apparatus 100 may receive a trigger signal $S_t$ as described herein at a certain time. However, because apparatus 100 is a pre-processing configuration apparatus 100 may have been capturing frames of image data and microprocessor IC 548 may have been addressing pixel values for purposes of decoding of such frames prior to the time of receipt of the trigger signal $S_t$. In the specific example of FIG. 6c, apparatus 100 has already captured frames N−2, frame N−3, frame N−4, and possibly additional prior frames, and has already addressed for decoding purposes pixel values of frames N−2, frame N−3 and frame N−4 at time $T_s$ (that the time trigger signal $S_t$ is received). Referring to the time line of FIG. 6d, times $T_{D(X)}$ are times at which microprocessor integrated circuit 548 first addresses for decoding pixel values of a frame of image data and times $T_{P(X)}$ are times at which microprocessor integrated circuit 548 has ceased the execution of decoding processing of a frame of image data for a given frame.

Apparatus 100 can be configured so that when in a pre-processing configuration apparatus 100 subjects a frame of image data most recently subject to decoding processing relative to a time of receipt of a trigger signal to further decoding processing for completion of the decoding. Referring to the example of the time line of FIG. 6d, apparatus 100 receives a trigger signal at time $T_s$ and the frame of image data most recently subject to decoding at the time of receipt of a trigger signal $T_s$ is frame N−2. Accordingly apparatus 100 in the example of FIG. 6d may commence at time $T_c$ completing decoding of frame N−2 when receiving trigger signal $S_t$ at time $T_s$. The time for completing decoding of a frame previously partially processed by subjecting to decoding processing can be expected to be less than the time for executing all necessary decoding processes for decoding a frame of image data. Accordingly, for a common frame of image data the trigger-to-read (TTR) time (the time between the receipt of a trigger signal and the time a determined decoded message is output) in the example of FIG. 6d (pre-processing configuration) can be expected to be less than in the example of FIG. 6b (pre-capture configuration). An exemplary TTR time is plotted in the timeline of FIG. 6d. Comparing FIGS. 6b and 6d, frame N–2 (FIG. 6b) and frame N–2 (FIG. 6d) have equal decoding periods. However, apparatus 100 operating in the pre-processing configuration (FIG. 6d) has a shorter TTR, since a frame subject to decoding has already been subject to decoding processing at a time a trigger signal is received. For energy conservation purposes apparatus 100 can be configured so that apparatus 100 can refrain from energizing light sources of an illumination assembly 104 such as light sources 160 of FIGS. 8a, 8b, 8e, 9a when exposing pixels for capture of image data prior to the time that trigger signal $S_t$ is received when apparatus 100 operates in a pre-processing configuration. However, apparatus 100 can also be configured so that after a trigger signal $S_t$ is received with apparatus 100 in a pre-processing configuration, apparatus 100 can energize light sources 160 when exposing pixels 180 of image sensor array 182 for capture of image data into image frame memory 550.

In the configurations of FIGS. 6b and 6c, apparatus 100 can output a decoded message decoded from a frame of image data having a capture initiation time of less than two frame periods (or frame output periods) earlier than the time of receipt of a trigger signal. Apparatus 100 can have a frame output period of 33 ms and apparatus 100 and specifically, image sensor array 182 can have a frame period of 33 ms. Accordingly, where in a pre-capture (super fast) pre-decode (ultra fast) or pre-processing configuration, apparatus 100 can output a decoded message decoded from a frame of image data having a capture initiation time of less than 66 ms from the time of receipt of a trigger signal. Apparatus 100 can be configured so that a frame period is less than 33 ms, e.g., 16.5 ms (60 fps), 5 ms, 1 ms. It has been determined that in the pre-capture configuration, apparatus 100 can decode a frame of image data being captured at the time of receipt of the trigger signal, and thus can decode a frame of image data having a capture initiation time of less than e.g., 33 ms to 1 ms from the time of receipt of a trigger signal.

Figure 6D:
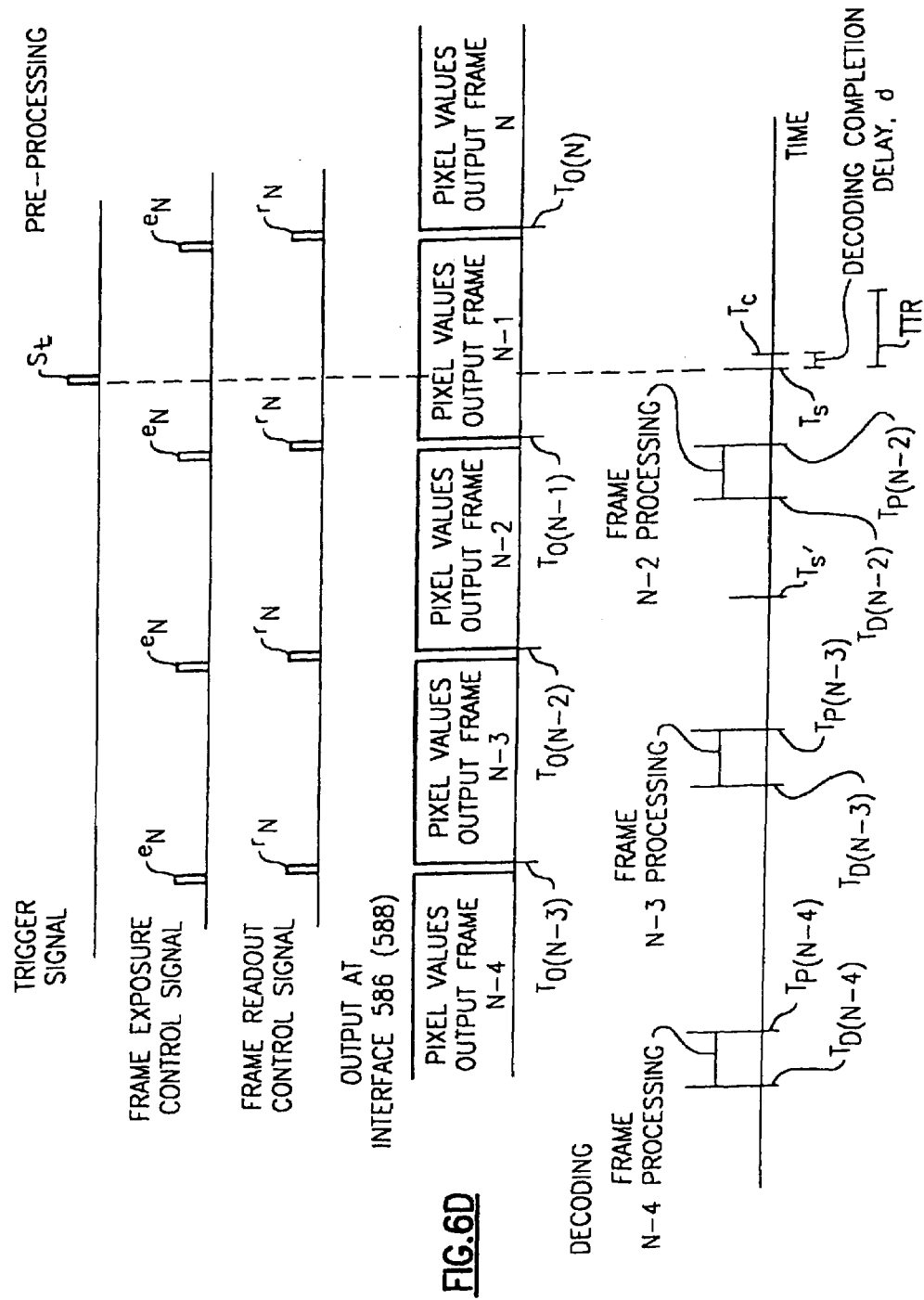
FIG. 6d is a timing diagram illustrating operation of an apparatus in an exemplary embodiment of a pre-processing configuration.

It is seen with reference to FIGS. 6b, 6c, and 6d that apparatus 100 in any of the pre-capture (super fast), pre-decode (ultra fast) or pre-processing configurations, apparatus 100 can have a TTR time of less than a frame period of apparatus 100 prior to and/or after receipt of a trigger signal (the frame period can be regarded as the time required for image sensor array 182 to output a frame of image data, which is correlated with the frame output periods depicted in FIGS. 6b, 6c, and 6d, where image data is depicted as being output at a rate of one pixel value per pixel clock). Apparatus 100 in the configurations described with reference to FIGS. 6b, 6c, and 6d can have a TTR time of less than a frame period of apparatus 100 when outputting a full frame of image data (image data for all or substantially all pixels of image sensor array 182). In the configurations of FIGS. 6b, 6c and 6d, a decoded message can be output a TTR time after receipt of a trigger signal that is decoded from frame of image data output during a frame period longer than the TTR time. In one example a decoded message can be decoded from a frame output during a frame period of 33 ms (frame rate 30 frames/second) and a TTR time can be less than 10 ms. In the pre-decode configuration, the TTR time can be merely the time required by microprocessor IC 548 to output a certain decoded message from a decode buffer, by e.g., display, by initiating transmission to an external device, or by flagging of a certain decoded message as an output decoded message. Such time, as has been indicated can be infinitesimal. In one embodiment, such time is less than 5 ms and in one embodiment can be less that 1 ms.

VIII Control Interface

It has been described that apparatus 100 can be configured to exhibit a certain set of characteristics. When apparatus 100 exhibits a certain set of characteristics it can be said to have a configuration. A number of possible configurations of an apparatus have been described. Each described configuration can be incorporated into an apparatus as a permanent configuration (incapable of being deactivated) or as a transient configuration (capable of being deactivated). Where a configuration described is transient activation of the configuration may be user-selectable or automatically driven.

It has been mentioned that apparatus 100 can be established so that configurations of the apparatus 100 are user-selectable (capable of being activated or deactivated). More than one configuration can be active at a given time. Apparatus 100 can be established so that the configuration that is selected determines the behavior of apparatus 100 when a trigger signal is received. Apparatus 100 can be configured so that a trigger signal is received e.g., when a trigger 216 is actuated, when a trigger command is received from an external device initiated by a user of the external device, when the apparatus 100 is powered up or when the presence of an object in the field of view of image sensor array 182 is detected. Apparatus 100 can be configured so that microprocessor IC 548 receives a trigger signal, e.g. responsively to an initiation received by way of manual actuation of trigger 216 in communication with microprocessor IC 548, responsively to a trigger command received from an external device initiated by a user of the external device, or responsively to a detection of an object in the field of view of image sensor array 182. Apparatus 100 can be configured so that apparatus 100 detects an object in the field of view of image sensor array 182 by processing frames of image data captured into image frame memory 550. Apparatus 100 can be established so that a user can switch the present configuration of apparatus 100 from a present configuration to a new configuration. Some of the configurations that can be selected have already been described.

In a dual raw and filtered frame output configuration, image sensing and processing circuit 502, when a trigger signal is received can contemporaneously output raw and filtered frames of image data for capture into image frame memory 550, and can continue to output such frames until a trigger signal deactivation command is received.

In serial raw and filtered frame output configuration, image sensing and processing circuit 502 when a trigger signal is received can serially and alternatingly output raw and filtered frames of image data and can continue to output such altering frames until a trigger signal deactivation signal is received.

In a decodable indicia location detection operating configuration, image sensing and processing circuit 502 when a trigger signal is received can develop data indicating a location of decodable indicia representation (e.g., bar code) within a frame of image data while the frame of image data is being output for capture into image frame memory 550 and can continue to perform such detection while outputting frames of image data until a trigger signal deactivation signal is received.

Apparatus 100 can be configured so that a trigger signal deactivation signal is received, e.g., when a decodable indicia is decoded, when a user releases finger from a trigger 216 or when a trigger signal deactivation command is received from an external apparatus.

Apparatus 100 can be configured so that whenever a user selects a configuration in which a filtered frame of image data is output, the user is able to select the type of digital filter that will be applied by image sensing and processing circuit 502 throughout operation in the configuration. For example, apparatus 100 can be configured so that a user who has selected a configuration in which a filtered frame is output may further define the configuration by selecting between a mean filter, a median filter, a Gaussian filter, a Laplacian filter, or a Laplacian of Gaussian (LoG) filter. Apparatus 100 can also be configured so that a user can select, rather than a specific type of filter, a rotating filter or a dynamic filter. When a rotating filter is selected image sensing and processing circuit 502 can change the filter applied to pixel values from frame to frame according to a predetermined list. When a dynamic filter is selected, image sensing and processing circuit 502 can change a filter applied to pixel values making up frames of image data dynamically in response to image processing of a previously output frame.

An image sensing and processing circuit can be made configurable so that a user can change the present configuration of the image sensing and processing circuit. For example, a user can be presented with a user interface menu enabling a user to select between an indicia decoding configuration and a picture taking configuration. The apparatus can be configured so that when in the indicia decoding configuration the image sensing and processing circuit is configured according to a first configuration. Further, the apparatus can be configured so that when a picture taking configuration is selected the image sensing and processing circuit is configured according to a second configuration.

Figure 7A:
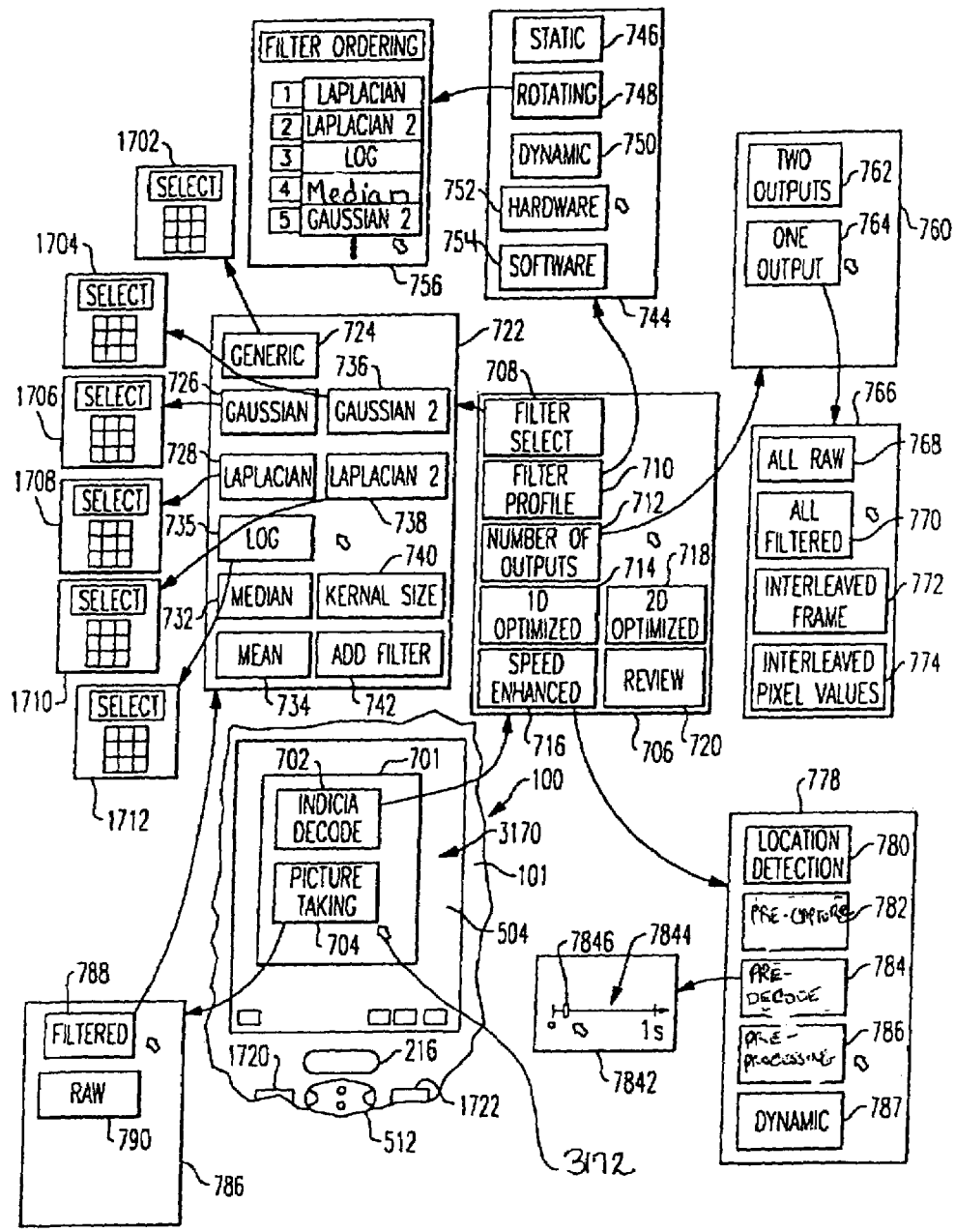
FIG. 7a is a menu interface diagram illustrating an exemplary set of menu option interface screen displays that can be displayed by an apparatus for enabling a user to select a configuration of the apparatus.

Referring to FIGS. 7a, 9b and 9c, apparatus 100 may incorporate a graphical user interface (GUI) 3170 enabling selection between various configurations. With GUI 3170 an operator moves pointer 3172 to a selected icon and clicks on the icon to configure apparatus 100 in accordance with a configuration associated with the selected icon. Reading apparatus 100 may include pointer mover 512 (otherwise termed a navigation matrix) to facilitate movement of the pointer 3172. Buttons 512B of pointer mover 512 (pointer controller) facilitate selection of an icon of a GUI interface that is supported by incorporating a GUI-supporting operating system (OS) into reading apparatus 100 such as WINDOWS CE.

Apparatus 100 can be configured so that when decode button 702 actuated window 706 is displayed displaying designators for further configuration options that may be selected by a user when operating in a decode configuration. Window 706 can include filter select button 708, filter profile button 710, number of output button 712, 1D optimized button 714, 2D optimized button 718, speed enhanced button 716, and review button 720. With review button 720, apparatus 100 can display on display 504 a report indicating all of the configurations that are currently active.

Apparatus 100 can be configured so that when filter select button 708 is actuated, window 722 can be displayed. The menu of window 722 enables a user to designate one or more filter configurations (filters) that will be active when image data is output by image sensing and processing circuit 502. In the example of FIG. 7a, a user can be presented with button 726 for activating a Gaussian filter configuration in which apparatus 100 applies Gaussian filter, button 736 for activating a second Gaussian filter configuration in which apparatus 100 applies a second Gaussian filter having parameters including possibly kernel size different from the first Gaussian filter, button 728 for activating a Laplacian filter configuration in which apparatus 100 applies a Laplacian filter, button 738 for activating a second Laplacian filter configuration in which apparatus 100 applies a second Laplacian filter having parameters different from the first Laplacian filter an LoG filter button 735 for activating an LoG filter configuration in which apparatus 100 applies an LoG filter, a median filter button 732 for activating a median filter configuration in which apparatus 100 applies a median filter and a median filter button 734 for activating a median filter configuration in which apparatus 100 applies a mean filter. A user may also be presented with add filter button 742. When add filter button 742 is activated, a user can be presented with one or more user interface display screens enabling a user to add new filters to a database of filters of apparatus 100. When new mask filters are added the mask data can be added to the mask database of mask data circuit 1110 of image sensing and processing circuit 502. Using an add filter feature a user may add, for example, a second LoG filter with different parameters than a first LoG filter, or a third Gaussian filter, etc. When a user selects a button activating a certain filter, a user may be presented with a kernel selection display screen such as is indicated by windows 1702, 1704, 1706, 1708, 1710, 1712 enabling a user to alter the present parameters of a kernel. When a user selects an add filter button 742, a user may be prompted to copy an existing filter as a template for building a new filter to be added. Window 722 also includes generic filter button 724. When a generic filter button 724 is active, apparatus 100 will filter image data in accordance with the requirements of the generic mask filter. A user is able to define any parameters he wishes into the generic mask filter. By actuating kernel size button 740 a user can be prompted to change a kernel size of one or more mask kernels stored by apparatus 100. For example, a user may be prompted to change a 3×3 kernel size of one or more filters to a new kernel size. Apparatus 100 can be configured to display on display 504 an error message if apparatus 100 is in a hardware filter configuration and the user selects a mask kernel size not permitted by the size of row buffer circuit 1102. Apparatus 100 can be configured so that more than one filter configuration can be active at a given time. If more than one filter configuration is active, e.g., by clicking on more than one of buttons 724, 728, 736, 728, 735, 732, 734, then apparatus 100 will attempt to utilize the filters of each active filter when permitted by other configurations that may be active. In the example of FIG. 7a various designator buttons, e.g., buttons 728, 738, 735, 732, 726 can be highlighted to indicate that the filter configurations corresponding to the highlighted buttons are active, e.g., by displaying an icon in a different font or color, or with a highlight designation. Apparatus 100 can be configured so that actuating a highlighted button deactivates the filter corresponding to the highlighted button. When a filter is deactivated, the highlight of the button corresponding to the filter configuration can be removed. Apparatus 100 can also be configured so that actuation of an unhighlighted filter configuration selection button activates the filter configuration corresponding to the button and causes the button to be highlighted. Apparatus 100 can be configured so that if no buttons are highlighted within window 722, apparatus 100 does not apply any digital filters to image data.

Apparatus 100 can be configured so that apparatus 100 alters decoding programs and/or the launch ordering of decoding programs that are presently active responsively to which filtering configurations (filters) are active. For a filtered frame filtered by a Laplacian or LoG filter may be regarded as being more for purposed of decoding a 1D bar code than a 2D bar code and a filtered frame filtered by a Gaussian filter may be regarded as being more useful for purposes of decoding 2d bar codes and OCR characters. Accordingly, apparatus 100 can be configured so that, e.g., if a Laplacian or LoG filter is active but not a Gaussian filter, apparatus 100 prioritizes 1D decode programs before 2D and OCR decode programs in terms of launch order. Apparatus 100 can also be configured so that, e.g., if a Gaussian filter is active but no Laplacian or LoG filter, apparatus 100 prioritizes 2D decode and/or OCR decode programs before 1D decode programs in terms of launch order. Referring to further aspects of window 706, window 706 can include 1D optimized button 714 and 2D optimized button 718. Apparatus 100 can be configured so that if 1D optimized button 714 is actuated to activate a 1D optimized configuration, apparatus 100 automatically activates a filter, filter set, and/or rotating filter ordering for optimization of decoding of 1D bar codes. For example, apparatus 100 in one embodiment may automatically activate a LoG filter and deactivate all other filters if 1D optimized button 714 is actuated to activate a 1D optimized configuration. Apparatus 100 can be configured so that if 2D optimized button 718 is actuated to activate a 2D optimized configuration, apparatus 100 automatically activates a filter, filter set, and/or rotating filter ordering for optimization of reading 2D bar codes and OCR characters. For example, apparatus 100 in one embodiment can be configured so that apparatus 100 automatically activates a Gaussian filter and deactivates all other filters if 2D optimized button 718 is actuated. Referring to further aspects of window 706 can include a review button 720. Apparatus 100 can be configured so that when review button 720 is actuated, apparatus 100 displays on display 504 indicators indicating the configuration or configurations of operation that are currently active.

Referring again to menu option window 706, menu option window 706 includes filter profile button 710. Apparatus 100 can be configured so that when filter profile button 710 is actuated, menu option window 744 can be displayed on display 504. Menu option window 744 can include static button 746, rotating button 748, dynamic button 750, hardware button 752 and software button 754. Apparatus 100 can be configured so that if static button 746 is actuated, a static filter configuration 746 is active. When a static filter configuration is active, apparatus 100 may apply one and only one filter to image data after a trigger signal is received. Apparatus 100 can be configured so that if rotating button 748 is activated a rotating filter configuration is active. In a rotating filter configuration, apparatus 100 varies the filter applied to image data over the course of a series of frames of image data according to a predetermined list. That is, when a rotating filter configuration is active, apparatus 100 can apply a first filter when processing a first frame of image data for output through interface 588 and then apply a second filter when processing a next or subsequent frame of image data for output through interface 588 and can apply a third filter when processing a next or subsequent frame of image data for output through interface 588. Changing the filter applied over the course of a series of frames can increase the likelihood of a successful decode. The series of frames that are applied may be selected according to a predetermined list. When activating rotating button 748, apparatus 100 may present menu window 756 on display 504 enabling a user to designate an ordering of filters to apply when apparatus 100 operates in a rotating filter configuration. Referring to menu window 756, apparatus 100 can be configured so that a user may alter an ordering of designators for various filters by dragging and dropping the designators in an order corresponding to the desired ordering of application. In the present example apparatus 100 is configured so that when operating in a rotating filter configuration, apparatus 100 applies Laplacian filter when processing data for output of first frame of image data, a second Laplacian filter when processing data for output of a second frame, and LoG filter when processing image data for output of a third frame, a median filter when processing data for output of a fourth frame and a Gaussian filter when processing data for output of a fifth frame. The first, second, third, fourth and fifth frame may be frames subsequent to one another and in one embodiment are successive frames. Rather than being successive frames, apparatus 100 can be configured, for example, so that when operation in a rotating filter configuration apparatus 100 applies each of the active filters for N frames, e.g., N=3 before proceeding to the next filter of the list of filters defined using menu window 756.

Referring again to menu interface 744 apparatus 100 can be configured so that if dynamic button 750 is active, apparatus 100 operates in a dynamic filter configuration. When a dynamic filter configuration is active, apparatus 100 on receiving a trigger signal or otherwise when outputting image data for decoding can change an applied filter that is applied as between a frame and a subsequent frame. However, a filter that is applied to a subsequent frame is not determined with reference to a predefined list; but rather is determined dynamically and adaptively in response to a sensed condition such as a determined characteristic of a previous frame of image data. In one embodiment of apparatus 100 operating in a dynamic filter configuration apparatus 100 may capture a first frame of image data, examine the image data of first frame, then select a filter for application to a subsequent frame depending on the result of the examination. All of the frames output in succession can be output automatically in response to a trigger signal being received. In one example, image sensing and processing circuit 502 when processing image data for output of first frame, may apply an LoG filter and output in parallel an LoG filtered frame and a raw frame. Apparatus 100 on examining the raw frame can determine that low level illumination operating condition is present. On determining that a low illumination operating condition is present, apparatus 100 may then deactivate the LoG filter and activate a Gaussian filter instead so that when processing a subsequent frame for output, image sensing and processing circuit 502 applies a Gaussian filter which are useful in producing frames of image data that can be decoded in spite of the presence of low illumination conditions.

Still referring to menu option window 744, apparatus 100 can be configured so that when hardware button 752 is active, apparatus 100 applies active filters "in hardware" utilizing image sensing and processing circuit 502 as described in connection with FIG. 1a. Apparatus 100 can also be configured so that when software button 754 is active, apparatus 100 applies filters that are active "in software." When a software filter configuration is activated by activation of button 754, apparatus 100 applies filters to captured frames of image data after the frames of image data have been captured into image frame memory 550. When a software filter configuration is active, filters may be applied by microprocessor IC 548 running a program module of a program stored in EPROM 562. Apparatus 100 can be configured so that a hardware filtering configuration and a software filtering configuration can be active simultaneously. Processing time might be increased by applying a filter in a software filtering configuration. However, flexibility might be achieved by selecting a software filtering configuration for application of a particular filter. For example, while a mask kernel size that can be applied in a hardware filtering configuration might be limited by the size of row buffer 1102, there is no kernel size limit when a filter is applied by microprocessor IC 548 to image data after the image data is captured into image frame memory 550.

Referring again to menu interface 706, apparatus 100 can be configured so that if number of outputs button 712 is actuated, apparatus 100 displays a menu option window 760. Menu option window 760 includes two output buttons 762 and one output button 764. When two output buttons 762 is active, apparatus 100 can operate in a dual (parallel) raw and filtered pixel value output configuration as described herein, e.g., with reference to the timing diagram of FIG. 5a wherein apparatus 100 can output at interface 586 raw frames of image data and contemporaneously can output at interface 588 filtered frames of image data including filtered pixel values.

Apparatus 100 can be further configured so that when one output button 764 is selected, apparatus 100 can display on display 504 the menu option window 766. Menu option window 766 can include all raw buttons 768, all filtered button 770, all interleaved frame button 772 and interleaved pixel values button 774. Apparatus 100 can be configured so that if one output button 764 is elected, apparatus 100 operates in a single output interface configuration and outputs image data from one interface; namely interface 588. Apparatus 100 can also be configured so that if all raw buttons 768 is active, apparatus 100 operates in an all raw image data configuration. In an all raw image data configuration apparatus 100 outputs only raw frames of image data including raw pixel values through interface 586 until the configuration is deactivated. Apparatus 100 can also be configured so that if all filtered button 770 is activated, apparatus 100 operates in an all filtered image data output configuration. When operating in an all filtered image data output configuration apparatus 100 can output through interface 588 only filtered pixel values until the configuration is deactivated. Apparatus 100 can also be configured so that if interleaved frame button 772 is activated, apparatus 100 operates in an interleaved frame output configuration as described, e.g., in connection with FIG. 5b. When operating in an interleaved frame output configuration, apparatus 100 can output through interface 588 interleaved frames of raw and filtered frames of image data. Apparatus 100 can also be configured so that if interleaved pixel values button 774 is active, apparatus 100 operates in an interleaved raw and filtered pixel value output configuration as described e.g., in connection with FIG. 5c. In an interleaved raw and filtered pixel value output configuration apparatus 100 can output interleaved raw and filtered pixel values. It should be noted that activation of an interleaved output does not negate operation in another compatible configuration. For example, if an interleaved output configuration is active along with rotating or dynamic filter configuration, apparatus 100 can change the applied filter between a first frame and a subsequent frame.

Referring again to main menu option window 701, apparatus 100 can be configured to enter a picture taking configuration operation when button 704 is activated. In a picture taking configuration, apparatus 100 can process and output frames of image data for visual display but may not attempt to process image data for decoding of decodable indicia. In one embodiment, apparatus 100 in a picture taking configuration, output a frame of image data for visual display and can also output a decoded message decoded from a frame of image data processed for visual display. Apparatus 100 can be configured so that if a picture taking button 704 is activated, apparatus 100 can display the menu option window 786. Menu option window 786 includes raw button 790 and filtered button 788. When raw button 790 is selected, apparatus 100 can output a "raw" image for visual display. When filtered button 788 is active, apparatus 100 can output a filtered image for visual display. It should be mentioned that when raw button 790 is active, apparatus 100 may still apply a filter or filters to image data. For example, in a picture taking configuration apparatus 100 is advantageously operated in a dual (parallel) interface output configuration in which apparatus 100 contemporaneously outputs raw and filtered pixel values at interface 586 and 588. In a picture taking configuration, apparatus 100 can output raw pixel values at interface 586 and filtered pixel values filtered by application of median filter at interface 588. Image data filtered by a median filter augments processing of color image data for visual display. Where image sensor array 182 incorporates a Bayer pattern filter or a filter described in U.S. patent application Ser. No. 11/174,447 filed Jun. 30, 2005 entitled, "Digital Picture Taking Optical Reader Having Hybrid Monochrome And Color Image Sensor," incorporated by reference, apparatus 100 can interpolate for each pixel value a missing color scale value, e.g., must interpolate both a green and blue color scale value for a red color scale pixel value. Median filter output is useful in the performance of such calculations.

If filtered button 788 is activated apparatus 100 can apply one or more filters to image data in the manner for altering the form of the visual displayed image. Apparatus 100 can be configured when filtered button 788 is actuated menu option window 722 is displayed on display 504. With menu option 722 displayed a user can designate image data for altering of an image for visual display in a picture taking configuration. The activation or deactivation of hardware filtering and software filtering configurations made with use of buttons 752 and 754 can remain in effect when a picture taking configuration is made active by activation of button 704.

With reference again to menu option window 706, menu option window includes speed enhanced button 716. It has been mentioned that apparatus 100 can include numerous features that enhance the speed of apparatus 100 in decoding image data or in otherwise processing of image data, for reduction of a trigger-to-read (TTR) time. For example, the availability of filtered image data at the time raw image data is captured significantly increases decoding speed and reduces a trigger-to-read (TTR) time. Apparatus 100 can be configured so that when speed enhanced button 716 is actuated menu option window 778 is displayed on display 504. Menu option screen 778 includes location detection button 780, pre-capture button 782, pre-decode button 784, and pre-processing 786. When location detection button 780 is activated apparatus 100 can operate in a location detection configuration as described previously in connection with the timing diagram of FIG. 5d. In a location detection configuration, apparatus 100 can output at interface 586 raw pixel values and can contemporaneously output at interface 588 data indicating a location of decodable indicia within the contemporaneously output of raw frame of image data such that apparatus 100 at a time that microprocessor IC 548 first addresses pixel values of a captured raw frame image data can address pixel values at a location determined to be a location where decodable indicia is represented.

It has been mentioned with reference to the user interface menu interfaces shown in FIG. 7a that apparatus 100 can be configured so that when a configuration of apparatus 100 is active, a button corresponding to the configuration can be highlighted. Further, highlighting of a button can be carried out by actuating a button. Referring again to window 778 of FIG. 7a apparatus 100 can be configured so that if a dynamic triggering configuration is made active by highlighting of button 787 apparatus 100 can automatically switch between operating in the configuration described relative to FIG. 7a and one or more of the pre-capture (super fast) pre-decode (ultra fast) or pre-processing configurations in a manner that is responsive to a sensed condition sensed by apparatus 100.

Such a sensed condition can be, e.g., the charge remaining on battery 417 and/or the activity level of microprocessor IC 548.

While an apparatus operating in the pre-decode configuration described with reference to FIG. 6c can often have a trigger to read time shorter than in the post capture configuration of FIG. 7a, or the pre-capture configuration or the pre-processing configuration it can also consume the most power because of its operation in the pre-decode configuration. Accordingly, apparatus 100 can be configured so that when a dynamic triggering configuration is active apparatus 100 may operate in a pre-decode (ultra fast) configuration provided that apparatus 100 senses that battery 417 is substantially charged (e.g., at or above 25% charged) but may automatically switch to another configuration described with reference to FIGS. 6a-6d if apparatus 100 determines that the charge of battery 417 has fallen below one or more thresholds. For example, apparatus 100 can be configured so that on determining that a battery charge level fallen below a first threshold, e.g., 25% of maximum apparatus 100 may automatically activate the less power hungry pre-processing configuration. Further, apparatus 100 on determining that a charge of battery has fallen below a second threshold, e.g., 10% of maximum apparatus 100 may automatically activate the further less power hungry pre-capture (super fast) configuration, and on determining that a charge of battery has fallen below a third threshold, e.g., 5% may automatically enter a further less power hungry configuration such as the post-capture configuration wherein apparatus 100 operates as described in connection with FIG. 6a, i.e., does not capture frames of image data until a trigger signal $S_t$ is received.

If a dynamic triggering configuration is active, apparatus 100 in addition to or in place of altering an operating configuration responsively to sensed battery charge level, may alter an operating configuration of apparatus 100 responsively to sensed activity level of microprocessor IC 548. In one example, apparatus 100 can be configured to automatically switch out of a pre-capture (super fast) pre-decode (ultra fast), or pre-processing configuration, (whichever is presently active) and into a configuration wherein apparatus 100 operates as described in connection with FIG. 6a (post capture configuration) when apparatus 100 determines that an activity level of microprocessor IC 548 has exceeded a predetermined threshold. In one example, apparatus 100 may be configured to determine that the activity level of microprocessor IC 548 has exceeded a predetermined threshold activity level when activation of an application unrelated to decoding of decodable indicia has demanded the processing time of microprocessor IC 548.

It has been described with reference to FIG. 6a that apparatus 100 can incorporate a GUI interface for selection of operating configurations. Apparatus 100 can also incorporate another type of user interface for selection between operating configurations. For example, programming bar codes can be provided to facilitate selection of any operating configuration described relative to FIG. 6a. Also, apparatus 100 can be configured to receive a configuration selection command for selecting any configuration described herein from an external and spaced apart computer, e.g., as are shown and described with reference to FIG. 10.

IX Operating Environment

Additional aspects of apparatus 100 are described with reference to the physical form views of FIGS. 8a-8c and the physical form views 9a, 9b and 9c. In the physical views of FIGS. 8a-8c, an imaging module onto which an image sensor array 182 may be incorporated is described. With reference to FIGS. 9a, 9b and 9c, hand held housings for supporting and encapsulating an imaging module including an image sensor array 182 are described.

Figure 8A:
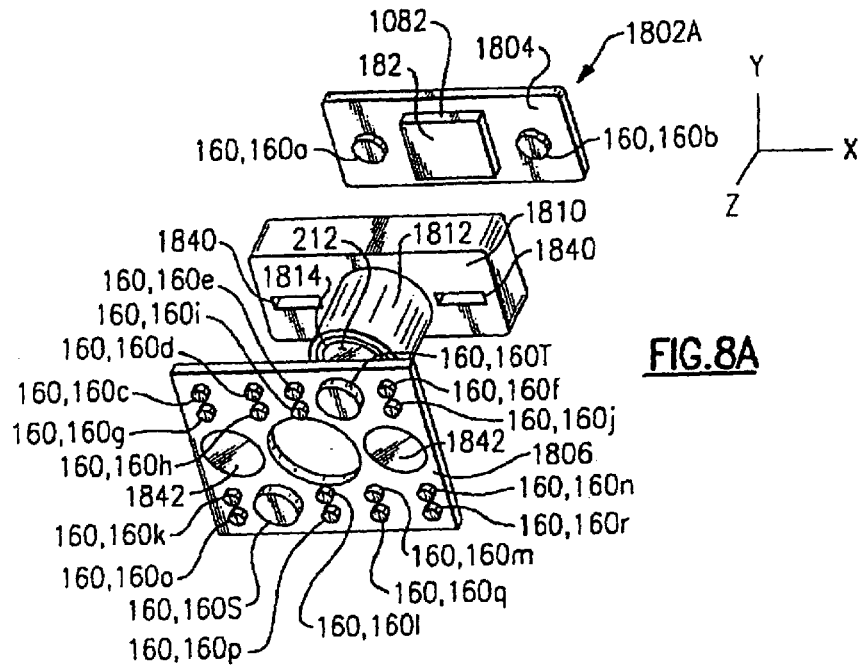
FIG. 8a is an exploded perspective view of an imaging module that can be incorporated into an apparatus.
Figure 8B:
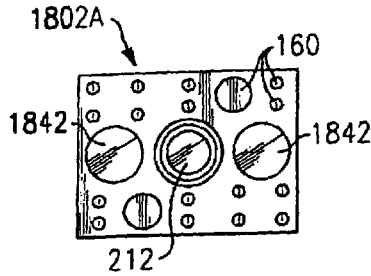
Figures 8C, 8E:
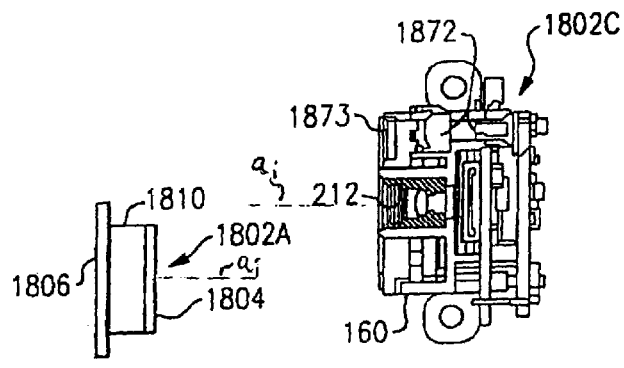
Figures 8D, 8F:
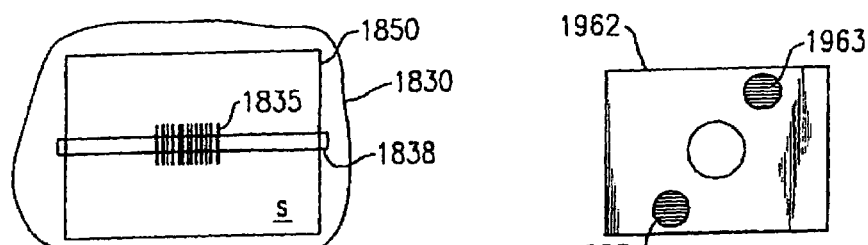

An apparatus 100 of the invention, as shown in the embodiment of FIGS. 8a-8c, may include an imaging module such as imaging module 1802A. Imaging module 1802A as shown in FIGS. 8a-8c incorporates certain features of an IT4XXX imaging module herein and additional features. IT4XXX imaging modules are available from Hand Held Products, Inc. of Skaneateles Falls, N.Y. Imaging module 1802A includes first circuit board 1804 carrying light sources 160a, 160b, while second circuit board 1806 carries light sources 160c, 160d, 160e, 160f, 160g, 160h, 160i, 160j, 160k, 160l, 160m, 160n, 160o, 160p, 160q, 160r, 160s, and 160t (hereinafter 160c through 160t). In another embodiment, all of the described light sources are deleted from imaging module 1802A, and apparatus 100 is devoid of illumination light sources. It is common to integrate an imaging module devoid of light sources into cellular phone embodiments described with reference to FIG. 9c, although in such embodiments it can be advantageous to include an imaging module including at least one light source. First circuit board 1804 also carries image sensor array 182, which is integrated onto image sensor IC chip 1082. The various image sensor IC chips and image sensor arrays can also be incorporated in another imaging module described herein such as imaging module 1802B and 1802C. Imaging module 1802C shown in FIG. 8e has the form of a laser aiming IT4300 imaging module of the type available from Hand Held Products, Inc. The laser aiming IT4300 imaging module includes a plurality of illumination LEDs, e.g., LED 160, and an aiming pattern generator comprising a laser diode assembly 1872 in combination with a diffractive element 1873, wherein the diffractive element of the imaging module diffracts laser light from the laser diode assembly to project a two-dimensional aiming pattern onto a substrate, s. Imaging module 1802A also includes support assembly 1810 including lens holder 1812, which holds lens barrel 1814 that carries imaging lens 212 that focuses images onto an active surface of image sensor array 182. Lens 212 may be e.g., a single lens (a lens singlet), a lens doublet or a lens triplet. Light sources 160a, 160b are aiming illumination light sources whereas light sources 160c through 160t are illumination light sources. Referring to FIG. 8d, illumination light sources 160c through 160t project a two-dimensional illumination pattern 1830 over a substrate, s, that carries a decodable indicia such as a bar code symbol 1835 whereas aiming illumination light sources 160a, 160b project an aiming pattern 1838. In the embodiments shown and described in connection with FIGS. 8a-8c, light from aiming illumination light sources 160a, 160b is shaped by slit apertures 1840 in combination with lenses 1842 which image slits 1840 onto substrate, s, to form aiming pattern 1838 which in the embodiment of FIGS. 8a-8c is a line pattern 1838. Illumination pattern 1830 substantially corresponds to a full frame field of view of image reading apparatus 100 designated by box 1850. The present field of view of apparatus 100 can be referred to herein as the "target" of apparatus 100. Aiming pattern 1838 is in the form of a line that extends horizontally across a center of field of view apparatus 100. Illumination pattern 1830 may be projected when all of illumination light sources 160c through 160t are operated simultaneously. Illumination pattern 1830 may also be projected when a subset of light sources 160c through 160t are simultaneously energized. Illumination pattern 1830 may also be projected when only one of light sources 160c through 160t is energized such as LED 160s or LED 160t. LEDs 160s and 160t of imaging module 1802 have a wider projection angle than LEDs 160c through 160*t*. In an apparatus 100 incorporating imaging module 1802A illumination assembly 104 includes LEDs 160*a*, 160*b*, LEDs 160*c* through 160*t* and slit apertures 1840 in combination with lenses 1842. Referring again to FIGS. 1*a* and 1*b*, illumination assembly 104 can be regarded to include the light sources 160 in the various embodiments described with reference to FIGS. 8*a*-8*f*. The imaging modules described herein each can have an imaging axis, $a_i$, extending normally through an image sensor integrated circuit of the imaging module. An imaging axis $a_i$ is depicted in the views of FIGS. 8*c*, 8*e*, 9*a*, 9*b*, 9*c*, and 9*d*.

Figure 9D:
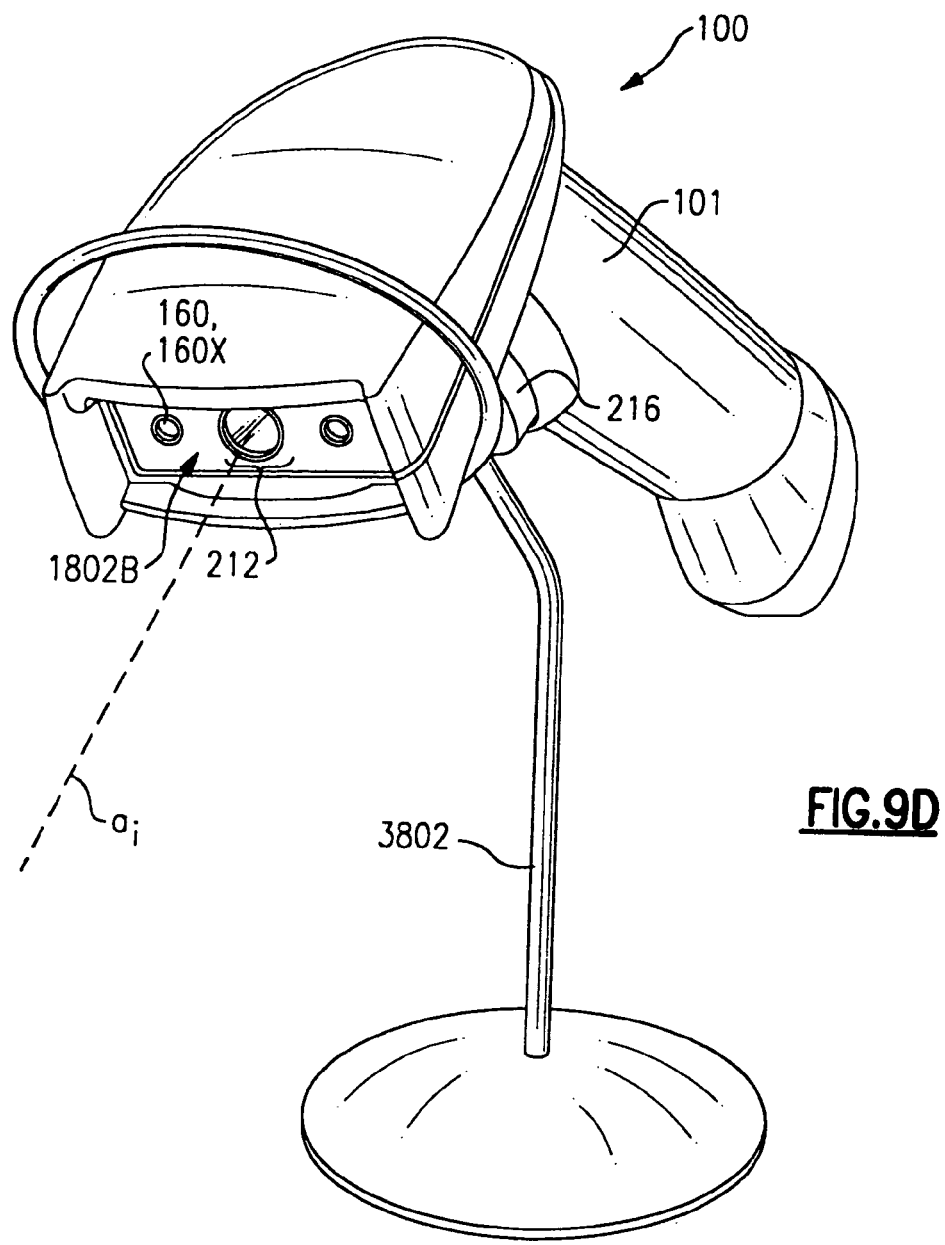
FIG. 9d is a perspective view of a presentation reader combining the reader of FIG. 9a disposed in a scan stand.

A reading apparatus imaging module may be incorporated into one of a hand held housing as shown in FIGS. 9*a*, 9*b* and 9*c*. In the embodiment of FIG. 9*a*, hand held housing 101 is a gun style housing. In the embodiment of FIG. 9*b*, hand held housing 101 supporting imaging module 1802 is in the form factor of a portable data terminal (PDT). In the embodiment of FIG. 9*c*, hand held housing 101 supporting imaging module is in the form factor of a mobile telephone, often referred to as a "cellular phone." When apparatus 100 is a cell phone, apparatus 100 can be configured to send voice data over GSM/GPRS transceiver 571 to GSM/GPRS network 198 (FIG. 10) and to receive over GSM/GPRS transceiver 571 voice data from GSM/GPRS network 198. Further, where apparatus 100 is a cellular phone, apparatus 100 may be configured so that an operator inputs telephone numbers via keyboard 508. The specific imaging module 1802A described in connection with FIGS. 8*a*-8*c* may be incorporated in the apparatus shown in FIG. 9*a* or the apparatus 100 shown in FIG. 9*b* or the apparatus 100 shown in FIG. 9*c*. However, in the embodiment shown in FIG. 9*a*, housing 101 supports and encapsulates imaging module 1802B an imaging module of construction similar to imaging module 1802A, except that only two light sources 160 are incorporated into the imaging module. Housing 101 of the reading apparatus of FIG. 9*b* supports imaging module 1802 which is generically labeled element 1802 to indicate that any one of the specific imaging modules described herein, e.g., 1802A, 1802B, and 1802C may be incorporated into an apparatus 100. Any of the imaging modules 1802A, 1802B, 1802C can be incorporated into any one of the various housing types shown in FIGS. 9*a*, 9*b*, and 9*c*. An imaging module constructed in the manner of any of imaging modules 1802A, 1802B, 1802C, except without any light emitting element can also be incorporated into any one of the various housing types shown in FIGS. 9*a*, 9*b*, and 9*c*. A presentation reader is shown in the view of FIG. 9*d*. For establishing a presentation reader, apparatus 100 as shown in FIG. 9*a* is disposed in a scan stand 3802, so that imaging axis $a_i$ of apparatus 100 is in a fixed position. In the example shown, imaging axis $a_i$ extends substantially vertically. Stand 3802 can also be configured so that imaging axis $a_i$ extends in another direction, e.g., horizontally. In such an embodiment, apparatus 100 can be configured so that a trigger signal is received by microprocessor IC 548 when microprocessor IC 548 detects an object in the field of view of apparatus 100. Apparatus 100 can be configured so that microprocessor IC 548 detects for an object in the field of view of apparatus 100 by processing image data read out from image sensor array 182.

Referring to further aspects of apparatus 100, apparatus 100 may incorporate a graphical user interface (GUI) 3170 enabling selection between various operating configurations. With GUI 3170 an operator moves pointer 3172 to a selected icon and clicks on the icon to configure apparatus 100 in accordance with an operating configuration associated with the selected icon. Reading apparatus 100 may include pointer mover 512 (otherwise termed a navigation matrix) to facilitate movement of the pointer 3172. Buttons 512B of pointer mover 512 facilitate selection of an icon of a GUI interface that is supported by incorporating a GUI-supporting operating system (OS) into reading apparatus 100 such as WINDOWS CE.

Figure 10:
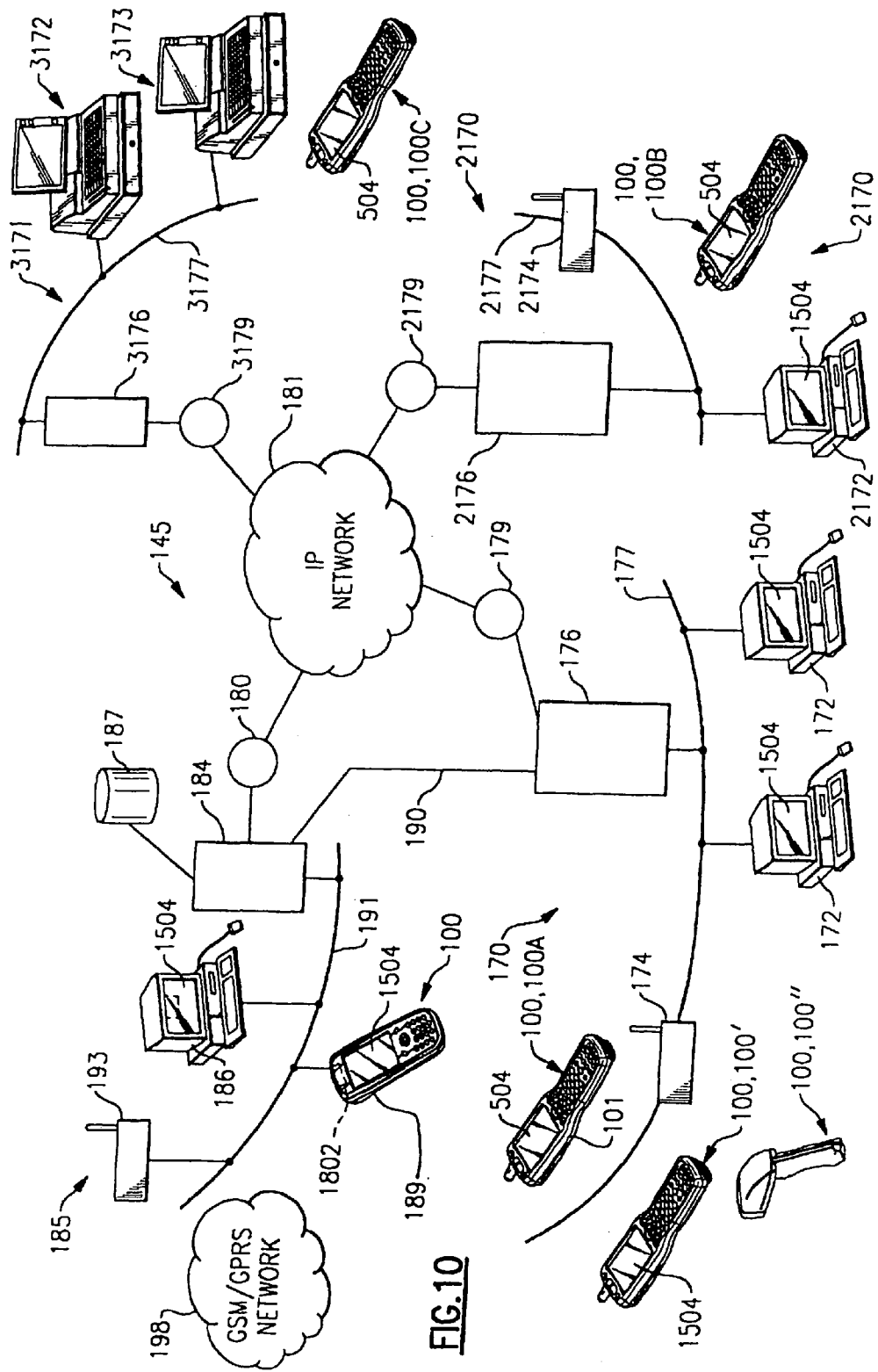
FIG. 10 is a schematic view of a system incorporating a plurality of apparatuses.

Examples of spaced apart devices which may be in communication with an apparatus 100 as described herein are shown and described in connection with FIG. 10. An apparatus, e.g., apparatus 100, 100A may be part of a system 145 and may be included in a local area network (LAN) 170 which comprises, in addition to reading apparatus 100, such spaced apart devices as other portable reading apparatus 100', 100", network access point 174, personal computers 172 and central server 176 that are spaced apart from hand held housing 101 of reading apparatus 100, 100*a*, all of which are connected together via backbone 177. For added networking flexibility, apparatus 100 can incorporate all of the networking functionality that is described in U.S. patent application Ser. Nos. 11/369,185, 60/712,037 and 60/725,001, each entitled, "Data Collection Device Having Dynamic Access To Multiple Wireless Networks," and each of which is incorporated herein by reference. Server 176 in turn is in communication with a variety of additional spaced apart devices that are spaced apart from hand held housing 101 of reading apparatus 100, 100A and which through server 176 are in communication with apparatus 100, 100A. Server 176 may be connected via gateways 179, 180 and network 181 to a first distant remote local area network 185 located miles to thousands of miles away from local area network 170 and a second distant local area network 2170 also located miles to thousands of miles away from local area network 170 and a third distant local area network 3171 located miles to thousands of miles from local area network 170. Network 170 may be located at a supplier's warehouse. Network 2170 may be located at a delivery destination, network 3171 may be located at a retail store and network 185 may be located at a data processing/data archiving facility. Network 185 can be configured to assemble, store and maintain in server 184 various web pages accessible with use of apparatus 100, 100A that summarize data that has been collected by various apparatuses 100A, 100', 100". Server 176 may alternatively or redundantly be connected to remote network 185 via private communication line 190. Network 181 may be the Internet. Remote LAN 185 may include a personal computer 186 and a remote server 184 connected via backbone 191. Remote LAN 185 may also include a wireless communication access point 193. Remote LAN 185 may also include a personal data assistant (PDA) 189. Remote LAN 2170 may include a server 2176, connected to IP network 181 via gateway 2179, backbone 2177, access point 2174, PC 2172, and apparatus 100, 100B. Remote LAN 3171 can include server 3176 connected to IP network 181 via gateway 3179, backbone 3177, cash register computers 3172 and 3173, and apparatus 100, 100C. Apparatus 100C can communicate with cash registers 3172, 3173 via, e.g., Bluetooth radio transceivers disposed in cash registers 3172, 3173 and in apparatus 100C. System 145 may be configured so that a display equipped device, e.g., device 100', 172, 186, 189 automatically displays data, such as decoded message data or a visual display frame of image data, received from apparatus 100, 100A on its associated display 1504 when receiving that data. Each of the computer based devices (devices), e.g., all of apparatuses 100, servers, PCs, cash registers, gateways, access points, etc. of system 145 can incorporate an IP protocol stack and can be in IP communication with each other device. Each device can be external from and spaced apart from each other device.

There is provided in one embodiment an indicia reading apparatus with enhanced functionality which can filter image data prior to the capture of image data into an image frame memory for further processing. In one aspect the indicia reading apparatus can have an image sensing and processing circuit that can contemporaneously output, on respective first and second interfaces, both filtered and raw pixel values so that both filtered and raw frames of image data can be captured contemporaneously for further processing. Filtered and raw frames of image data or pixel values can also be serially output through a single interface in an interleaved manner. An image sensing and processing circuit which outputs either or both raw and filtered pixel values can be provided on a single integrated circuit. In another aspect an image sensing and processing circuit can be provided that develops data indicating a location of a decodable indicia representation within image data prior to capture of a frame of image data into an image frame memory so that when pixel values are first addressed for further processing, a decodable indicia representation such as a bar code representation has already been located. By processing of image data within an image processing circuit prior to capture into an image frame memory a trigger to read time (TTR) can be reduced.

A TTR time of a reading apparatus can also be reduced by designing an apparatus to exhibit a certain timing relationship between a receipt of a trigger signal and/or more of image capture and decoding. An apparatus in one embodiment can be configured to continuously capture frames of image data prior to receipt of a trigger signal and can further be configured so that an output decoded message is decoded from a frame of image data having a capture initiation time of prior to the time of receipt of a trigger signal. An apparatus configured to output a decoded message from a frame of image data having a capture initiation time of prior to a time of receipt of a trigger signal can have a TTR time of less than a frame capture period of the apparatus.

A small sample of methods and apparatuses that are described herein are as follows:

(A1) A hand held bar code reading apparatus for reading a bar code on a substrate, the apparatus comprising: (a) an image frame memory being configured to simultaneously retain pixel values making up a frame of image data; (b) an image sensing and processing circuit for outputting image data for capture into said image frame memory, the image sensing and processing circuit including an image sensor array having a plurality of pixels formed in a plurality of rows and columns, the image sensing and processing circuit being configured to read out image signals from said image sensor array and to digitize such signals, the image sensing and processing circuit processing image data and further being configured to contemporaneously output for capture into said image frame memory (i) a raw frame of image data comprising raw pixel values and (ii) a filtered frame of image data comprising filtered pixel values; (c) a microprocessor integrated circuit being configured to address image data of said image frame memory in accordance with instructions of an indicia decoding program.

There is also described (B1) A hand held bar code reading apparatus for reading a bar code on a substrate, the apparatus comprising: (a) a microprocessor addressable image frame memory being configured to simultaneously retain a raw frame of image data representing said bar code, and a filtered frame of image data representing said bar code, each of the raw frame of image data and the filtered frame of image data including a plurality of pixel values which together represent a two dimensional area of said substrate; (b) an image sensing and processing circuit for output of pixel values to said image frame memory, the image sensing and processing circuit including an image sensor array having a plurality of pixels formed in a plurality of rows and columns, the image sensing and processing circuit being configured to read out image signals from said image sensor array and to digitize such signals, the image data processing circuit image sensing and processing circuit processing image data and further including a first interface for output of raw pixel values and a second interface for output of filtered pixel values, the image sensing and processing circuit being configured to output raw pixel values through said first interface and filtered pixel values through said second interface; and (c) a microprocessor integrated circuit being configured to address image data of said microprocessor addressable image frame memory for decoding of image data.

There is also described (C1) An indicia reading apparatus for reading a bar code on a substrate, the apparatus comprising: (a) an image frame memory being configured to simultaneously retain pixel values making up a frame of image data, the frame of image data including a plurality of pixel values; (b) an image sensing and processing circuit for outputting image data to said image frame memory, the image sensing and processing circuit including an image sensor array having a plurality of pixels and at least one image data output interface, the image sensing and processing circuit being configured to read out image signals from said image sensor array and to digitize such signals, the image sensing and processing circuit processing image data and further being configured to output through said at least one image data output interface both raw pixel values and filtered pixel values to said image frame memory; (c) a microprocessor integrated circuit receiving control being configured to address image data of said frame image memory in accordance with instructions of an indicia decoding program. There is also described (C2) The indicia reading apparatus of C1, wherein said image sensing and processing circuit includes first and second output interfaces, a first of said output interfaces for outputting raw pixel values and a second of said output interfaces for outputting filtered pixel values. There is also described (C3) The indicia reading apparatus of C1, wherein said image sensing and processing circuit includes a single image data output data interface, and wherein said image sensing and processing circuit is configured to output raw and filtered pixel values through said single image data output interface in an interleaved manner. There is also described (C4) The indicia reading apparatus of C1, wherein said image sensing and processing circuit includes a single image data output data interface, and wherein said image sensing and processing circuit is configured to output raw and filtered frames of image data through said single image data output interface in an interleaved manner. There is also described (C5) The indicia reading apparatus of C1, wherein said image sensor array is an area image sensor array having a plurality of rows and a plurality of columns of pixel values.

There is also described (D1) A hand held bar code reading apparatus for reading a bar code on a substrate, the apparatus comprising: an integrated circuit comprising an image sensing and processing circuit, the image sensing and processing circuit including an image sensor array having a plurality of pixels formed in a plurality of rows and columns; a microprocessor addressable frame image memory being configured to retain at an instant in time at least one frame of image data, the at least one frame of image data including a plurality of pixel values which together represent a two dimensional area of said substrate; a microprocessor integrated circuit being configured to address image data retained in said microprocessor addressable frame image memory, the bar code reading apparatus being configured to capture into said image frame memory a frame of image data comprising pixel values and corresponding to light incident on a group of pixels of said image sensor array and representing a two dimensional area of said substrate; said image sensing and processing circuit in communication with said microprocessor addressable frame image frame memory and being configured to digitally filter said pixel values of said frame of image data prior to capture of said pixel value into said microprocessor addressable frame image memory so that pixel values making up said frame of image data are digitally filtered at the time of capture into said microprocessor addressable frame image memory. There is also described (D2) The bar code reading apparatus of B1, wherein said image sensing and processing circuit is configured to apply a Gaussian mask to image data. There is also described (D3) The bar code reading apparatus of D1, wherein said image sensing and processing circuit is configured to apply a Laplacian mask to image data. There is also described (D4) The bar code reading apparatus of D1, wherein said image sensing and processing circuit is configured to apply a log mask to image data. There is also described (D5) The bar code reading apparatus of D1, wherein said image sensing and processing circuit is configured to apply a mean filter to image data. There is also described (D6) The bar code reading apparatus of D1, wherein said image sensing and processing circuit is configured to apply a median filter to image data. memory being configured to simultaneously retain pixel values making up a frame of image data; an image sensing and processing circuit, including an image sensor array having a plurality of pixels and an output interface for outputting data, the image sensing and processing circuit being configured to read out image signals from said image sensor array and to digitize such signals, the image sensing and processing circuit processing image data and further being configured to output for capture into said image frame memory through said output interface interleaved frames raw and filtered image data, the raw frames of image data comprising raw pixel values and the filtered frames of image data comprising filtered pixel values; a microprocessor integrated circuit being configured to address image data of said frame image memory for processing of image data subsequent to capture of image data in said microprocessor addressable frame image memory.

There is also described (F1) A hand held bar code reading apparatus for reading a bar code on a substrate, the apparatus comprising: a microprocessor addressable image frame memory being configured to simultaneously retain pixel values making of a frame of image data, the frame of image data including a plurality of pixel values; an image sensing and processing circuit, including an image sensor array having a plurality of pixels and an output interface for outputting image data, the image sensing and processing circuit being configured to read out image signals from said image sensor array and to digitize such signals, the image sensing and processing circuit processing image data and further being configured to output for capture into said image frame memory through an interface interleaved raw and filtered pixel values, the image sensing and processing circuit when outputting interleaved pixel values outputs through said output interface over the course of outputting a frame of image data a series of pixel values in an interleaved pattern, the interleaved pattern comprising a pattern wherein one or more raw pixel values are serially output followed by one or more filtered pixel values, followed by one or more raw pixel values; a microprocessor integrated circuit being configured to address image data of said frame image memory for processing of image data subsequent to capture of image data in said microprocessor addressable image frame memory. There is also described (F2) The hand held bar code reading apparatus of F1, wherein said image frame memory is configured to retain a frame of image data representing a two dimensional area of said substrate.

There is also described (G1) A method for processing image data in an imaging apparatus having an image sensor array, a microprocessor addressable image frame memory and a microprocessor in communication with the microprocessor addressable image frame memory, the method comprising: reading out image signals from a contiguous grouping of pixels of said image sensor array, the image signals comprising an analog intensity value for each pixel of the grouping, the analog intensity value for each pixel indicating light incident on the pixel; digitizing each of the analog intensity values read out at step (a) into a pixel value to form a set of pixel values making up a frame of image data; prior to output of said set of pixel values for capture of said pixel values into said image frame memory, processing said set pixel values for determination of data indicating a location of a decodable indicia representation represented by said set of pixel values; capturing said set of pixel values into said image frame memory; and addressing pixel values of said set of pixel values captured into said image frame memory at step (d) at a determined location of a decodable indicia. There is also described (G2) The method of G1, wherein said data indicating a location includes a coordinate data indicating a block having highest edge strength scores. There is also described (G3) The method of G1, wherein said data indicating a location includes a set of block edge strength scores.

There is also described (H1) A hand held bar code reading apparatus for reading a bar code on a substrate, the apparatus comprising: a microprocessor addressable image frame memory being configured to simultaneously retain pixel values making of a frame of image data, the frame of image data including a plurality of pixel values which together represent a two dimensional area of said substrate; a program memory for storing a bar code decoding program; an image sensing and processing circuit, including an image sensor array having a plurality of pixels formed in a plurality of rows and columns, the image sensing and processing circuit being configured to read out image signals from said image sensor array and to digitize such signals, the image sensing and processing circuit processing image data and further being configured to output through first and second interfaces for capture into said image frame memory first and second data respectively, the first data being output through said first interface being pixel value data and the second data being output through said second interface being data indicating a location of a decodable indicia representation represented within said first image data; a microprocessor integrated circuit being configured so that when running said bar code decoding program said microprocessor integrated circuit addresses pixel values of said frame image memory for processing of image data subsequent to capture of image data in said microprocessor addressable frame image memory, the microprocessor integrated circuit being configured so that when first addressing said first pixel value data after it is captured into said microprocessor addressable image frame memory said microprocessor integrated circuit can address such pixel value data at a location determined to a be a location where a decodable indicia is represented. There is also described (H2) The apparatus of H1, wherein said data indicating a location of a decodable indicia comprising block edge strength data for each of a series of blocks of said first data. There is also described (H3) The apparatus of H1, wherein said data indicating a location of decodable indicia comprising a max edge block score and an associated coordinate location.

There is also described (I1) An indicia reading apparatus for reading a decodable indicia on a substrate, the apparatus comprising: a microprocessor addressable image frame memory being configured to simultaneously retain image data making of a frame of image data; a program memory storing an indicia decoding program; an image sensing and processing circuit configured to output image data for capture into said image frame memory, the image sensing and processing circuit including an image sensor array having a plurality of pixels, the image sensing and processing circuit generating image data and being configured to detect texture of image data generated by said image sensing and processing circuit, and further being configured to output data indicating a texture of generated image data; a microprocessor integrated circuit in communication with said program memory being configured so that when running said indicia decoding program said microprocessor integrated circuit addresses image data of said frame image memory for processing of image data subsequent to capture of image data in said microprocessor addressable image frame memory. There is also described (I2) The bar code reading apparatus of I1, wherein said image sensing and processing circuit in detecting a texture of image data applies edgelets to image data. There is also described (I3) The indicia reading apparatus of I1, wherein said image sensing and processing circuit in detecting a texture of image data applies curvelets to image data.

There is also described (J1) A hand held bar code reading apparatus for reading a bar code on a substrate, the apparatus comprising: a microprocessor addressable image frame memory being configured to simultaneously retain pixel values making up a frame of image data, the frame of image data including a plurality of pixel values which together represent a one dimensional slice of said substrate or a two dimensional area of said substrate; an image sensing and processing circuit for outputting image data, the image sensing and processing circuit including an image sensor array having a plurality of pixels and at least one image data output interface, the image sensing and processing circuit being configured to read out image signals from said image sensor array and to digitize such signals, the image sensing and processing circuit processing image data and further being configured to output image data through said image data output interface for capture into said image frame memory; a microprocessor integrated circuit being configured to address image data of said image frame memory for processing of image data subsequent to capture of image data in said microprocessor addressable frame image memory, the apparatus being configured so that prior to receiving a trigger signal, said apparatus serially and continuously captures into said image frame memory a plurality of frames of image data; wherein said apparatus is configured to wait for a trigger signal, and wherein said apparatus is further configured so that when receiving said trigger signal said apparatus addresses for processing pixel values of a certain frame of image data retained in said memory, the certain frame of image data addressed for processing having a capture initiation time prior to a time that said trigger signal is received. There is also described (J2) The hand held bar code reading apparatus of J1, further comprising an illumination assembly having at least one light source, wherein said apparatus is configured so that prior to a time that said trigger signal is received, said apparatus avoids energizing said at least one light source during a frame exposure period and wherein said apparatus is further configured so that after receipt of said trigger signal said apparatus energized said at least one light source during a frame exposure period. There is also described (J3) The hand held bar code reading apparatus of J1, further including manual trigger for initiating said trigger signal, wherein said apparatus is configured so that said microprocessor integrated circuit, when said manual trigger is depressed for initiation of said trigger signal, said apparatus addresses for decoding said certain frame of image data subject to a capture initiation prior to a time that said trigger signal is received. There is also described (J4) The hand held bar code reading apparatus of J1 wherein said certain frame addressed for decoding is a frame that is completely captured into said image frame memory, a time at which said trigger signal is received. There is also described (J5) The hand held bar code reading apparatus of J1, wherein said apparatus is configured so that prior to receiving said trigger signal said apparatus subjects to decoding processes said plurality of frames of image data serially captured into said image frame memory.

There is also described (K1) An indicia reading apparatus for reading a decodable indicia on a substrate, the apparatus comprising: a microprocessor addressable image frame memory being configured to simultaneously retain pixel values making up a frame of image data, the frame of image data including a plurality of pixel values which together represent a one dimensional slice of said substrate or a two dimensional area of said substrate; an image sensing and processing circuit for outputting image data, the image sensing and processing circuit including an image sensor array having a plurality of pixels and an image data output interface, the image sensing and processing circuit being configured to read out image signals from said image sensor array and to digitize such signals, the image sensing and processing circuit processing image data and further being configured to output image data through said image data output interface for capture into said image frame memory; a microprocessor integrated circuit being configured to address image data of said image frame memory for processing of image data subsequent to capture of image data in said microprocessor addressable frame image memory, the apparatus being configured so that prior to receiving a trigger signal, said apparatus continuously and serially captures into said image frame memory a plurality of frames of image data; wherein said apparatus is configured to wait for a trigger signal initiated by actuation of a manual trigger, and wherein said apparatus is further configured so that when receiving said trigger signal said apparatus outputs a determined decoded message decoded from a certain frame of image data, the certain frame of image data subject to decoding for determining of said output decoded message having a capture initiation time prior to a time of receipt of said trigger signal. There is also described (K2) The indicia reading apparatus of K1, wherein said apparatus is configured so that said apparatus addresses for decoding image data from said certain frame subsequent to receipt of said trigger signal. There is also described (K3) The indicia reading apparatus of K1, wherein said apparatus is configured so that said apparatus determines from said certain frame a decoded message prior to receipt of said trigger signal. There is also described (K4) The indicia reading apparatus of K1, wherein said apparatus is configured so that prior to receipt of a trigger signal, said apparatus continuously determines decoded messages from said plurality of frames of image data continuously and serially captured into said image frame memory, and further wherein prior to outputting a determined decoded message, determines whether said determined decoded message was determined within an acceptable time window of a time of receipt of said trigger signal. There is also described (K5) The indicia reading apparatus of K1, wherein said apparatus is configured so that said apparatus processes for decoding said certain frame without completing decoding prior to receipt of said trigger signal.

There is also described (L1) An indicia reading apparatus for reading a decodable indicia on a substrate, the apparatus comprising: a microprocessor addressable image frame memory being configured to simultaneously retain pixel values making up a frame of image data, the frame of image data including a plurality of pixel values which together represent a one dimensional slice of said substrate or a two dimensional area of said substrate; a hand held housing encapsulating said image sensor array and a manual trigger disposed relative to said housing so that a user can actuate said manual trigger when grasping said hand held housing; an image sensing and processing circuit for outputting image data, the image sensing and processing circuit including an image sensor array having a plurality of pixels and an image data output interface, the image sensing and processing circuit being configured to read out image signals from said image sensor array and to digitize such signals, the image sensing and processing circuit processing image data and further being configured to output image data through said image data output interface for capture into said image frame memory; a microprocessor integrated circuit being configured to address image data of said image frame memory for processing of image data subsequent to capture of image data retained in said microprocessor addressable frame image memory, the apparatus being configured to operate in a first configuration and a second configuration, the apparatus in the first configuration refraining from capturing frames of image data into said image frame memory prior to receiving a trigger signal, the apparatus in the second configuration serially capturing into said image frame memory a plurality of frames of image data prior to receipt of a trigger signal; wherein said apparatus is configured so that in said second configuration said apparatus (i) waits for a trigger signal initiated by actuating said manual trigger, and (ii) when a trigger signal is received outputs a decoded message decoded from a certain frame of image data, the certain frame of image data from which said output decoded message is decoded having a capture initiation time prior to a time of receipt of said trigger signal. There is also described (L2) The indicia decoding apparatus of L1, wherein said apparatus is configured so that said apparatus can be manually switched between said first configuration and said second configuration. There is also described (L3) The indicia decoding apparatus of L1, wherein said apparatus is configured to automatically switch between said second configuration and said first configuration in response to a sensed condition sensed by said apparatus. There is also described (L4) The indicia decoding apparatus of L1, wherein said second configuration is a pre-capture configuration in which said apparatus subsequent to receiving said trigger signal addresses for decoding said certain frame. There is also described (L5) The indicia decoding apparatus of L1, wherein said second configuration is a pre-decode configuration in which said apparatus subsequent to receiving said trigger signal outputs a decoded message, the decoded message being determined prior to a time that said image trigger signal is received from said certain frame at a time at which said trigger signal is received. There is also described (L6)The indicia decoding apparatus of L1, wherein said second configuration is a pre-processing configuration in which said apparatus both prior to and subsequent to receiving said trigger signal addresses for decoding said certain frame.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements.

I claim:

1. A hand held bar code reading apparatus for reading a bar code on a substrate, the apparatus comprising:
   (a) an image frame memory being configured to simultaneously retain pixel values making up a frame of image data;
   (b) an image sensing and processing circuit for outputting image data for capture into said image frame memory, the image sensing and processing circuit including an image sensor array having a plurality of pixels formed in a plurality of rows and columns, the image sensing and processing circuit being configured to read out image signals from said image sensor array and to digitize such signals, the image sensing and processing circuit processing image data and further being configured to contemporaneously output for capture into said image frame memory (i) a raw frame of image data comprising raw pixel values and (ii) a filtered frame of image data comprising filtered pixel values;
   (c) a microprocessor integrated circuit being configured to address image data of said image frame memory in accordance with instructions of an indicia decoding program.

2. A hand held bar code reading apparatus for reading a bar code on a substrate, the apparatus comprising:
   (a) a microprocessor addressable image frame memory being configured to simultaneously retain a raw frame of image data representing said bar code, and a filtered frame of image data representing said bar code, each of the raw frame of image data and the filtered frame of image data including a plurality of pixel values which together represent a two dimensional area of said substrate;
   (b) an image sensing and processing circuit for output of pixel values to said image frame memory, the image sensing and processing circuit including an image sensor array having a plurality of pixels formed in a plurality of rows and columns, the image sensing and processing circuit being configured to read out image signals from said image sensor array and to digitize such signals, the image data processing circuit image sensing and processing circuit processing image data and further including a first interface for output of raw pixel values and a second interface for output of filtered pixel values, the image sensing and processing circuit being configured to output raw pixel values through said first interface and filtered pixel values through said second interface; and
   (c) a microprocessor integrated circuit being configured to address image data of said microprocessor addressable image frame memory for decoding of image data.

3. An indicia reading apparatus for reading a bar code on a substrate, the apparatus comprising:
   (a) an image frame memory being configured to simultaneously retain pixel values making up a frame of image data, the frame of image data including a plurality of pixel values;
   (b) an image sensing and processing circuit for outputting image data to said image frame memory, the image sensing and processing circuit including an image sensor array having a plurality of pixels and at least one image data output interface, the image sensing and processing circuit being configured to read out image signals from said image sensor array and to digitize such signals, the image sensing and processing circuit processing image data and further being configured to output through said at least one image data output interface both raw pixel values and filtered pixel values to said image frame memory;

(c) a microprocessor integrated circuit receiving control being configured to address image data of said image frame memory in accordance with instructions of an indicia decoding program.

4. The indicia reading apparatus of claim 3, wherein said image sensing and processing circuit includes first and second output interfaces, a first of said output interfaces for outputting raw pixel values and a second of said output interfaces for outputting filtered pixel values.

5. The indicia reading apparatus of claim 3, wherein said image sensing and processing circuit includes a single image data output interface, and wherein said image sensing and processing circuit is configured to output raw and filtered pixel values through said single image data output interface in an interleaved manner.

6. The indicia reading apparatus of claim 3, wherein said image sensing and processing circuit includes a single image data output data interface, and wherein said image sensing and processing circuit is configured to output raw and filtered frames of image data through said single image data output interface in an interleaved manner.

7. The indicia reading apparatus of claim 3, wherein said image sensor array is an area image sensor array having a plurality of rows and a plurality of columns of pixel values.

8. A hand held bar code reading apparatus for reading a bar code on a substrate, the apparatus comprising:
an integrated circuit comprising an image sensing and processing circuit, the image sensing and processing circuit including an image sensor array having a plurality of pixels formed in a plurality of rows and columns;
a microprocessor addressable frame image memory being configured to retain at an instant in time at least one frame of image data, the at least one frame of image data including a plurality of pixel values which together represent a two dimensional area of said substrate;
a microprocessor integrated circuit being configured to address image data retained in said microprocessor addressable frame image memory, the bar code reading apparatus being configured to capture into said image frame memory a frame of image data comprising pixel values and corresponding to light incident on a group of pixels of said image sensor array and representing a two dimensional area of said substrate;
said image sensing and processing circuit in communication with said microprocessor addressable image frame memory and being configured to digitally filter said pixel values of said frame of image data prior to capture of said pixel value into said microprocessor addressable frame image memory so that pixel values making up said frame of image data are digitally filtered at the time of capture into said microprocessor addressable frame image memory.

9. The bar code reading apparatus of claim 8, wherein said image sensing and processing circuit is configured to apply a Gaussian mask to image data.

10. The bar code reading apparatus of claim 8, wherein said image sensing and processing circuit is configured to apply a Laplacian mask to image data.

11. The bar code reading apparatus of claim 8, wherein said image sensing and processing circuit is configured to apply an LoG mask to image data.

12. The bar code reading apparatus of claim 8, wherein said image sensing and processing circuit is configured to apply a mean filter to image data.

13. The bar code reading apparatus of claim 8, wherein said image sensing and processing circuit is configured to apply a median filter to image data.

14. A hand held bar code reading apparatus for reading a bar code on a substrate, the apparatus comprising:
a microprocessor addressable image frame memory being configured to simultaneously retain pixel values making up a frame of image data;
an image sensing and processing circuit, including an image sensor array having a plurality of pixels and an output interface for outputting data, the image sensing and processing circuit being configured to read out image signals from said image sensor array and to digitize such signals, the image sensing and processing circuit processing image data and further being configured to output for capture into said image frame memory through said output interface interleaved frames raw and filtered image data, the raw frames of image data comprising raw pixel values and the filtered frames of image data comprising filtered pixel values;
a microprocessor integrated circuit being configured to address image data of said frame image memory for processing of image data subsequent to capture of image data in said microprocessor addressable image frame memory.

15. A hand held bar code reading apparatus for reading a bar code on a substrate, the apparatus comprising:
a microprocessor addressable image frame memory being configured to simultaneously retain pixel values making of a frame of image data, the frame of image data including a plurality of pixel values;
an image sensing and processing circuit, including an image sensor array having a plurality of pixels and an output interface for outputting image data, the image sensing and processing circuit being configured to read out image signals from said image sensor array and to digitize such signals, the image sensing and processing circuit processing image data and further being configured to output for capture into said image frame memory through an interface interleaved raw and filtered pixel values, the image sensing and processing circuit when outputting interleaved pixel values outputs through said output interface over the course of outputting a frame of image data a series of pixel values in an interleaved pattern, the interleaved pattern comprising a pattern wherein one or more raw pixel values are serially_output followed by one or more filtered pixel values, followed by one or more raw pixel values;
a microprocessor integrated circuit being configured to address image data of said image frame memory for processing of image data subsequent to capture of image data in said microprocessor addressable image frame memory.

16. The hand held bar code reading apparatus of claim 15, wherein said image frame memory is configured to retain a frame of image data representing a two dimensional area of said substrate.

17. A method for processing image data in an imaging apparatus having an image sensor array, a microprocessor addressable image frame memory and a microprocessor in communication with the microprocessor addressable image frame memory, the method comprising:

reading out image signals from a contiguous grouping of pixels of said image sensor array, the image signals comprising an analog intensity value for each pixel of the grouping, the analog intensity value for each pixel indicating light incident on the pixel;

digitizing each of the analog intensity values read out at step (a) into a pixel value to form a set of pixel values making up a frame of image data;

prior to output of said set of pixel values for capture of said pixel values into said image frame memory, processing said set pixel values for determination of data indicating a location of a decodable indicia representation represented by said set of pixel values; capturing said set of pixel values into said image frame memory; and addressing pixel values of said set of pixel values captured into said image frame memory at step (d) at a determined location of a decodable indicia.

18. The method of claim 17, wherein said data indicating a location includes a coordinate data indicating a block having highest edge strength scores.

19. The method of claim 17, wherein said data indicating a location includes a set of block edge strength scores.

20. A hand held bar code reading apparatus for reading a bar code on a substrate, the apparatus comprising:

a microprocessor addressable image frame memory being configured to simultaneously retain pixel values making of a frame of image data, the frame of image data including a plurality of pixel values which together represent a two dimensional area of said substrate;

a program memory for storing a bar code decoding program;

an image sensing and processing circuit, including an image sensor array having a plurality of pixels formed in a plurality of rows and columns, the image sensing and processing circuit being configured to read out image signals from said image sensor array and to digitize such signals, the image sensing and processing circuit processing image data and further being configured to output through first and second interfaces for capture into said image frame memory first and second data respectively, the first data being output through said first interface being pixel value data and the second data being output through said second interface being data indicating a location of a decodable indicia representation represented within said first data;

a microprocessor integrated circuit being configured so that when running said bar code decoding program said microprocessor integrated circuit addresses pixel values of said image frame memory for processing of image data subsequent to capture of image data in said microprocessor addressable image frame memory, the microprocessor integrated circuit being configured so that when first addressing said first pixel value data after it is captured into said microprocessor addressable image frame memory said microprocessor integrated circuit can address such pixel value data at a location determined to a be a location where a decodable indicia is represented.

21. The apparatus of claim 20, wherein said data indicating a location of a decodable indicia comprising block edge strength data for each of a series of blocks of said first data.

22. The apparatus of claim 20, wherein said data indicating a location of decodable indicia comprising a max edge block score and an associated coordinate location.

23. An indicia reading apparatus for reading a decodable indicia on a substrate, the apparatus comprising:

a microprocessor addressable image frame memory being configured to simultaneously retain image data making of a frame of image data;

a program memory storing an indicia decoding program;

an image sensing and processing circuit configured to output image data for capture into said image frame memory, the image sensing and processing circuit including an image sensor array having a plurality of pixels, the image sensing and processing circuit generating image data and being configured to detect texture of image data generated by said image sensing and processing circuit, and further being configured to output data indicating a texture of generated image data;

a microprocessor integrated circuit in communication with said program memory being configured so that when running said indicia decoding program said microprocessor integrated circuit addresses image data of said image frame memory for processing of image data subsequent to capture of image data in said microprocessor addressable image frame memory.

24. The bar code reading apparatus of claim 23, wherein said image sensing and processing circuit in detecting a texture of image data applies edgelets to image data.

25. The indicia reading apparatus of claim 23, wherein said image sensing and processing circuit in detecting a texture of image data applies curvelets to image data.

26. A hand held image capturing apparatus comprising:

a monochrome image sensor array having a plurality of pixels, the plurality of pixels arranged in a plurality of rows of pixels; and an imaging lens for focusing an image of a target onto the monochrome image sensor array;

wherein the image capturing apparatus is operative in a picture taking mode and in an indicia decode mode;

wherein the image capturing apparatus in a picture taking mode is restricted from outputting a decoded message, the image capturing apparatus in the indicia decode mode processing a frame of image data for output of a decoded message;

wherein the image capturing apparatus is operative so that the image capturing apparatus is switchable between first, second, and third user selectable configuration states, the image capturing apparatus in the first user selectable configuration state activating a first edge enhancement filter for filtering of frame image data, the image capturing apparatus in the second user selectable configuration state activating a second edge enhancement filter for filtering of frame image data, the image capturing apparatus in the third user selectable configuration state being restricted from applying an edge enhancement filter;

wherein the image capturing apparatus is further operative so that selection of each of the first and second user selectable configuration states results in filtering of a frame image data when the image capturing apparatus processes image data in the picture taking mode without resulting in altering of frame image data processing by the image capturing apparatus when operating in the indicia decode mode.

27. The image capturing apparatus of claim 26, wherein first second and third configuration states are user selectable with use of displayed menu options.

28. The image capturing apparatus of claim 26, wherein the edge enhancement filter activated in the first user selectable configuration state is a Laplacian filter.

* * * * *

UNITED STATES PATENT AND TRADEMARK OFFICE
CERTIFICATE OF CORRECTION

Page 1 of 1

| | |
|---|---|
| PATENT NO. | : 7,784,696 B2 |
| APPLICATION NO. | : 11/545725 |
| DATED | : August 31, 2010 |
| INVENTOR(S) | : Wang |

It is certified that error appears in the above-identified patent and that said Letters Patent is hereby corrected as shown below:

In the Cover Page:

In Title Page (Item 74, Titled "Attorney, Agent, or Firm"). Please delete "Marjama Muldoon Blasink & Sullivan, LLP" and replace with -- Marjama Muldoon Blasiak & Sullivan, LLP --

In the Claims:

In Claim (Column 46, Line 23). Please delete "frames raw" and replace with -- frames of raw --

Signed and Sealed this
Eighteenth Day of January, 2011

David J. Kappos
*Director of the United States Patent and Trademark Office*